US012648569B2

(12) United States Patent
Wang et al.

(10) Patent No.: US 12,648,569 B2
(45) Date of Patent: Jun. 9, 2026

(54) *BACILLUS VELEZENSIS* AND USE THEREOF

(71) Applicant: MOON (GUANGZHOU) BIOTECH CO., LTD., Guangdong (CN)

(72) Inventors: Xue Wang, Guangdong (CN); Jianwen Liang, Guangdong (CN); Xintong Yu, Guangdong (CN); Xiaoqin Ji, Guangdong (CN); Jie Wang, Guangdong (CN); Renyan Liu, Guangdong (CN); Lin Wang, Guangdong (CN); Xianzhi Jiang, Guangdong (CN); Kejing Wang, Guangdong (CN)

(73) Assignee: MOON (GUANGZHOU) BIOTECH CO., LTD., Guangzhou (CN)

( * ) Notice: Subject to any disclaimer, the term of this patent is extended or adjusted under 35 U.S.C. 154(b) by 0 days.

(21) Appl. No.: 18/730,185

(22) PCT Filed: Jan. 20, 2023

(86) PCT No.: PCT/CN2023/073307
§ 371 (c)(1),
(2) Date: Jul. 18, 2024

(87) PCT Pub. No.: WO2023/138678
PCT Pub. Date: Jul. 27, 2023

(65) Prior Publication Data
US 2025/0169503 A1      May 29, 2025

(30) Foreign Application Priority Data
Jan. 21, 2022    (CN) .......................... 202210082910.3

(51) Int. Cl.
*A01N 63/22*       (2020.01)
*A01P 1/00*        (2006.01)
*A01P 21/00*       (2006.01)

(52) U.S. Cl.
CPC ................ *A01N 63/22* (2020.01); *A01P 1/00* (2021.08); *A01P 21/00* (2021.08)

(58) Field of Classification Search
CPC ............. A01N 63/22; A01P 21/00; A01P 1/00
USPC ...................................................... 424/93.46
See application file for complete search history.

(56) References Cited

U.S. PATENT DOCUMENTS

2018/0020676 A1    1/2018 Taghavi et al.
2021/0403858 A1    12/2021 Chen

FOREIGN PATENT DOCUMENTS

| | | |
|---|---|---|
| CN | 107446847 A | 12/2017 |
| CN | 107964514 A | 4/2018 |
| CN | 108004185 A | 5/2018 |
| CN | 108342335 A | 7/2018 |
| CN | 109868250 A | 6/2019 |
| CN | 110283742 A | 9/2019 |
| CN | 111172080 A | 5/2020 |
| CN | 111534460 A | 8/2020 |
| CN | 112831441 A | 5/2021 |
| CN | 113388545 A | 9/2021 |
| CN | 113717901 A | 11/2021 |
| CN | 114196602 A | 3/2022 |
| EP | 2138044 A1 | 12/2009 |
| IN | 201611024795 A | 1/2018 |
| KR | 20150106093 A | 9/2015 |
| KR | 102252856 B1 | 5/2021 |
| TW | 202035678 A | 10/2020 |
| TW | I740263 B | 9/2021 |

OTHER PUBLICATIONS

Wang et al., Effects of Bacillus velezensis FKM10 for Promoting the Growth of Malus hupehensis Rehd. and Inhibiting Fusarium verticillioides, Frontiers in Microbiology, vol. 10, Article 2889, (Jan. 2020), pp. 1-16.*
Cao et al., Antagonism of Two Plant-Growth Promoting Bacillus velezensis Isolates Against Ralstonia solanacearum and Fusarium oxysporum, Scientific Reports, vol. 8, (2018), pp. 1-14.*
International Search Report for PCT/CN2023/073307 mailed on Mar. 19, 2023.
Office action issued on Apr. 1, 2023 from China Patent Office in a counterpart China Patent Application No. 202210082910.3 (all the cited references are listed in this IDS.) (English translation is also submitted herewith.).
Office action issued on Oct. 9, 2023 from China Patent Office in a counterpart China Patent Application No. 202210082910.3 (all the cited references are listed in this IDS.) (English translation is also submitted herewith.).
Notice of Allowance issued on Mar. 13, 2024 from China Patent Office in a counterpart China Patent Application No. 202210082910.3 (all the cited references are listed in this IDS.) (English translation is also submitted herewith.).
Huang Huijing et al.,"Screening, fermentation condition optimization, and field control effect evaluation of an antagonistic bacterium against Ralstonia solanacearum", Microbiology China, Feb. 20, 2022, vol. 49, No. 2, pp. 606-619, DOI:10.13344/j.microbiol.china. 210637 (English translation is also submitted herewith.).

(Continued)

*Primary Examiner* — Jennifer M.H. Tichy
(74) *Attorney, Agent, or Firm* — Westbridge IP LLC

(57)        ABSTRACT

The *Bacillus velezensis* M173 was deposited with the Guangdong Microbial Culture Collection Center with a deposit number of GDMCC No. 61434. After being prepared into a seed-coating agent, *Bacillus velezensis* M173 can promote the growth and germination of plants and significantly improve the control effect on pathogens. Moreover, *Bacillus velezensis* M173 can relieve the condition of dead seedlings of crops at seedling stage after being applied to the crops. In particular, both pot experiments and field experiments prove that the *Bacillus velezensis* M173 of the present invention has a significant control effect on fungal and bacterial diseases, in particular, bacterial wilt and stem rot. Therefore, the *Bacillus velezensis* M173 of the present invention has broad application prospects.

20 Claims, 22 Drawing Sheets

Specification includes a Sequence Listing.

(56) References Cited

OTHER PUBLICATIONS

Yuan Xiao-juan et al.,"Study on the Control Effect of Seed Coating Agent Containing Bacillus pumilus on Cotton Fusarium Wilt", Journal of Xinjiang Agricultural University, 2019, vol. 42, No. 5, pp. 365-371 (English translation is also submitted herewith.).

Leiqin Liang et al. , "Genomic, Antimicrobial, and Aphicidal Traits of Bacillus velezensis ATR2, and Its Biocontrol Potential against Ginger Rhizome Rot Disease Caused by Bacillus pumilus", micro-organisms, Dec. 29, 2021, DOI: 10.3390/microorganisms10010063.

European Search Report issued in counterpart European Patent Application No. EP 23742993.1, dated Jan. 22, 2026.

First Office Action issued in counterpart Chinese Patent Application No. 202380013910.0, dated Nov. 13, 2025.

Jin et al., Antifungal mechanism of bacillomycin D from Bacillus velezensis HN-2 against Colletotrichum gloeosporioides Penz, Pesticide Biochemistry and Physiology, Academic Press, vol. 163, pp. 102-107, dated Nov. 6, 2019.

Katsenios et al., Evaluation of Plant Growth Promoting Bacteria Strains on Growth, Yield and Quality of Industrial Tomato, Micro-organisms, vol. 9, No. 10, pp. 2099, dated Oct. 1, 2021.

Zhang et al., Characteristics of Growth-promotion and Antibiosis by Bacillus amyloliquefaciens L-H15, Transactions of the Chinese Society for Agricultural Machinery, vol. 48, No. 12, pp. 284-291+ 298, dated Jul. 4, 2017.

Zubair et al., Genetic Screening and Expression Analysis of Psy-chrophilic Bacillus spp. Reveal Their Potential to Alleviate Cold Stress and Modulate Phytohormones in Wheat, microorganisms, vol. 7, pp. 1-25, dated Sep. 10, 2019.

* cited by examiner

Negative control group    Microbial agent    Positive control group  Blank control group
                          treatment group Blank control group      Negative control group      Microbial agent treatment group M173          CK          Negative control M173/200mM NaCl    UTC/200mM NaCl

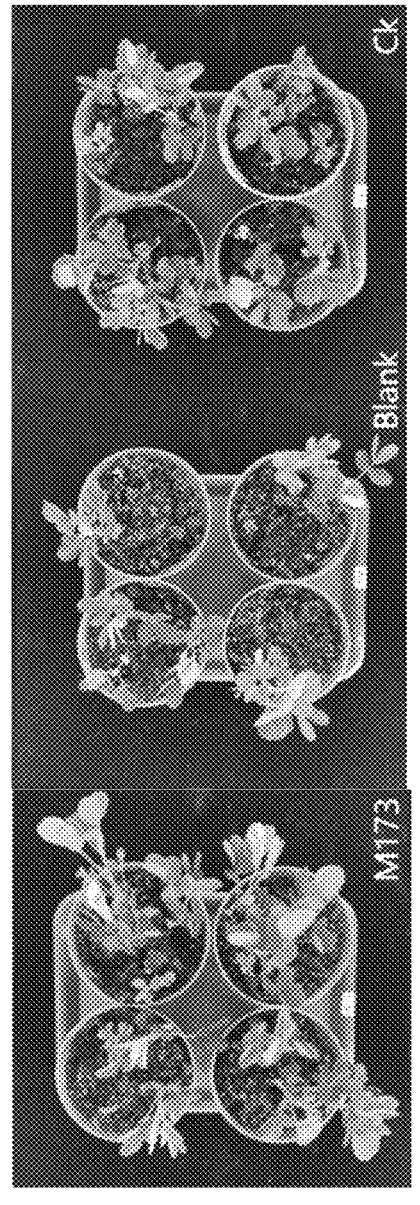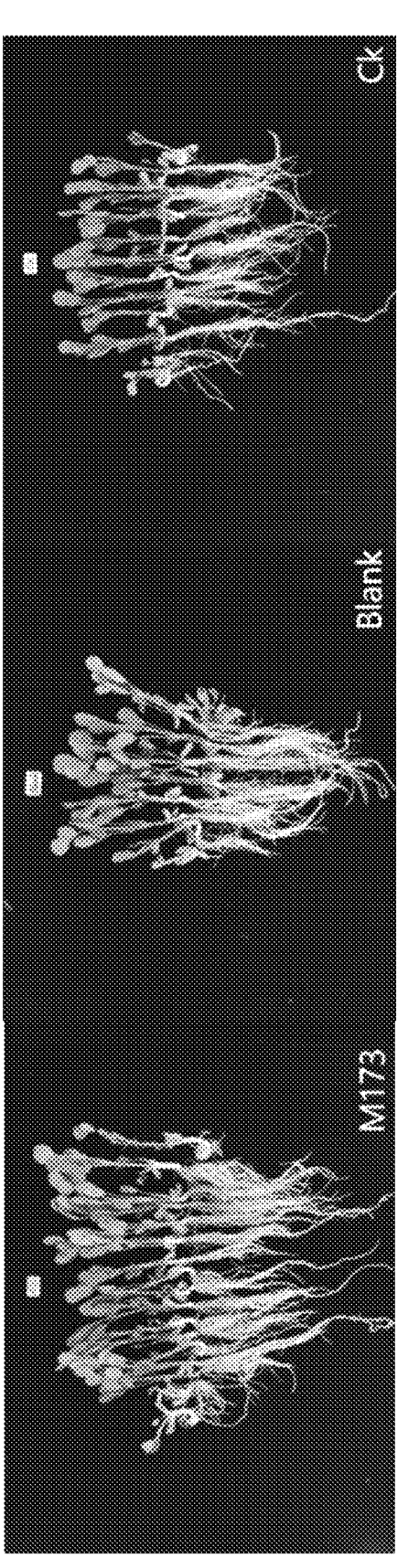
FIG. 18
FIG. 19

Table 1: Plant height

|  | CK | 400 X | 200 X | 400 X | 600 X |
|---|---|---|---|---|---|
|  | - | M173 | M173 | Serenade | 3% metalaxyl-hymexazol |
| Average plant height | 68 | 75 | 76 | 76 | 73 |
| Increase rate | | 10 | 12 | 12 | 7 |

Average plant height     Increase rate

Table 2: Growth status and number of born fruits

Number of born fruits

| | CK | 400 x | 200 x | 400 x | 600 x |
|---|---|---|---|---|---|
| | - | M173 | M173 | Serenade | 3% metalaxyl·hymexazol |
| Growth status | 100 | 115 | 122 | 113 | 117 |
| Number of born fruits | 22 | 31 | 32 | 27 | 27 |

Growth status: %

Growth status ▬▬▬  Number of born fruits ─────

BACILLUS VELEZENSIS AND USE THEREOF

CROSS-REFERENCE TO RELATED APPLICATIONS AND CLAIM OF PRIORITY

This application claims benefit under 35 U.S.C. 119, 120, 121, or 365(c), and is a National Stage entry from International Application No. PCT/CN2023/073307, filed Jan. 20, 2023, which claims priority to the benefit of Chinese Patent Application No. 202210082910.3 filed in the Chinese Intellectual Property Office on Jan. 21, 2022, the entire contents of which are incorporated herein by reference.

REFERENCE TO AN ELECTRONIC SEQUENCE LISTING

A sequence listing electronically submitted on Jul. 18, 2024 as a XML file named 20240718_S32924VC031_TU_SEQ.XML, created on Jul. 18, 2024 and having a size of 8,861 bytes, is incorporated herein by reference in its entirety.

BACKGROUND

1. Technical Field

The present invention relates to the technical field of microorganisms and disease control, and in particular, to a *Bacillus velezensis* and use thereof.

2. Background of the Related Art

In agricultural production, the large-scale application of fertilizers and pesticides has caused many problems such as soil degradation, decreased quality and yield of crops, and deterioration of ecological environment, thereby threatening food and environmental safety. Therefore, utilizing the physiological properties of microorganisms to provide the nutrients needed for crop growth, improve soil granularity, or resist pests and diseases in the environment is playing an increasingly important role in production of safe and high-quality agricultural products and protection of the ecological environment.

Most crops are most sensitive to environmental stress at seed germination and early seedling stages. The speed at which the roots of a newly sprouted plant are exposed to a fertilizer has important implications for the plant's ability to take up the nutrients present in the fertilizer and the success of initial development and growth of the plant during the first three weeks. Plants are prone to wounds when transplanted at seedling stage, which can be easily infected with pathogens, resulting in a low survival rate of the transplanted crops.

The biofilm produced by soil microorganisms helps to improve the competitiveness of plant rhizosphere and the advantage of root colonization. It has been reported that microorganisms compete with plant pathogens for iron ions directly available to plant organisms by producing siderophores, thereby indirectly protecting plants from pathogens. Microorganisms can reduce the negative effects of pathogens on plants by inducing accumulation of reactive oxygen species, antioxidants and phytohormones in the plants, and enhance the fundamental immunity of plants to pathogens by inducing increased expression of defense-related genes and certain defense-related enzymes in the plants. Microorganisms can induce development of systemic resistance in plants by using their flagellins, lipopeptides, lipopolysaccharides, siderophores, or the like as biological elicitors.

When a microbial agent is applied to soil and acts on crop roots, it is necessary to consider whether the soil environment is suitable for colonization of microorganisms, such as acidity, alkalinity, drought, and salinity. In addition, the parts of a crop to which a microbial agent is relatively difficult to be applied are aboveground parts of the crop, i.e., leaf surface, fruit, etc. Since extreme environments such as high temperature, drought, and ultraviolet radiation under leaf environment should be considered for foliar application compared to root application, the resistances of microorganisms to high temperature, drought, and oxidation, and their colonization on the leaf surface of crops for exerting biological effects need to be considered when an application manner such as foliar spraying or mist spraying is used.

The physical form of a biological product is also a very important factor that must be considered. In order for a microorganism to form a product, it should have not only the ability to remain viable for a long time, but also the ability to survive in the environment and perform its intended function. Therefore, a strain with the above characteristics will have important application prospects.

SUMMARY

In the present invention, unless otherwise specified, the scientific and technical terms used herein have the same meanings as commonly understood by those skilled in the art. Meanwhile, in order to better understand the present invention, definitions and explanations of relevant terms are provided hereinafter. It should be noted that in China, we use "mu" as the land measurement, which is equivalent to 667 square meters or $\frac{1}{15}$ ha.

The microbial product of the present invention can promote the survival rate of plants transplanted at seedling stage, significantly promote plant growth when used in combination with a humic acid-based product, and effectively prevent and control pathogenic bacterial and fungal diseases in plants. Experiments also confirm that the microbial product of the present invention is suitable for saline-alkali soil, can improve soil environment, has drought resistance and cold resistance, and can effectively alleviate phytotoxicity. The microbial product of the present invention has been verified to maintain cell viability for at least 12 months without significant loss. In pot and field experiments, it has demonstrated efficacies of treating diseases caused by different phytopathogenic fungi and stimulating plant growth. In field experiments, it also demonstrates an effect of treating phytopathogenic bacteria, particularly tomato bacterial wilt.

In a first aspect, the present invention provides *Bacillus velezensis* M173, or a variant or progeny thereof, wherein the *Bacillus velezensis* M173 was deposited with the Guangdong Microbial Culture Collection Center with a deposit number of GDMCC No. 61434. The deposit has been made under the terms of the Budapest Treaty and all restrictions imposed by the depositor on the availability to the public of the biological material will be irrevocably removed upon the granting of a patent.

In certain embodiments, the variant or progeny has a similar or identical function to the *Bacillus velezensis* M173.

In certain embodiments, the variant or progeny of the *Bacillus velezensis* M173 has similar or identical physiological and biochemical properties to the *Bacillus velezensis* M173.

In certain embodiments, the *Bacillus velezensis* M173 has one or more functions selected from:

(1) being capable of improving the survival rate of a plant at seedling stage (e.g., transplanted at seedling stage);

(2) being capable of promoting plant growth (e.g., increasing plant height or stem diameter) at each stage (e.g., seedling stage, seedling recovery stage, and growth stage);

(3) being capable of increasing the yield of plant fruits;

(4) being capable of promoting the growth of a plant organ (e.g., root, stem, or leaf);

(5) being capable of improving the resistance of a plant to a stress environment;

(6) being capable of improving the resistance of a plant to a pathogen; and (7) (1) to (6).

In another aspect, the present invention provides a composition including *Bacillus velezensis* or a variant or progeny thereof as described above.

It will be understood by those skilled in the art that when the *Bacillus velezensis* is used together with any of the components as described below, it means that the composition is different from any organism found in nature.

In certain embodiments, the *Bacillus velezensis* can be in the form of a solid, such as a dried or freeze-dried culture preparation.

In certain embodiments, the composition further includes one or more additional biological control agents, one or more pesticides, or any combination thereof.

In certain embodiments, the composition further includes an agriculturally or horticulturally acceptable diluent, filler, solvent, spontaneous promoter, carrier, emulsifier, preservative, dispersant, antifreezing agent, thickener, adjuvant, or any combination thereof.

In certain embodiments, the dispersant and/or emulsifier include all nonionic, anionic or cationic dispersants conventionally used in active agricultural chemical preparations. A nonionic or anionic dispersant, or a mixture of nonionic or anionic dispersants can be preferably used. A particularly suitable nonionic dispersant is an ethylene oxide-propylene oxide block polymer, alkylphenol polyglycol ether, tristyrylphenol polyglycol ether, and a phosphorylated or sulfated derivative thereof. A particularly suitable anionic dispersant is lignin sulfonate, polyacrylate and arylsulfonate-formaldehyde condensate.

In certain embodiments, examples of the preservative include, but are not limited to, dichlorophen and benzyl-hemiformal.

In certain embodiments, examples of the agriculturally or horticulturally acceptable diluent include an aqueous solution of a monosaccharide, polysaccharide, molasses, gum, lignin sulfonate, glycerol, sorbitol, or propylene glycol, water, vegetable oil and mineral oil. The carrier can include a solid such as alginate beads, durum wheat flour (starch) particles, silica, clay, clay minerals, gelatin, cellulose, a cellulose derivative, calcium chlorite and talc. In some embodiments, the carrier can be a porous solid such as diatomite, activated carbon (e.g., animal bone carbon), peat, vermiculite, lignite, wood chips, and corn cob.

In certain embodiments, the composition of the present invention can be prepared into: an aqueous suspension; stable liquid suspension; emulsifiable concentrate; capsule; soluble or wettable powder; aqueous flowable; dry flowable; wettable granules; wettable dispersible granules; and the like known to those skilled in the art.

In certain embodiments, the additional biological control agent is selected from: a bacterium, fungus (e.g., yeast), virus, insect, nematode, or any combination thereof.

In certain embodiments, the bacterium is selected from *Bacillus, Lactobacillus, Bifdobacterium, Propionibacterium, Streptococcus, Lactococcus, Pediococcus, Enterococcus, Staphylococcus*, or any combination thereof.

In certain embodiments, the bacterium of the *Bacillus* is selected from: *Bacillus velezensis, Bacillus subtilis, Bacillus pumilus, Bacillus coagulans*, or any combination thereof.

In certain embodiments, the additional biological control agent is the *Bacillus pumilus* deposited with the Guangdong Microbial Culture Collection Center with a deposit number of GDMCC No. 61962. The deposit has been made under the terms of the Budapest Treaty and all restrictions imposed by the depositor on the availability to the public of the biological material will be irrevocably removed upon the granting of a patent.

In certain embodiments, the mixing volume ratio of the *Bacillus velezensis* to the *Bacillus pumilus* in the composition is 1:5 to 5:1 (e.g., 1:5; 1:4; 1:3; 1:2; 1:1; 2:1; 31; 4:1; or 5:1).

In certain embodiments, the mixed volume ratio of the *Bacillus velezensis* to the *Bacillus pumilus* in the composition is 2:1.

In certain embodiments, the yeast is selected from *Saccharomyces cerevisiae, Saccharomyces boulardii, Kluyveromyces marxianus*, or any combination thereof.

In certain embodiments, the pesticide is selected from: a herbicide, insecticide, antimicrobial (e.g., antifungal or antibacterial) agent, antiviral agent, plant growth regulator, antibiotic, fertilizer, or any combination thereof.

In certain embodiments, the antimicrobial agent is selected from propamocarb hydrochloride, carbendazim, fluazinam, chlorothalonil, quintozene, thiram, fosetyl-aluminum, metalaxyl-M, metalaxyl-M•fludioxonil, or any combination thereof.

In certain embodiments, the insecticide is selected from thiamethoxam, dinotefuran, gamma-cyhalothrin, profenofos•phoxim, or any combination thereof.

In certain embodiments, the fertilizer is selected from a humic acid-based fertilizer (e.g., Structure), urea, ammonium sulfate, Huanzhitian, ancoli, potassium dihydrogen phosphate, or any combination thereof.

In certain embodiments, the composition is in the form of a solid, liquid, powder, or any combination thereof.

In another aspect, the present invention provides a biological culture including *Bacillus velezensis* M173 or a variant or progeny thereof as described above, or a composition as described above.

In certain embodiments, the biological culture further includes a solid or liquid culture medium, or a component of the culture medium.

In certain embodiments, the biological culture further includes viable cells of *Bacillus velezensis* M173. In certain embodiments, the viable cells are present in the form of spores. In certain embodiments, the spores are present in a liquid culture medium of *Bacillus velezensis* M173.

In certain embodiments, the biological culture includes cells and a culture supernatant of *Bacillus velezensis* M173.

In certain embodiments, the culture medium includes a carbon source (e.g., starch hydrolyzate, corn flour, glucose, or sucrose), a nitrogen source (e.g., soybean meal or peptone), an inorganic salt (e.g., disodium hydrogen phosphate, magnesium sulfate, or sodium carbonate), a trace element (e.g., $ZnSO_4$ or $MnSO_4$), or any combination thereof.

In certain embodiments, the culture further includes a derivative or progeny culture of *Bacillus velezensis* M173.

In certain embodiments, the derivative or progeny culture is selected from a metabolite (e.g., cyclodipeptide, cyclotripeptide, bacillomycin, or surfactin), hormone (e.g., IP, GA3, IPA, IAA, Me-SA, SA, or IBA), enzyme, cell structural component, or any combination thereof.

In certain embodiments, the culture further includes a component that provides nutrients.

In certain embodiments, the component that provides nutrients is selected from a protein, carbohydrate, fat, probiotic, enzyme, vitamin, immunomodulator, milk substitute, mineral, amino acid, or any combination thereof.

In another aspect, the present invention provides a plant growth promoter, including *Bacillus velezensis* M173 or a variant or progeny thereof as described above, a composition as described above, or a biological culture as described above.

In certain embodiments, the plant growth promoter further includes one or more additional biological control agents, one or more fertilizers, or any combination thereof.

In certain embodiments, the fertilizer is selected from a humic acid-based fertilizer (e.g., Structure) or water-soluble fertilizer containing amino acids.

In another aspect, the present invention provides a biological control agent for preventing and controlling a phytopathogenic bacterium and/or promoting plant growth, including *Bacillus velezensis* M173 or a variant or progeny thereof as described above, a composition as described above, or a biological culture as described above.

In another aspect, the present invention provides a growth substrate for plants, including *Bacillus velezensis* M173 or a variant or progeny thereof as described above, a composition as described above, a biological culture as described above, a plant growth promoter as described above, or a biological control agent as described above.

In certain embodiments, the growth substrate further includes sand, soil, an inert granular substrate (e.g., vermiculite), or any combination thereof.

In another aspect, the present invention provides a pesticide composition, including *Bacillus velezensis* M173 or a variant or progeny thereof as described above, a composition as described above, a biological culture as described above, a plant growth promoter as described above, or a biological control agent as described above.

In certain embodiments, the pesticide composition further includes one or more biological control agents and/or one or more pesticides (e.g., insecticides).

In another aspect, the present invention provides a plant, plant tissue or plant organ treated with *Bacillus velezensis* M173 or a variant or progeny thereof as described above, a composition as described above, a biological culture as described above, a plant growth promoter as described above, a biological control agent as described above, or a pesticide composition as described above.

In certain embodiments, the treatment includes root soaking, foliar spraying, mist spraying, composting, seed soaking, coating, field flooding, drip irrigation of the plant or plant organ, smearing the plant or plant organ, or dripping the plant or plant organ.

In certain embodiments, the plant organ includes root, stem, leaf, flower, fruit, and seed.

In certain embodiments, the plant tissue includes meristem, protective tissue, basic tissue, and conducting tissue.

In certain embodiments, the plant is selected from the group consisting of Solanaceae, Gramineae, Leguminosae, Cucurbitaceae, Brassicaceae, Asteraceae, Umbelliferae, and Orchidaceae.

In certain embodiments, the plant has one or more features selected from the following:
- (1) the Solanaceae plant is selected from tomato, pepper, potato, eggplant, or any combination thereof;
- (2) the Gramineae plant is selected from corn, wheat, rice, sorghum, or any combination thereof;
- (3) the Leguminosae plant is selected from soybean, peanut, or any combination thereof;
- (4) the Cucurbitaceae plant is selected from cucumber, wax gourd, pumpkin, bitter cucumber, loofa, watermelon. *Momordica grosvenori*, or any combination thereof,
- (5) the Brassicaceae plant is selected from Chinese cabbage, oilseed rape, cabbage, radish, cauliflower, or any combination thereof, and
- (6) the Orchidaceae plant is selected from orchid.

In certain embodiments, the treatment includes drip irrigation, seed soaking, and seed coating.

In another aspect, the present invention provides a method for improving the survival rate of a plant at seedling stage (e.g., transplanted at seedling recovery stage), including: treating the plant with *Bacillus velezensis* M173 or a variant or progeny thereof as described above, a composition as described above, a biological culture as described above, a plant growth promoter as described above, a biological control agent as described above, or a pesticide composition as described above.

In certain embodiments, the treatment is selected from root irrigation, root soaking, foliar spraying, mist spraying, composting, seed soaking, seed coating, field flooding, and drip irrigation.

In certain embodiments, the *Bacillus velezensis* M173 improves the survival rate of the plant at seedling stage through one or more features selected from:
- (1) improving the survival rate of the plant transplanted at seedling stage;
- (2) promoting plant growth (e.g., increasing plant height or stem diameter);
- (3) increasing the yield of plant fruits;
- (4) promoting the growth of a plant organ (e.g., root, stem, or leaf);
- (5) improving the resistance of the plant to a stress environment;
- (6) improving the resistance of the plant to a pathogen; and
- (7) (1) to (6).

In certain embodiments, the stress environment is selected from low temperature, drought, high salt, phytotoxicity (e.g., pesticide), soil hardening, acidic soil, alkaline soil, high temperature environment, insufficient soil fertility, or any combination thereof.

In certain embodiments, the pathogen is selected from a pathogenic bacterium, pathogenic fungus or virus.

In certain embodiments, the pathogen is selected from *Colletotrichum capsici, Botrvtis cinerea, Ralstonia solanacearum, Rhizoctonia solani, Fusarium graminearum, Fusarium oxysporum, Athelia rolfsii, Streptomyces scabies, Sclerotium rolfsii, Sclerotinia sclerotiorum, Fusarium oxysporum.* sp. cucumebrium*owen, Gaeumannomyces critici, Fusarium graminearum, Valsa mali, Glomerella cingulata, Rhizoctonia solani, Pyricularia grisea, Alternaria solani, Exserohilum turcicum, Bipolaria maydis, Phytophthora capsici, Phytophthora nicotianae, Pseudomonas* syringae, Xanthomonas campestris, Erwinia carotorora, Xanthomonas campestris, Erwinia carotovora, Botrytis cirerea, Phytophthora infestans, Exserohilum turcicum, Bipolaria maydis, Fusarium oxysporum f sp. niveum, Verticillium dahliae, Fusarium oxysporum f sp. vasinfectum, Phytophthora capsici, Phytophthora nicotianae, or any combination thereof.

In certain embodiments, the plant disease caused by the pathogen is selected from bacterial wilt of plants (e.g., bacterial wilt of Solanaceae plants, e.g., pepper bacterial wilt or tomato bacterial wilt), soft rot of plants (e.g., soft rot of Gramineae plants or soft rot of Orchidaceae plants; e.g., corn soft rot or orchid soft rot), stem rot of plants (e.g., corn stem rot or tomato stem rot), or gray mold of plants (e.g., grape gray mold).

In another aspect, the present invention provides use of the Bacillus velezensis M173 or variant or progeny thereof as described above, the composition as described above, the biological culture as described above, the plant growth promoter as described above, the biological control agent as described above, or the pesticide composition as described above for preventing and/or treating a plant disease caused by a pathogen, or preventing and/or alleviating plant damage or necrosis caused by a non-pathogen condition.

In certain embodiments, the pathogen is selected from a pathogenic bacterium, pathogenic fungus or virus.

In certain embodiments, the pathogen is selected from Colletotrichum capsici, Botrytis cinerea, Ralstonia solanacearum, Rhizoctonia solani, Fusarium graminearum, Fusarium oxysporum, Athelia rolfsii, Streptomyces scabies, Sclerotium rolfsii, Sclerotinia sclerotiorum, Fusarium oxysporum. sp. cucumebrium owen, Gaeumannomyces critici, Fusarium graminearum, Valsa mali, Glomerella cingulata, Rhizoctonia solani, Pyricularia grisea, Alternaria solani, Exserohilum turcicum, Bipolaria maydis, Phytophthora capsici, Phytophthora nicotianae, Pseudomonas syringae, Xanthomonas campestris, Erwinia carotorora, Xanthomonas campestris, Erwinia carotovora, Botrytis cirerea, Phybophthora infestans, Exserohilum turcicum, Bipolaria maydis, Fusarium oxysporum f sp. niveum, Verticillium dahliae, Fusarium oxysporum f sp. vasinfectum. Phytophthora capsici, Phytophthora nicotianae, or any combination thereof.

In certain embodiments, the plant disease caused by the pathogen is selected from bacterial wilt of plants (e.g., bacterial wilt of Solanaceae plants, e.g., pepper bacterial wilt or tomato bacterial wilt), soft rot of plants (e.g., soft rot of Gramineae plants or soft rot of Orchidaceae plants; e.g., corn soft rot or orchid soft rot), stem rot of plants (e.g., corn stem rot or tomato stem rot), or gray mold of plants (e.g., grape gray mold).

In certain embodiments, the non-pathogen condition is selected from low temperature, drought, high salt, phytotoxicity (e.g., pesticide), soil hardening, acidic soil, alkaline soil, high temperature environment, insufficient soil fertility, or any combination thereof.

In certain embodiments, the plant is selected from the group consisting of Solanaceae, Gramineae, Leguminosae, Cucurbitaceae. Brassicaceae, Asteraceae, Umbelliferae, and Orchidaceae.

In certain embodiments, the plant has one or more features selected from the following:

(1) the Solanaceae plant is selected from tomato, pepper, potato, eggplant, or any combination thereof;

(2) the Gramineae plant is selected from corn, wheat, rice, sorghum, or any combination thereof;

(3) the Leguminosae plant is selected from soybean, peanut, or any combination thereof;

(4) the Cucurbitaceae plant is selected from cucumber, wax gourd, pumpkin, bitter cucumber, loofa, watermelon, Momordica grosvenori, or any combination thereof;

(5) the Brassicaceae plant is selected from Chinese cabbage, oilseed rape, cabbage, radish, cauliflower, or any combination thereof; and (6) the Orchidaceae plant is selected from orchid.

In another aspect, the invention provides use of the Bacillus velezensis M173 or variant or progeny thereof as described above, the composition as described above, the biological culture as described above, the plant growth promoter as described above, the biological control agent as described above, or the pesticide composition as described above for improving the resistance of a plant to a pathogen or stress condition, or promoting plant growth.

In certain embodiments, the pathogen is selected from a pathogenic bacterium, pathogenic fungus or virus.

In certain embodiments, the pathogen is selected from Colletotrichum capsici, Botrytis cinerea, Ralstonia solanacearum, Rhizoctonia solani, Fusarium graminearum, Fusarium oxysporum, Athelia rolfsii, Streptomyces scabies. Sclerotium rolfsii, Sclerotinia sclerotiorum, Fusarium oxysporum. sp. Cucumebrium owen, Gaeumannomyces critici, Fusarium graminearum, Valsa mali, Glomerella cingulata, Rhizoctonia solani, Pyricularia grisea, Alternaria solani, Exserohilum turcicum, Bipolaria maydis, Phytophthora capsici, Phytophthora nicotianae, Pseudomonas syringae. Xanthomonas campestris, Erwinia carotorora, Xanthomonas campestris, Erwinia carotovora, Botrytis cirerea, Phytophthora infestans, Exserohilum turcicum, Bipolaria maydis, Fusarium oxysporum f sp. niveum, Verticillium dahliae. Fusarium oxysporum f sp. vasinfectum, Phytophthora capsici, Phytophthora nicotianae, or any combination thereof.

In certain embodiments, the plant disease caused by the pathogen is selected from bacterial wilt of plants (e.g., bacterial wilt of Solanaceae plants, e.g., pepper bacterial wilt or tomato bacterial wilt), soft rot of plants (e.g., soft rot of Gramineae plants or soft rot of Orchidaceae plants; e.g., corn soft rot or orchid soft rot), stem rot of plants (e.g., corn stem rot or tomato stem rot), or gray mold of plants (e.g., grape gray mold).

In certain embodiments, the stress condition is selected from low temperature, drought, high salt, phytotoxicity (e.g., pesticide), soil hardening, acidic soil, alkaline soil, high temperature environment, insufficient soil fertility, or any combination thereof.

In certain embodiments, the plant is selected from the group consisting of Solanaceae, Gramineae, Leguminosae, Cucurbitaceae, Brassicaceae, Asteraceae, Umbelliferae, and Orchidaceae.

In certain embodiments, the plant has one or more features selected from the following:

(1) the Solanaceae plant is selected from tomato, pepper, potato, eggplant, or any combination thereof;

(2) the Gramineae plant is selected from corn, wheat, rice, sorghum, or any combination thereof;

(3) the Leguminosae plant is selected from soybean, peanut, or any combination thereof;

(4) the Cucurbitaceae plant is selected from cucumber, wax gourd, pumpkin, bitter cucumber, loofa, watermelon, Momordica grosvenori, or any combination thereof;

(5) the Brassicaceae plant is selected from Chinese cabbage, oilseed rape, cabbage, radish, cauliflower, or any combination thereof; and (6) the Orchidaceae plant is selected from orchid.

In another aspect, the present invention provides a method for preventing and/or treating a plant disease caused by a pathogen, or preventing and/or alleviating plant damage or necrosis caused by a non-pathogen condition, including: applying to a plant, plant tissue or plant organ the *Bacillus velezensis* M173 or a variant or progeny thereof as described above, a composition as described above, a biological culture as described above, a plant growth promoter as described above, a biological control agent as described above, or a pesticide composition as described above.

The method for applying the *Bacillus velezensis* or a composition thereof is well known to those of ordinary skill in the art. The method can be directed to seeds, seedlings, plants, crops, plant parts, flowers, fruits, vegetative parts of plants (e.g., seed tubers and plant cuttings), and soils and artificial substrate systems for growing plant materials.

In certain embodiments, the applying includes root soaking, foliar spraying, mist spraying, composting, seed soaking, coating, field flooding, drip irrigation of the plant or plant organ, smearing the plant or plant organ, or dripping the plant or plant organ.

In certain embodiments, the plant organ includes root, stem, leaf, flower, fruit, and seed.

In certain embodiments, the plant tissue includes meristem, protective tissue, basic tissue, and conducting tissue.

In certain embodiments, the pathogen is selected from a pathogenic bacterium, pathogenic fungus or virus.

In certain embodiments, the pathogen is selected from *Colletotrichum capsici, Botrytis cinerea, Ralstonia solanacearum, Rhizoctonia solani, Fusarium graminearum, Fusarium oxysporum, Athelia rolfsii, Streptomyces* scabies, *Sclerotium rolfsii, Sclerotinia sclerotiorum, Fusarium oxysporum. sp. cucumebrium Owen, Gaeumannomyces critici, Fusarium graminearum, Valsa mali, Glomerella cingulata, Rhizoctonia solani, Pyricularia grisea, Alternaria solani, Exserohilum turcicum, Bipolaria maydis, Phytophthora capsici, Phytophthora nicotianae, Pseudomonas syringae, Xanthomonas campestris. Erwinia carotorora, Xanthomonas campestris, Erwinia carotovora, Botrytis cirerea, Phytophthora infestans, Exserohilum turcicum, Bipolaria maydis, Fusarium oxysporum* f sp. *niveum, Vericillium dahliae, Fusarium oxysporum* f sp. *vasinfectum, Phytophthora capsici, Phytophthora nicotianae*, or any combination thereof.

In certain embodiments, the plant disease caused by the pathogen is selected from bacterial wilt of plants (e.g., bacterial wilt of Solanaceae plants, e.g., pepper bacterial wilt or tomato bacterial wilt), soft rot of plants (e.g., soft rot of Gramineae plants or soft rot of Orchidaceae plants; e.g., corn soft rot or orchid soft rot), stem rot of plants (e.g., corn stem rot or tomato stem rot), or gray mold of plants (e.g., grape gray mold).

In certain embodiments, the non-pathogen condition is selected from low temperature, drought, high salt, phytotoxicity (e.g., pesticide), soil hardening, acidic soil, alkaline soil, high temperature environment, insufficient soil fertility, or any combination thereof.

In certain embodiments, the plant is selected from the group consisting of Solanaceae, Gramineae. Leguminosae, Cucurbitaceae, Brassicaceae, Asteraceae, Umbelliferae, and Orchidaceae.

In certain embodiments, the plant has one or more features selected from the following:

(1) the Solanaceae plant is selected from tomato, pepper, potato, eggplant, or any combination thereof;

(2) the Gramineae plant is selected from corn, wheat, rice, sorghum, or any combination thereof;

(3) the Leguminosae plant is selected from soybean, peanut, or any combination thereof;

(4) the Cucurbitaceae plant is selected from cucumber, wax gourd, pumpkin, bitter cucumber, loofa, watermelon, *Momordica grosvenori*, or any combination thereof;

(5) the Brassicaceae plant is selected from Chinese cabbage, oilseed rape, cabbage, radish, cauliflower, or any combination thereof; and (6) the Orchidaceae plant is selected from orchid.

In another aspect, the present invention provides a method for improving the resistance of a plant to a pathogen or stress condition, or promoting plant growth, including: applying to the plant, plant tissue or plant organ the *Bacillus velezensis* M173 or a variant or progeny thereof as described above, a composition as described above, a biological culture as described above, a plant growth promoter as described above, a biological control agent as described above, or a pesticide composition as described above.

The method for applying the *Bacillus velezensis* or a composition thereof is well known to those of ordinary skill in the art. The method can be directed to seeds, seedlings, plants, crops, plant parts, flowers, fruits, vegetative parts of plants (e.g., seed tubers and plant cuttings), and soils and artificial substrate systems for growing plant material.

In certain embodiments, the applying includes root soaking, foliar spraying, mist spraying, composting, seed soaking, coating, field flooding, drip irrigation of the plant or plant organ, smearing the plant or plant organ, or dripping the plant or plant organ.

In certain embodiments, the plant organ includes root, stem, leaf, flower, fruit, and seed.

In certain embodiments, the plant tissue includes meristem, protective tissue, basic tissue, and conducting tissue.

In certain embodiments, the pathogen is selected from a pathogenic bacterium, pathogenic fungus or virus.

In certain embodiments, the pathogen is selected from *Colletotrichum capsici, Botrytis cinerea, Ralstonia solanacearum, Rhizoctonia solani, Fusarium graminearum, Fusarium oxysporum, Athelia rolfsii, Streptomyces scabies, Sclerotium rolfsii, Sclerotinia sclerotiorum, Fusarium oxysporum. sp. cucumebriumowen, Gaeumannomyces critici, Fusarium graminearum, Valsa mali, Glomerella cingulata, Rhizoctonia solani, Pyricularia grisea, Alternaria solani, Exserohilum turcicum, Bipolaria maydis, Phytophthora capsici, Phytophthora nicotianae, Pseudomonas syringae, Xanthomonas campestris, Erwinia carotorora, Xanthomonas campestris, Erwinia carotovora, Botrytis cirerea, Phytophthora infestans, Exserohilum turcicum, Bipolaria maydis, Fusarium oxysporum* f. sp. *niveum, Vericillium dahliae, Fusarium oxysporum* f sp. *vasinfectum, Phytophthora capsici, Phybophthora nicotianae*, or any combination thereof.

In certain embodiments, the plant disease caused by the pathogen is selected from bacterial wilt of plants (e.g., bacterial wilt of Solanaceae plants, e.g., pepper bacterial wilt or tomato bacterial wilt), soft rot of plants (e.g., soft rot of Gramineae plants or soft rot of Orchidaceae plants; e.g., corn soft rot or orchid soft rot), stem rot of plants (e.g., corn stem rot or tomato stem rot), or gray mold of plants (e.g., grape gray mold).

In certain embodiments, the stress condition is selected from low temperature, drought, high salt, phytotoxicity (e.g., pesticide), soil hardening, acidic soil, alkaline soil, high temperature environment, insufficient soil fertility, or any combination thereof.

In certain embodiments, the plant is selected from the group consisting of Solanaceae, Gramineae, Leguminosae, Cucurbitaceae, Brassicaceae, Asteraceae, Umbelliferae, and Orchidaceae.

In certain embodiments, the plant has one or more features selected from the following:

(1) the Solanaceae plant is selected from tomato, pepper, potato, eggplant, or any combination thereof;

(2) the Gramineae plant is selected from corn, wheat, rice, sorghum, or any combination thereof;

(3) the Leguminosae plant is selected from soybean, peanut, or any combination thereof;

(4) the Cucurbitaceae plant is selected from cucumber, wax gourd, pumpkin, bitter cucumber, loofa, watermelon, *Momordica grosvenori*, or any combination thereof;

(5) the Brassicaceae plant is selected from Chinese cabbage, oilseed rape, cabbage, radish, cauliflower, or any combination thereof; and (6) the Orchidaceae plant is selected from orchid.

In another aspect, the present application provides a method for inhibiting a bacterial wilt disease of a plant, including formulating the *Bacillus velezensis* M173 or a variant or progeny thereof as described above into a biopesticide formulation; and applying an effective amount of the biopesticide formulation to the plant or a part thereof that is infected with or at risk of infection with a pathogen of the bacterial wilt. In certain embodiments, the plant is tomato or pepper. In certain embodiments, the biopesticide formulation is applied by means of mist spraying, foliar spraying, root soaking, or drip irrigation.

As used herein, the term "biological control" refers to a means of controlling a pathogen by another organism.

As used herein, the term "biological control agent" or "biocontrol agent" refers to an organism (e.g., microorganism) capable of effecting biological control. Herein, the biological control agent includes not only a microorganism that is resistant to a pathogen, but also a microorganism that has beneficial effects on plant health, growth, vitality, stress response, or yield. Routes of application of the biological control agent include spray application, soil application (e.g., drip irrigation), and seed treatment (e.g., seed coating).

The object of the present invention is to provide a microbial agent composition and use thereof. The *Bacillus velezensis* provided by the present invention is a commercializable biocontrol product, which is easy to culture and suitable for industrial production.

The present invention is achieved as follows.

The present invention provides use of a microbial agent composition for preventing and controlling a disease selected from at least one of plant bacterial diseases, plant fungal diseases, plant soil-borne diseases, and plant oomycete diseases:

The microbial agent composition includes: *Bacillus velezensis* and *Bacillus pumilus* M101;

The bacterial strain M173 of *Bacillus velezensis* was deposited with the Guangdong Microbial Culture Collection Center on Jan. 15, 2021, with a deposit number of GDMCC No. 61434;

The *Bacillus pumilus* M101 was deposited with the Guangdong Microbial Culture Collection Center on Oct. 22, 2021, with a deposit number of GDMCC No. 61962. The deposit has been made under the terms of the Budapest Treaty and all restrictions imposed by the depositor on the availability to the public of the biological material will be irrevocably removed upon the granting of a patent.

The *Bacillus velezensis* provided by the present invention was isolated from agricultural soil collected from a tobacco planting area in Yuxi City, Yunnan Province (39° 54'39.33" north latitude and 116° 24'48.18" east longitude). It was deposited with the Guangdong Microbial Culture Collection Center on Jan. 15, 2021, with a deposit number of GDMCC No. 61434. The deposit address is 5th Floor, No. 59 Building, No. 100 Xianlie Middle Road, Guangzhou.

The isolated strain is a spore-forming Gram-positive bacterium. It was inoculated into Luria-Bertani culture medium and cultured at 30° C. for 1 d. Its colonies were mostly white, with rough surfaces and edges, and a sticky texture. The strain was subjected to 16 S sequence fragment sequencing (the amplification primers and the sequencing primers were both 27F: 5'-AGAGTTT-GATCCTGGCTCAG-3' (SEQ ID NO: 3) and 1492R: 5'-GGTTACCTTGTTACGACTT-3' (SEQ ID NO: 4)). The sequencing result is shown in SEQ ID NO. 1. Through a BLAST homology comparison, the strain was determined to be *Bacillus velezensis* and named *Bacillus velezensis* M173.

(SEQ ID NO: 1)
TCGTAGACGAGCATAATCCGTAGCTTGCTCCCTGATGTTAGCGG

CGGACGGGTGAGTAACACGTGGGTAACCTGCCTGTAAGACTGGGATAA

CTCCGGGAAACCGGGGCTAATACCGGATGGTTGTTTGAACCGCATGGT

TCAGACATAAAAGGTGGCTTCGGCTACCACTTACAGATGGACCCGCGG

CGCATTAGCTAGTTGGTGAGGTAACGGCTCACCAAGGCAACGATGCGT

AGCCGACCTGAGAGGGTGATCGGCCACACTGGGACTGAGACACGGCC

CAGACTCCTACGGGAGGCAGCAGTAGGGAATCTTCCGCAATGGACGA

AAGTCTGACGGAGCAACGCCGCGTGAGTGATGAAGGTTTTCGGATCGT

AAAGCTCTGTTGTTAGGGAAGAACAAGTGCCGTTCAAATAGGGCGGC

ACCTTGACGGTACCTAACCAGAAAGCCACGGCTAACTACGTGCCAGCA

GCCGCGGTAATACGTAGGTGGCAAGCGTTGTCCGGAATTATTGGGCGTA

AAGGGCTCGCAGGCGGTTTCTTAAGTCTGATGTGAAAGCCCCCGGCTC

AACCGGGGAGGGTCATTGGAAACTGGGGAACTTGAGTGCAGAAGAGG

AGAGTGGAATTCCACGTGTAGCGGTGAAATGCGTAGAGATGTGGAGGA

ACACCAGTGGCGAAGGCGACTCTCTGGTCTGTAACTGACGCTGAGGA

GCGAAAGCGTGGGGAGCGAACAGGATTAGATACCCTGGTAGTCCACGC

CGTAAACGATGAGTGCTAAGTGTTAGGGGGTTTCCGCCCCTTAGTGCT

GCAGCTAACGCATTAAGCACTCCGCCTGGGGAGTACGGTCGCAAGACT

GAAACTCAAAGGAATTGACGGGGGCCCGCACAAGCGGTGGAGCATGT

GGTTTAATTCGAAGCAACGCGAAGAACCTTACCAGGTCTTGACATCCT

CTGACAATCCTAGAGATAGGACGTCCCCTTCGGGGGCAGAGTGACAGG

TGGTGCATGGTTGTCGTCAGCTCGTGTCGTGAGATGTTGGGTTAAGTCC

CGCAACGAGCGCAACCCTTGATCTTAGTTGCCAGCATTCAGTTGGGCA

CTCTAAGGTGACTGCCGGTGACAAACCGGAGGAAGGTGGGGATGACG

TCAAATCATCATGCCCCTTATGACCTGGGCTACACACGTGCTACAATGG

ACAGAACAAAGGGCAGCGAAACCGCGAGGTTAAGCCAATCCCACAAA

-continued

TCTGTTCTCAGTTCGGATCGCAGTCTGCAACTCGACTGCGTGAAGCTG

GAATCGCTAGTAATCGCGGATCAGCATGCCGCGGTGAATACGTTCCCGG

GCCTTGTACACACCGCCCGTCTACACCACGAGAGTTTGTAACACCCGA

AGTC.

Samples of *Bacillus pumilus* M101 strain were collected from water in Guangzhou City. Guangdong Province. It was deposited with the Guangdong Microbial Culture Collection Center (GDMCC) on Oct. 22, 2021, with a deposit number of GDMCC No. 61962. The deposit address is 5th Floor, No. 59 Building, No. 1(0) Xianlie Middle Road, Guangzhou.

The isolated strain was plated onto R2A solid culture medium and cultured in an incubator at a constant temperature of 30° C. After 1 day, a single colony was picked up, inoculated onto R2A solid culture medium, and subjected to inverted incubation in an incubator at a constant temperature of 30° C. for 1 day. Then, the colonial morphology was observed, and the bacterial morphology was observed under an optical microscope (1000×).

This strain is a Gram-positive bacterium, and its colonies are opaque, milky white, and round in shape. The strain is rod-shaped, round at ends, present individually or arranged in a short chain, and about 2.0 microns in length. It is motile, and has oval spores of 1.0-1.2×1.5-2.0 microns.

Subsequently, the strain was subjected to 16 S sequence fragment sequencing (the amplification primers and the sequencing primers were 27F: 5'-AGAGTIT-GATCCTGGCTCAG-3' (SEQ ID NO: 3) and 1492R: 5'-GGTTACCTTGTTACGACTT-3' (SEQ ID NO: 4)). The sequencing result is shown in the Sequence listing as SEQ ID NO. 1. It was determined through a 16S rRNA sequence homology analysis, a phylogenetic analysis, and a BLAST homology comparison that the nearest species of this strain was *Bacillus pumilus*, and it was named *Bacillus pumilus* M101.

(SEQ ID NO: 2)
AGTCGAGCGGACAGAAGGGAGCTTGCTCCCGGATGTTAGCGGC

GGACGGGTGAGTAACACGTGGGTAACCTGCCTGTAAGACTGGGATAAC

TCCGGGAAACCGGAGCTAATACCGGATAGTTCCTTGAACCGCATGGTT

CAAGGATGAAAGACGGTTTCGGCTGTCACTTACAGATGGACCCGCGGC

GCATTAGCTAGTTGGTGGGGTAATGGCTCACCAAGGCGACGATGCGTA

GCCGACCTGAGAGGGTGATCGGCCACACTGGGACTGAGACACGGCCC

AGACTCCTACGGGAGGCAGCAGTAGGGAATCTTCCGCAATGGACGAA

AGTCTGACGGAGCAACGCCGCGTGAGTGATGAAGGTTTTCGGATCGTA

AAGCTCTGTTGTTAGGGAAGAACAAGTGCGAGAGTAACTGCTCGCAC

CTTGACGGTACCTAACCAGAAAGCCACGGCTAACTACGTGCCAGCAGC

CGCGGTAATACGTAGGTGGCAAGCGTTGTCCGGAATTATTGGGCGTAA

AGGGCTCGCAGGCGGTTTCTTAAGTCTGATGTGAAAGCCCCCGGCTCA

ACCGGGGAGGGTCATTGGAAACTGGGAAACTTGAGTGCAGAAGAGGA

GAGTGGAATTCCACGTGTAGCGGTGAAATGCGTAGAGATGTGGAGGAA

CACCAGTGGCGAAGGCGACTCTCTGGTCTGTAACTGACGCTGAGGAG

CGAAAGCGTGGGGAGCGAACAGGATTAGATACCCTGGTAGTCCACGCC

-continued

GTAAACGATGAGTGCTAAGTGTTAGGGGGTTTCCGCCCCTTAGTGCTG

CAGCTAACGCATTAAGCACTCCGCCTGGGGAGTACGGTCGCAAGACTG

AAACTCAAAGGAATTGACGGGGGCCCGCACAAGCGGTGGAGCATGTG

GTTTAATTCGAAGCAACGCGAAGAACCTTACCAGGTCTTGACATCCTC

TGACAACCCTAGAGATAGGGCTTTCCCTTCGGGGACAGAGTGACAGGT

GGTGCATGGTTGTCGTCAGCTCGTGTCGTGAGATGTTGGGTTAAGTCCC

GCAACGAGCGCAACCCTTGATCTTAGTTGCCAGCATTTAGTTGGGCAC

TCTAAGGTGACTGCCGGTGACAAACCGGAGGAAGGTGGGGATGACGT

CAAATCATCATGCCCCTTATGACCTGGGCTACACACGTGCTACAATGGA

CAGAACAAAGGGCTGCGAGACCGCAAGGTTTAGCCAATCCCATAAATC

TGTTCTCAGTTCGGATCGCAGTCTGCAACTCGACTGCGTGAAGCTGGA

ATCGCTAGTAATCGCGGATCAGCATGCCGCGGTGAATACGTTCCCGGGC

CTTGTACACACCCCCCGTCACACCACGAGAGTTTGCAACACCCGAAGT

CGGTGAGGTAACCTTTATGGAGCC.

The *Bacillus velezensis* provided by the present invention can effectively and stably prevent and control a plant bacterial disease, plant fungal disease, plant soil-borne disease and/or plant oomycete disease. It has a strong ability to form a biofilm, is easy to colonize, is suitable for industrial production, and has great prospects for commercialization. In addition, the *Bacillus velezensis* provided by the present invention can improve the germination rate of seeds in a soil environment containing a large number of pathogens, and has a good growth-promoting effect.

In preferred embodiments of the present invention, the plant soil-borne disease as described above includes, but is not limited to, the soil-borne disease caused by *Fusarium oxysporum* f. sp. *cucumerinum*, *Ralstonia solanacearum*, *Rhizoctonia solani*, *Fusarium*, *Sclerotium rolfsii*, *Sclerotinia sclerotiorum*, *Botrytis cirerea*, *Fusarium oxysporum*. sp. *cucumebrium Owen*, *Gaeumannomyces critici*, *Fusarium graminearum*, *Valsa mali*, *Glomerella cingulata*, *Rhizoctonia solani*, *Pyricularia grisea*, *Alternaria solani*, *Exserohilum turcicum*, *Bipolaria maydis*, *Phytophthora capsici*, and/or *Phytophthora nicotianae*.

In an alternative embodiment, the *Fusarium* is *Fusarium graminearum*.

In an alternative embodiment, the application temperature is 2-40° C. In a yet alternative embodiment, the application temperature is 20-35° C.

In preferred embodiments of the present invention, the plant bacterial disease as described above includes, but is not limited to, the bacterial disease caused by *Ralstonia solanacearum*, *Bacillus subtilis*, *Pseudomonas syringae*. *Xanthomonas campestris*, *Erwinia carotorora*, *Xanthomonas campestris*), and/or *Erwinia carotovora*.

In an alternative embodiment, the application temperature is 2-40° C. In a yet alternative embodiment, the application temperature is 20-35° C.

In preferred embodiments of the present invention, the plant fungal disease or plant oomycete disease as described above includes, but is not limited to, the plant disease caused by *Rhizoctonia solani*, *Fusarium*, *Sclerotinia sclerotiorum*, *Fusarium oxysporum* f sp. *cucumerinum*, *Botrytis cirerea*, *Fusarium oxysporum*. sp. cucumebrium *owen*, *Gaeumannomyces critici*, *Fusarium graminearum*, *Valsa mali*, *Glom-*

*erella cingulata, Rhizoctonia solani, Pyricularia grisea, Alternaria solani, Botrytis cirerea, Phytophthora infestans, Exserohilum turcicum, Bipolaria maydis, Fusarium oxysporum* f. sp. *niveum, Verticillium dahlia, Fusarium oxysporum* f. sp. *vasinfectum, Phytophthora capsici,* and/or *Phytophthora nicotianae.*

In an alternative embodiment, the *Fusarium* is *Fusarium graminearum.*

In an alternative embodiment, the application temperature is 2-40° C. In a yet alternative embodiment, the application temperature is 20-35° C., such as 28 or 30° C.

The present invention further provides:

use of a microbial agent composition for promoting plant growth, wherein the microbial agent composition includes *Bacillus velezensis* and *Bacillus pumilus* M101; wherein the bacterial strain of the *Bacillus velezensis* was deposited with the Guangdong Microbial Culture Collection Center on Jan. 15, 2021, with a deposit number of GDMCC No. 61434; and the *Bacillus pumilus* M101 was deposited with the Guangdong Microbial Culture Collection Center on Oct. 22, 2021, with a deposit number of GDMCC No. 61%2.

In preferred embodiments of the present invention, the plant as described above is a crop of the Gramineae or an economic crop.

In an alternative embodiment, the crop of the Gramineae includes, but is not limited to, corn, wheat, rice, sorghum, barley, oat, rye, millet, proso millet, barnyard millet, and buckwheat.

The economic crop is selected from at least one of Solanaceae, Rosaceae, Rutaceae, Musaceae, Cucurbitaceae, Fabaceae, Asteraceae, Liliaceae, Zingiberaceae, Passifloraceae, Bromeliaceae, Araliaceae and Cactaceae.

In an alternative embodiment, the crop of the Solanaceae is selected from at least one of potato, pepper and tomato; the crop of the Rosaceae is selected from at least one of strawberry and papaya; the crop of the Rutaceae is selected from citrus; the crop of the Musaceae is selected from banana; the crop of the Cucurbitaceae is selected from cucumber; the crop of the Fabaceae is selected from soybean; the crop of the Asteraceae is selected from lettuce; the crop of the Liliaceae is selected from garlic; the crop of the Zingiberaceae is selected from ginger; the crop of the Passifloraceae is selected from passion fruit; the crop of the Bromeliaceae is selected from golden pineapple; the crop of the Araliaceae is selected from *Panax notoginseng*; and the crop of the Cactaceae is selected from pitaya.

It should be noted that the above crop types are only several alternative types listed by the inventors. In other embodiments, adaptive adjustments can be made as needed and are not limited to the above-mentioned crop types.

In an alternative embodiment, the mixing volume ratio of *Bacillus velezensis* to *Bacillus pumilus* M101 in the microbial agent composition is 1-2:1-2. The mixing volume ratio of *Bacillus velezensis* to *Bacillus pumilus* M101 in the microbial agent composition is 2:1. The composition of this ratio can significantly reduce the mortality rate of a plant and has excellent biocontrol potential against a plant bacterial disease, plant fungal disease, plant soil-borne disease and plant oomycete disease.

The present invention also provides a microbial agent, including *Bacillus velezensis* and *Bacillus pumilus* M101; wherein the bacterial strain of the *Bacillus velezensis* was deposited with the Guangdong Microbial Culture Collection Center on Jan. 15, 2021, with a deposit number of GDMCC No. 61434; and the *Bacillus pumilus* M101 was deposited with the Guangdong Microbial Culture Collection Center on Oct. 22, 2021, with a deposit number of GDMCC No. 61%2.

Preferably, the microbial agent is a fermentation culture of the *Bacillus velezensis* and the *Bacillus pumilus* M101, and the mixed concentration of the *Bacillus velezensis* and the *Bacillus pumilus* M101 in the fermentation culture is $10^6$-$10^{10}$ CFU/mL, such as $10^6$, $10^7$, $10^8$, $10^9$, or $10^{10}$ CFU/mL.

The present invention also provides a seed-coating microbial agent, including a seed-coating agent and the microbial agent as described above. The seed-coating microbial agent can improve the germination rate of seeds in a soil environment containing a large number of pathogens, and has a good growth-promoting effect.

The mixing volume ratio of the seed-coating agent to the microbial agent is 8-10:1. Preferably, the $OD_{600}$ value of *Bacillus velezensis* in the microbial agent is 0.8-10, and the $OD_{600}$ value of *Bacillus pumilus* M101 in the microbial agent is 0.8-10.

In an alternative embodiment, the above seed-coating agent has the following formula: sucrose 5%, PVPK3010%. PEG 3%, dispersant MF 2%, and polyethylene glycol 5%. Each component is provided according to mass fraction.

It is prepared as follows: first, the above proportion of PVPK30 and a small amount of water are added to a 50 mL centrifuge tube, and dissolved while shaking; then, other reagents are added according to the above proportions, dissolved completely, and adjusted to volume to afford the desired seed-coating agent.

The present invention also provides a root-irrigating agent or seed-soaking agent, including the microbial agent as described above. In other embodiments, the root-irrigating agent can also be a root-soaking agent.

In an alternative embodiment, the seed-soaking agent or root-irrigating agent refers to a culture solution of *Bacillus velezensis* and *Bacillus pumilus* M101, or a freeze-dried powder of *Bacillus velezensis* and *Bacillus pumilus* M101.

In other embodiments, the seed-soaking agent or root-irrigating agent as described above can also be a suspension, emulsion, or solution of *Bacillus velezensis* and *Bacillus pumilus* M101.

In an alternative embodiment, the concentration of *Bacillus velezensis* in the culture solution is $10^7$-$10^8$ CFU/mL, and the concentration of *Bacillus pumilus* M101 in the culture solution is $10^7$-$10^8$ CFU/mL.

The inventors found that treating plant seedlings such as tomato seedlings by soaking their roots with the above root-soaking agent can effectively prevent and control tomato bacterial wilt, with a control effect even better than that of neophytomycin, a traditional chemical pesticide. Therefore, it can be used to replace or partially replace traditional chemical pesticides, and has broad prospects for commercialization.

Disclosed herein is use of a microbial agent in the manufacture of a seed-coating microbial agent, a root-irrigating agent or a seed-soaking agent.

As compared to the prior art, the present invention offers the following beneficial effects:

The *Bacillus velezensis* and *Bacillus pumilus* M101 provided by the present invention can effectively and stably prevent and control a plant bacterial disease, plant fungal disease, plant soil-borne disease and/or plant oomycete disease. They have a strong ability to form a biofilm, are easy to colonize, are suitable for industrial production, and have great prospects for commercialization. In addition, the *Bacillus velezensis* and *Bacillus pumilus* M101 provided by the present invention can improve the germination rate of seeds in a soil environment containing a large number of pathogens, and have a good growth-promoting effect.

Moreover, treating plants by soaking their roots with the *Bacillus velezensis* and *Bacillus pumilus* MIO provided by the present invention can effectively prevent and control plant diseases, with a control effect even better than that of traditional chemical pesticides. Therefore, they can be used to replace or partially replace traditional chemical pesticides, and have broad prospects for commercialization.

Beneficial Effects of the Present Invention

The *Bacillus velezensis* M173 of the present invention has relatively outstanding strain characteristics. Specifically, it (1) has a relatively strong ability to secrete siderophores; (2) has a strong ability to form a biofilm; (3) can result in a stable viable bacterial count and a long shelf-life (M173 grows fast and is not prone to autolysis during fermentation), (4) can produce a variety of amino acids and hormones to promote the resistance of plants to pathogens; (5) can produce a series of cyclopeptide compounds to help plants resist fungal, bacterial and disease infections; (6) has relatively strong acid and alkali resistance and high salt resistance; (7) has a growth-promoting effect on plants and has a high safety factor; (8) is compatible with common fungicides, insecticides and fertilizers in the market; (9) can improve the stress resistance (e.g., salt resistance, low temperature resistance, or drought resistance) of crops; (10) can alleviate the damage to crops by pesticides; and (11) has a synergistic growth-promoting effect when used together with humic acid.

Furthermore, after the *Bacillus velezensis* M173 of the present invention is prepared into a seed-coating agent, it can promote the growth and germination of plants, and significantly improve the control effect on pathogens. Moreover, it can relieve the condition of dead seedlings of crops at seedling stage after being applied to the crops. In particular, both pot experiments and field experiments prove that the *Bacillus velezensis* M173 of the present invention has a significant control effects on fungal and bacterial diseases, in particular, bacterial wilt and stem rot. Therefore, the *Bacillus velezensis* M173 of the present invention has broad application prospects.

The embodiments of the present invention will be described in detail below with reference to the accompanying drawings and Examples. However, those skilled in the art will understand that the following drawings and Examples are only used to illustrate the present invention and are not intended to limit the scope of the present invention. Various objects and advantageous aspects of the present invention will become apparent to those skilled in the art from the accompanying drawings and the following detailed description of preferred embodiments.

BRIEF DESCRIPTION OF THE DRAWINGS

FIG. 18 shows the growth status of peanut seedlings coated with *Bacillus velezensis* M173.

FIG. 19 shows the situation of peanut seeds coated with *Bacillus velezensis* M173.

Sequence Information

Figure 1:
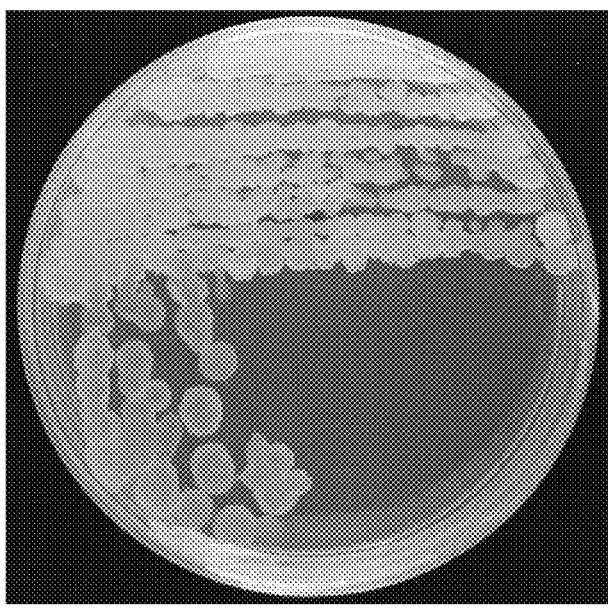
FIG. 1 shows the colonial morphology of the M173 strain on LB culture medium.

Information on some sequences involved in the present invention is provided in the table below.

Description of the Sequences:

| SEQ ID NO: | Description | Sequence |
|---|---|---|
| 1 | Reference sequence 1 | TCGTAGACGAGCATAATCCGTAGCTTGCTCCCTGATGT TAGCGGCGGACGGGTGAGTAACACGTGGGTAACCTG CCTGTAAGACTGGGATAACTCCGGGAAACCGGGGCT AATACCGGATGGTTGTTTGAACCGCATGGTTCAGACA TAAAAGGTGGCTTCGGCTACCACTTACAGATGGACCC GCGGCGCATTAGCTAGTTGGTGAGGTAACGGCTCACC AAGGCAACGATGCGTAGCCGACCTGAGAGGGTGATC GGCCACACTGGGACTGAGACACGGCCCAGACTCCTA CGGGAGGCAGCAGTAGGGAATCTTCCGCAATGGACG AAAGTCTGACGGAGCAACGCCGCGTGAGTGATGAAG GTTTTCGGATCGTAAAGCTCTGTTGTTAGGGAAGAAC AAGTGCCGTTCAAATAGGGCGGCACCTTGACGGTACC TAACCAGAAAGCCACGGCTAACTACGTGCCAGCAGC CGCGGTAATACGTAGGTGGCAAGCGTTGTCCGGAATT ATTGGGCGTAAAGGGCTCGCAGGCGGTTTCTTAAGTC TGATGTGAAAGCCCCCGGCTCAACCGGGGAGGGTCA TTGGAAACTGGGGAACTTGAGTGCAGAAGAGGAGA GTGGAATTCCACGTGTAGCGGTGAAATGCGTAGAGAT GTGGAGGAACACCAGTGGCGAAGGCGACTCTCTGGT CTGTAACTGACGCTGAGGAGCGAAAGCGTGGGGAGC GAACAGGATTAGATACCCTGGTAGTCCACGCCGTAAA CGATGAGTGCTAAGTGTTAGGGGGTTTCCGCCCCTTA GTGCTGCAGCTAACGCATTAAGCACTCCGCCTGGGGA GTACGGTCGCAAGACTGAAACTCAAAGGAATTGACG GGGGCCCGCACAAGCGGTGGAGCATGTGGTTTAATTC GAAGCAACGCGAAGAACCTTACCAGGTCTTGACATC CTCTGACAATCCTAGAGATAGGACGTCCCCTTCGGGG GCAGAGTGACAGGTGGTGCATGGTTGTCGTCAGCTC GTGTCGTGAGATGTTGGGTTAAGTCCCGCAACGAGC GCAACCCTTGATCTTAGTTGCCAGCATTCAGTTGGGC ACTCTAAGGTGACTGCCGGTGACAAACCGGAGGAAG GTGGGGATGACGTCAAATCATCATGCCCCTTATGACC TGGGCTACACACGTGCTACAATGGACAGAACAAAGG GCAGCGAAACCGCGAGGTTAAGCCAATCCCACAAAT CTGTTCTCAGTTCGGATCGCAGTCTGCAACTCGACTG CGTGAAGCTGGAATCGCTAGTAATCGCGGATCAGCAT GCCGCGGTGAATACGTTCCCGGGCCTTGTACACACCG CCCGTCTACACCACGAGAGTTTGTAACACCCGAAGTC |
| 2 | Reference sequence 2 | AGTCGAGCGGACAGAAGGGAGCTTGCTCCCGGATGT TAGCGGCGGACGGGTGAGTAACACGTGGGTAACCTG CCTGTAAGACTGGGATAACTCCGGGAAACCGGAGCT AATACCGGATAGTTCCTTGAACCGCATGGTTCAAGGA TGAAAGACGGTTTCGGCTGTCACTTACAGATGGACCC GCGGCGCATTAGCTAGTTGGTGGGGTAATGGCTCACC AAGGCGACGATGCGTAGCCGACCTGAGAGGGTGATC GGCCACACTGGGACTGAGACACGGCCCAGACTCCTA CGGGAGGCAGCAGTAGGGAATCTTCCGCAATGGACG AAAGTCTGACGGAGCAACGCCGCGTGAGTGATGAAG GTTTTCGGATCGTAAAGCTCTGTTGTTAGGGAAGAAC AAGTGCGAGAGTAACTGCTCGCACCTTGACGGTACCT AACCAGAAAGCCACGGCTAACTACGTGCCAGCAGCC GCGGTAATACGTAGGTGGCAAGCGTTGTCCGGAATTA TTGGGCGTAAAGGGCTCGCAGGCGGTTTCTTAAGTCT GATGTGAAAGCCCCCGGCTCAACCGGGGAGGGTCAT TGGAAACTGGGAAACTTGAGTGCAGAAGAGGAGAG TGGAATTCCACGTGTAGCGGTGAAATGCGTAGAGATG TGGAGGAACACCAGTGGCGAAGGCGACTCTCTGGTC TGTAACTGACGCTGAGGAGCGAAAGCGTGGGGAGCG AACAGGATTAGATACCCTGGTAGTCCACGCCGTAAAC GATGAGTGCTAAGTGTTAGGGGGTTTCCGCCCCTTAG TGCTGCAGCTAACGCATTAAGCACTCCGCCTGGGGAG TACGGTCGCAAGACTGAAACTCAAAGGAATTGACGG GGGCCCGCACAAGCGGTGGAGCATGTGGTTTAATTCG AAGCAACGCGAAGAACCTTACCAGGTCTTGACATCC TCTGACAACCCTAGAGATAGGGCTTTCCCTTCGGGGA CAGAGTGACAGGTGGTGCATGGTTGTCGTCAGCTCGT GTCGTGAGATGTTGGGTTAAGTCCCGCAACGAGCGC AACCCTTGATCTTAGTTGCCAGCATTTAGTTGGGCACT CTAAGGTGACTGCCGGTGACAAACCGGAGGAAGGTG GGGATGACGTCAAATCATCATGCCCCTTATGACCTGG GCTACACACGTGCTACAATGGACAGAACAAAGGGCT GCGAGACCGCAAGGTTTAGCCAATCCCATAAATCTGT TCTCAGTTCGGATCGCAGTCTGCAACTCGACTGCGTG AAGCTGGAATCGCTAGTAATCGCGGATCAGCATGCCG CGGTGAATACGTTCCCGGGCCTTGTACACACCGCCCG |

| SEQ ID NO: | Description | Sequence |
|---|---|---|
| | | TCACACCACGAGAGTTTGCAACACCCGAAGTCGGTG AGGTAACCTTTATGGAGCC |
| 3 | Primer 27F | AGAGTTTGATCCTGGCTCAG |
| 4 | Primer 1492R | GGTTACCTTGTTACGACTT |

DETAILED DESCRIPTION OF THE DISCLOSURE

The present invention will now be described with reference to the following Examples, which are intended to illustrate the present invention rather than to limit the present invention. Those skilled in the art will appreciate that the Examples describe the present invention by way of examples and are not intended to limit the scope of protection of the present invention.

Example 1

This example provides methods for screening and identifying *Bacillus velezensis* M173 strain.
Screening of M173 Strain:

*Bacillus velezensis* M173 was isolated from agricultural soil collected from a tobacco planting area in Yuxi City, Yunnan Province (39° 54'39.33" north latitude and 116° 24'48.18" east longitude).

5 g of soil was weighed. 45 mL of sterile water was added, and then shaken on a vortex shaker for 5 min. Then, it was serially diluted to $10^{-1}$-$10^{-6}$. The bacterial solutions at the three gradients of $10^{-4}$, $10^{-5}$ and $10^{-6}$ were used for plating onto Luria-Bertani (LB) solid culture medium (5 g of yeast extract, 10 g of casein tryptone, 10 g of sodium chloride, 15 g of agar, and 1 L of water, pH=7). Each plating was conducted in triplicate. After 4 days of inverted incubation in an incubator at a constant temperature of 30° C., a strain with a single colony was picked out and streaked onto a new LB plate. It was cultured at 30° C. for 1 day to obtain a pure culture of the strain, which was stored in a glycerin tube in a −80° C. refrigerator.
Identification of M173 Strain:

The isolated strain was inoculated into Luria-Bertani culture medium and cultured at 30° C. for 1 d. The morphology is shown in FIG. 1. The strain was identified to be a spore-forming Gram-positive bacterium. Its colonies were mostly white, with rough surfaces and edges, and a sticky texture.

Subsequently, the strain was subjected to 16 S sequence fragment sequencing (the amplification primers and the sequencing primers were 27F: 5'-AGAGTTT-GATCCTGGCTCAG-3' (SEQ ID NO: 3) and 1492R: 5'-GGTTACCTTGTTACGACTT-3' (SEQ ID NO: 4)). The sequencing result is shown in SEQ ID NO: 1. Through a BLAST homology alignment, the strain was determined to be *Bacillus velezensis* and named *Bacillus velezensis* M173. The *Bacillus velezensis* M173 was deposited with the Guangdong Microbial Culture Collection Center (GDMCC) at 5th Floor. No. 59 Building, No. 100 Xianlie Middle Road, Guangzhou, on Jan. 15, 2021, with a deposit number of GDMCC No. 61434.

Example 2

1. Isolation and Purification of *Bacillus pumilus* M101 Strain

Samples were collected from water in Guangzhou city, Guangdong Province.

4 mL of a water source sample was pipetted into 36 mL of sterilized water containing Tween at a concentration of 0.1% (v/v), and vortexed for 10 min to obtain a diluted solution at a concentration of $10^{-1}$. The diluted solution was serially diluted with Tween water to concentrations of $10^{-4}$, $10^{-5}$ and $10^{-6}$, then plated onto R2A solid culture medium, and cultured in an incubator at a constant temperature of 30° C. After 1 day, a single colony was picked up, inoculated on R2A solid culture medium, and subjected to inverted incubation in an incubator at a constant temperature of 30° C. for 1 day. Then, the colonial morphology was observed, and the bacterial morphology was observed under an optical microscope (1000×).

R2A solid culture medium: water was added to 18.1 g of R2A agar culture medium powder (Guangdong HuanKai Biology Co., Ltd.) to 1 L, and autoclaved at 121° C. for 20 min.
2. Identification of *Bacillus pumilus* M101 Strain This strain is a Gram-positive bacterium, and its colonies are opaque, milky white, and round in shape. The strain is rod-shaped, round at ends, present individually or arranged in a short chain, and about 2.0 microns in length. It is motile, and has oval spores of 1.0-1.2×1.5-2.0 microns.

Subsequently, the strain was subjected to 16S sequence fragment sequencing (the amplification primers and the sequencing primers were 27F: 5'-AGAGTTT-GATCCTGGCTCAG-3' 3' (SEQ ID NO: 3) and 1492R: 5'-GGTTACCTFGTTACGACTT-3' 3' (SEQ ID NO; 4)). The sequencing result is shown in the Sequence listing as SEQ ID NO: 1. It was determined through a 16S rRNA sequence homology analysis, a phylogenetic analysis, and a BLAST homology comparison that the nearest species of this strain was *Bacillus pumilus*, and it was named *Bacillus pumilus* M101. The *Bacillus pumilus* M101 was deposited with the Guangdong Microbial Culture Collection Center (GDMCC) at 5th Floor, No. 59 Building, No. 100 Xianlie Middle Road, Guangzhou, on Oct. 22, 2021, with a deposit number of GDMCC No. 61962.

Example 3

In this example, a fermentation culture of *Bacillus velezensis* M173 was prepared.

The M173 strain obtained in Example 1 was activated, and then subjected to liquid fermentation to prepare a fermentation culture. This fermentation culture method is simple and easy to operate, and is suitable for industrial production.

a. Activation of *Bacillus velezensis* M173 Strain

LB solid culture medium (10 g of tryptone, 5 g of yeast powder, 10 g of NaCl, 15 g of agar powder, and water added to 1 L) was autoclaved at 121° C. for 20 min. The M173 strain stored in a −80° C. refrigerator was spread on an LB plate and cultured at 30° C. for 1 day. A single colony of M173 grown on the LB plate was picked up, inoculated into LB liquid culture medium (10 g of peptone, 5 g of yeast powder, 5 g of sodium chloride, 1 g of glucose, and water added to 1 L, sterilize at 121° C. for 20 min), and cultured at 30° C. for 1 day to obtain the M173 strain.

b. Liquid Fermentation of M173 Strain 1 mL of the M173 strain was inoculated into LB liquid culture medium, and aseptically cultured on a shaker at 30° C. for 1 day to obtain a fermentation culture.

Example 4

In this example, a fermentation culture of *Bacillus pumilus* M101 was prepared.

The *Bacillus pumilus* M101 strain obtained in Example 2 was activated, and then subjected to liquid fermentation to prepare a fermentation culture. This fermentation culture method is simple and easy to operate, and is suitable for industrial production.

a. Activation of *Bacillus pumilus* M101 Strain.

LB solid culture medium (10 g of tryptone, 5 g of yeast powder, 10 g of NaCl, 15 g of agar powder, and water added to 1 L) was autoclaved at 121° C. for 20 min. The M173 strain stored in a −80° C. refrigerator was spread on an LB plate and cultured at 30° C. for 1 day. A single colony of M173 grown on the LB plate was picked up, inoculated into LB liquid culture medium (10 g of peptone, 5 g of yeast powder, 5 g of sodium chloride, 1 g of glucose, and water added to 1 L, sterilize at 121° C. for 20 min), and cultured at 30° C. for 1 day to obtain the M173 strain.

b. Liquid Fermentation of M101 Strain 1 mL of the M101 strain was inoculated into LB liquid culture medium, and aseptically cultured on a shaker at 30° C. for 1 day to obtain a fermentation culture.

Example 5

In this example, an experiment was conducted to verify the leaf-cutting biocontrol effects of M173, M101 and a combination thereof on *Ralstonia solanacearum* MN R.s1 strain.

(1) Preparation of R.s Suspension:

*Ralstonia solanacearun* MN R.s1 (stored in the Moon's Biobank) was activated from a glycerol tube to a TTC plate (5 g of glucose, 10 g of peptone, 1 g of casein hydrolysate, 15 g of agar, water added to 1 L, sterilized at 121° C. for 20 min, cooled to 60° C., and then TTC was added to a final concentration of 0.005% (W/V)). After culturing for 2 d, an R.s colony with a high activity was selected and transferred to SPA liquid culture medium (20 g of sucrose, 5 g of bacteriological peptone, 0.5 g of $K_2HPO_4$, 0.25 g of $MgSO_4$, water added to 1 L, adjusted to pH 7.0-7.2, and sterilized at 121° C. for 20 min), and cultured on a shaker for 8-16 h. Then, the R.s was diluted to $10^7$ CFU/mL according to the absorbance at $OD_{600}$ to prepare an R.s suspension for later use.

(2) Preparation of an M173 Microbial Agent:

The M173 strain fermentation culture prepared in Example 3 was measured for the absorbance at $OD_{600}$ using a spectrophotometer, and adjusted to a concentration of $10^8$ CFU/mL with LB liquid culture medium, to obtain an M173 microbial agent.

(3) Preparation of an M101 Microbial Agent

The M101 strain fermentation culture prepared in Example 4 was measured for the absorbance at $OD_{600}$ using a spectrophotometer, and adjusted to a concentration of $10^8$ CFU/mL with LB liquid culture medium, to obtain an M101 microbial agent.

(4) Preparation of a Microbial Agent of M173 and M101

The M173 and M101 microbial agents prepared in the above steps were formulated to three concentrations of 1:1, 2:1, and 1:2 (v/v), respectively, and mixed well.

(5) Treatment of Tomato Seedlings:

11-day-old tomato seedlings were thinned out to 10 plants/pot, and then leaf-cutting was performed to preliminarily judge the biocontrol effect of M173 on R.s. According to the different solutions for soaking the scissors used for leaf-cutting, a blank control group, a negative control group, a positive control group and microbial agent treatment groups were set up, respectively, with 3 replicates each group. Before leaf-cutting of each tomato seedling, sterile scissors were soaked in the soaking solution corresponding to each group for 1 second, and then a half of the cotyledon of the tomato seedling was cut off with the soaked scissors. Then, the pots with the tomato seedlings with leaves cut were cultivated in a disease-inducing greenhouse at a temperature of 30° C. and an elevated humidity for 7 d. From day 4 after leaf cutting, the number of dead tomato seedlings was recorded every day, and the mortality rate and relative control effect were calculated.

The soaking solutions used in each group were as follows:

40 mL of clear water was used in the blank control group.

20 mL of clear water and 20 mL of the R.s suspension were mixed well and used in the negative control group.

20 mL of a 1000× dilution of neophytomycin and 20 mL of the R.s suspension were mixed well and used in the positive control group.

There were 5 microbial agent treatment groups. 20 mL of the microbial agent prepared in step (3) or step (4) and 20 mL of the R.s suspension were mixed well and used in the treatment groups.

$$\text{Relative control effect} = (\text{Mortality of the negative control group} -$$
$$\text{Mortality of the treatment group})/$$
$$\text{Mortality of the negative control group} \times 100\%.$$

Figure 2:
FIG. 2 shows the leaf-cutting biocontrol effect of an M173 microbial agent on bacterial wilt.

The statistical results of the mortality rate and relative control effect are shown in Table 1. The leaf-cutting biocontrol effect of the M173 microbial agent on bacterial wilt is shown in FIG. 2. The results showed that under the leaf-cutting system, the mortality rate of tomato seedlings in the *Bacillus velezensis* M173 treatment group was 18.12%, which was lower than that of the negative control group (87.78%), but still higher than that of the positive control group (16.67%). The mortality rate of tomato seedlings in the M101 microbial agent treatment group was 65.01%, indicating a slightly poor control effect. In addition, the control effects on bacterial wilt of the three microbial agent mixture treatment groups, especially the 2:1 group, were all higher than that of the positive control group. This suggests that the effect of M173 mixed with M101 is better than that of a single agent. The mixed microbial agent can significantly reduce the mortality rate of tomato seedlings and has a very good biocontrol potential for tomato bacterial wilt.

TABLE 1

Leaf-cutting biocontrol effects on bacterial wilt in the treatment groups

| Group | Mortality/% | Relative control effect/% |
|---|---|---|
| Blank control group | 0.00 | — |
| Negative control group | 87.78 | — |
| Positive control group | 16.67 | 81.01 |
| M173 | 18.12 | 79.36 |
| M101 | 65.01 | 25.94 |
| 1:2 | 16.23 | 81.51 |
| 2:1 | 10.11 | 88.48 |
| 1:1 | 17.72 | 79.81 |

Example 6

In this example, an experiment was conducted to verify the drip-irrigation biocontrol effects of *Bacillus velezensis* M173 strain, *Bacillus pumilus* M101 strain, and a combination thereof on *Ralstonia solanacearum* R.s. The *Ralstonia solanacearum* pathogen used in this example was selected from the Moon's Biobank, with a pathogen number of MN R.s1 (*Ralstonia solanacearum*).

An R.s suspension, an M173 microbial agent, an M101 microbial agent, and microbial agents of M173 and M101 (at volume ratios of 1:1, 2:1, and 1:2, respectively) were prepared according to the method of Example 5 for later use.

(1) Treatment of Tomato Seedlings

The soil on the root surface of 20-day-old tomato seedlings were gently shaken off, and their roots were soaked in a treatment solution for 10 min. Then, they were planted in sterilized soil, one plant per pot. 6 pots were used for each treatment, with 5 replicates. According to the different treatment solutions, a blank control group, a negative control group, a positive control group and microbial agent treatment groups were set up. The treatment solution used in the blank control group and the negative control group was clear water, and the treatment solution used in the positive control group was a 1000× dilution of neophytomycin. There were 5 microbial agent treatment groups, in which the M173 microbial agent, M101 microbial agent, and microbial agents of M173 and M101 (at volume ratios of 1:1, 2:1, and 1:2, respectively) were used as treatment solutions. The potted plants were placed in an environment of 25-28° C. to allow for seedling recovery for 7 d. Then, a garden spade was inserted into the soil around the roots to damage the tomato roots and cause wounds. Then, each seedling in the negative control group, positive control group and microbial agent treatment groups was irrigated with 50 mL of the R.s suspension, and the seedling in the blank control group was irrigated with an equal amount of clear water.

(2) Observations

Starting from occurrence of the first sign of a symptom (a bacterial wilt symptom for tomato seedlings) (generally occurred 5 days after drip irrigation), the status of tomato seedlings was observed and recorded once a day (the disease situation was recorded according to the grading standard). On days 10-13 (according to the actual disease situation), the number of plants at each disease grade for each treatment was recorded, and the morbidity rate and disease index were calculated according to the following formulae.

Plant disease grades were divided into the following five grades:

Grade 0: No symptom
Grade 1: Wilting of one leaf
Grade 2: Wilting of 2-3 leaves
Grade 3: Whole plant wilting
Grade 4: Plant death Disease index (%) =

$$\left(\sum(\text{Number of plants at each disease grade} \times \text{Value of the grade})/\right.$$

$$\left.(\text{Total number of plants} \times \text{Value of the highest grade})\right) \times 100\%.$$

Control effect (%) =

$$\left((\text{Disease index of the negative control group} - \text{Disease}\right.$$

$$\text{index of the experimental group})/$$

$$\left.\text{Disease index of the negative control group}\right) \times 100\%.$$

Figure 3:
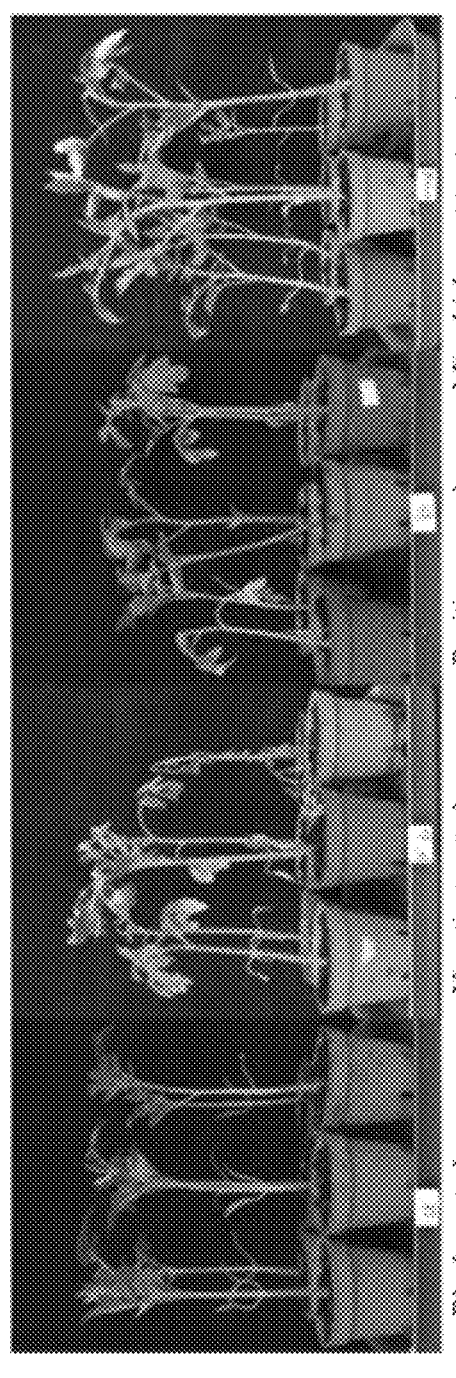
FIG. 3 shows the drip-irrigation biocontrol effect of *Bacillus velezensis* M173 strain on bacterial wilt.

As shown in Table 2 and FIG. 3, the tomato seedlings in the negative control group had a morbidity rate of 41.7% after infection with *Ralstonia solanacearum* R.s because their roots were only soaked in clear water without any pesticide ingredients. The tomato seedlings showed severe wilting and even whole plant death. As compared to the negative control group, the tomato seedlings in the microbial agent treatment groups grew better. The plant morbidity rate (12.12%) of the 2:1 group was 70.94% lower than that of the negative control group, and the control effect on bacterial wilt was as high as 65.02%, which was better than that of the positive control group (37.30%). The results show that treatment of tomato seedlings by root soaking with a mixture of M173 and M101 in an appropriate ratio can effectively control tomato bacterial wilt, with a control effect even better than that of neophytomycin, a traditional chemical pesticide. The microbial agent can be used to replace or partially replace traditional chemical pesticides, and has broad prospects for commercialization.

TABLE 2

Drip-irrigation biocontrol effects on bacterial wilt in the treatment groups

| Group | Morbidity/% | Disease index/% | Control effect/% |
|---|---|---|---|
| Blank control group | 0.00 | 0.00 | — |
| Negative control group | 41.70 | 22.33 | — |
| Positive control group | 16.70 | 14.00 | 37.30 |
| M173 | 21.33 | 15.86 | 28.97 |
| M101 | 32.15 | 17.12 | 23.33 |
| 1:2 | 15.66 | 18.22 | 18.41 |
| 2:1 | 12.12 | 7.81 | 65.02 |
| 1:1 | 17.89 | 13.44 | 39.81 |

Example 7

In this example, an experiment was conducted to verify the biocontrol effects of 10 *Bacillus velezensis* M173 strain. *Bacillus pumilus* M101 strain and a combination thereof on *Fusarium graminearum* in wheat.

(1) Preparation of F.g Suspension:

*Fusarium graminearum* (stored in the Moon's Biobank) was activated on a PDA plate and cultured at 28° C. for 5 d. It was then cultured in CMC culture medium (15 g of CMC-Na, 1 g of NH$_4$NO$_3$, 1 g of yeast extract, 0.5 g of MgSO$_4$·7H$_2$O, 1 g of KH$_2$PO$_4$, and water added to 1 L, sterilized at 121° C. for 20 min) at 25-28° C. and 200 rpm for 7 d, and then filtered with gauze to obtain a spore suspension. It was counted with a hemocytometer, and then prepared into a spore suspension at a concentration of 10$^6$ CFU/mL.

(2) Preparation of Seed-Coating Agent

Formula: sucrose 5%, PVPK3010%, PEG 3%, dispersant MF 2%, and polyethylene glycol 5%. Each component was provided according to mass fraction.

First, the above proportion of PVPK30 and a small amount of water were added to a 50 mL centrifuge tube, and dissolved while shaking; then, other reagents were added in proportion, dissolved completely, and adjusted to volume to obtain the desired seed-coating agent.

(3) Preparation of Seed-Coating Microbial Agent

The M173 strain fermentation culture and M101 strain fermentation culture obtained in Example 3 and Example 4 were measured for the absorbance at OD$_{600}$ with a spectrophotometer, and adjusted to an OD$_{600}$ value of 1 with LB liquid culture medium, to afford an M173 microbial solution and an M101 microbial solution, respectively. The resulting M173 microbial solution and M101 microbial solution were mixed at volume ratios of 1:1, 2:1, and 1:2 to obtain mixed microbial solutions of M173 and M101 for later use.

40 μL of each of the above microbial solutions was mixed with 360 μL of the seed-coating agent to obtain an M173 seed-coating microbial agent, M101 seed-coating microbial agent and 3 groups of mixed seed-coating microbial agents, respectively. A control seed-coating agent was prepared by mixing an equal amount of LB liquid culture medium instead of the fermentation culture with an equal amount of the seed-coating agent.

(4) Seed Treatment

A blank control group, a negative control group and microbial agent treatment groups were set up. In the microbial agent treatment groups, wheat seeds (Jimai 23) were coated with the seed-coating microbial agent (400 μL of seed-coating microbial agent/20 g of wheat) to allow M173 and/or M101 to adhere to the surface of the seeds. The seeds in the blank control group were not treated, and the seeds in the negative control group were coated with the control seed-coating agent.

(5) Soil Preparation

Sterile soil was added to each seedling pot. For the negative control group and the microbial agent treatment groups, the sterile soil was mixed with 20 mL of the F.g suspension in advance. For the blank control group, the sterile soil was mixed with an equal amount of clear water. Then, the coated seeds were planted into the seedling pots.

The germination rate of wheat was calculated after germination, and the disease situation of wheat was recorded after 14 days.

The specific disease grading was as follows:

Grade 0, No disease;

Grade 1, mild symptom on the first leaf sheath (there are brown stripes to blackening on the first leaf sheath, but the degree of blackening does not exceed 50%);

Grade 2, serious disease on the first leaf sheath (the degree of blackening of the first leaf sheath exceeds 50%);

Grade 3, mild symptom on the second leaf sheath (there are brown stripes to blackening on the second leaf sheath, but the degree of blackening does not exceed 50%);

Grade 4, serious disease on the second leaf sheath (the degree of blackening of the second leaf sheath exceeds 50%);

Grade 5, mild symptom on the third leaf sheath (there are brown stripes to blackening on the third leaf sheath, but the degree of blackening does not exceed 50%);

Grade 6: serious disease on the third leaf sheath to near death of the plant

Figure 4:
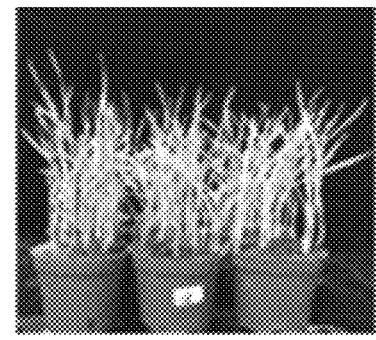
FIG. 4 shows the biocontrol effect of *Bacillus velezensis* M173 strain on *Fusarium graminearum*.
Figure 4:
Figure 4:
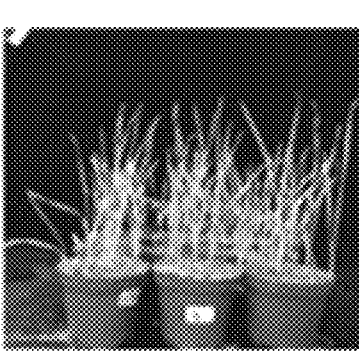
Figure 4:
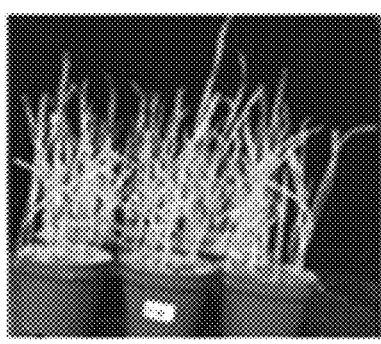

As shown in Table 3 and FIG. 4, the disease index of wheat plants in the negative control group was 38.89%, the disease index of the M173 treatment group was 20.01%, and the combination 2:1 group had a disease index of only 15.43%, and a relative control effect of 60.32%. This suggests that M173 can effectively prevent and control infestation of wheat plants with F.g, and the combination 2:1 has a better control effect than M173. On the other hand, *Fusarium graminearum* reduced the germination rate of wheat seeds in the negative control group to 77.42%, while the germination rates of seeds in the treatment groups using the M173 microbial solution were more than 91%, and the germination rate of wheat seeds in the combination 2:1 group was as high as above 95%. This suggests that M173 can effectively ensure the germination rate of plant seeds in F.g environment, and the combination 2:1 can further improve the germination rate. The presence of the seed-coating microbial agent provided by the present invention can effectively protect wheat seeds from the influence of *Fusarium graminearum* F.g and promote seed germination. Moreover, the combinations of M173 and M101 have the dual effects of further promoting seed germination and efficiently preventing and controlling *Fusarium graminearum*.

TABLE 3

Comparison of biocontrol effects on *Fusarium graminearum*

| Treatment | Disease index (%) | Control effect (%) | Germination rate (%) |
|---|---|---|---|
| Blank control | — | — | 100 |
| Negative control | 38.89 | — | 77.42 |
| M173 | 20.01 | 48.55 | 93.22 |
| M101 | 28.67 | 26.28 | 88.13 |
| 1:1 | 19.88 | 48.88 | 91.96 |
| 1:2 | 25.13 | 35.38 | 92.23 |
| 2:1 | 15.43 | 60.32 | 95.16 |

Example 8

In this example, an experiment was conducted to test the biofilm-forming ability of *Bacillus velezensis* M173 strain and a combination of M173 and M101.

On the premise of ensuring that *Bacillus velezensis* M173 strain itself is easy to culture and can effectively prevent and control soil-borne diseases caused by *Ralstonia solanacearum* and *Fusarium graminearum*, the biofilm-forming ability of M173 and a combination of M173 and M101 was further verified to test their colonization ability in field soil and/or on leaf surface of plants, in order to verify the stability and persistence of the control effects of M173 and the combination of M173 and M101.

The M173 strain fermentation culture and M101 strain fermentation culture obtained in Example 3 and Example 4 were measured for the absorbances at OD$_{600}$ with a spectrophotometer, and adjusted to an OD$_{600}$ value of 1 with LB liquid culture medium, to afford an M173 microbial solution and an M101 microbial solution. The resulting M173 microbial solution and M101 microbial solution were mixed at volume ratios of 1:1, 2:1, and 1:2 to obtain mixed microbial solutions of M173 and M101 for later use.

100 μL of each of the above microbial solutions was pipetted into a 96-well plate and cultured for 24 h. After washing twice with 200 μL of a PBS solution, the 96-well plate was placed in an oven at 60° C. for 1 h to immobilize the biofilm, and then 50 μL of 0.4% crystal violet solution was added to the wells for staining for 15 min. The wells were then washed three times with 200 μL of PBS, and finally dried at 37° C. 200 μL of 70% ethanol was added, and the absorbance at 600 nm was measured with a microplate reader to evaluate the biofilm-forming ability of *Bacillus velezensis* M173. During the whole experiment, a negative control group and microbial agent treatment groups were set up. In the negative control group, LB liquid culture medium was added to a 96-well plate. There were a total of 5 microbial agent treatment groups. The corresponding microbial solution was added to each group, with three replicates each group.

TABLE 4

| Biofilm-forming ability | | | | |
|---|---|---|---|---|
| Treatment | Mean | Cutoff (Dc) | 2x cutoff | Judgment |
| Negative control | 0.24 | 0.48 | 0.96 | — |
| M173 | 2.78 | — | — | Strong biofilm-forming strain |
| M101 | 0.12 | — | — | Non-biofilm-forming strain |
| 1:1 | 3.13 | — | — | Strong biofilm-forming strain |
| 2:1 | 3.99 | — | — | Strong biofilm-forming strain |
| 1:2 | 2.96 | — | — | Strong biofilm-forming strain |

According to the measured absorbance, the mean (D) of three replicates was calculated. 2 times the mean of the negative control group was used as the cutoff value (Dc). When the mean of the microbial agent treatment group, $D_{treatment} > 2 \times Dc$, the strain was judged to be a strong biofilm-forming strain; when $Dc < D_{treatment} \leq 2 \times Dc$, the strain was judged to be a weak biofilm-forming strain; and when $D_{treatment} \leq Dc$, the strain was judged to be a non-biofilm-forming strain.

As shown in Table 4, $D_{control}=0.24$, Dc=0.48, 2×Dc=0.96, and the means of the four microbial agent treatment groups other than the M101 group>2×Dc. That is to say, M101 does not have strong biofilm-forming ability, *Bacillus velezensis* M173 strain is a strain with strong biofilm-forming ability, and the combination of M173 and M101 also has this ability. The strong biofilm-forming ability indicates that *Bacillus velezensis* M173 strain and a composition thereof are extremely easy to colonize in the soil environment of plants, thereby producing biocontrol effects more rapidly, stably and persistently.

Example 9

In this example, an experiment was conducted to verify the biocontrol effects of *Bacillus velezensis* M173 strain. *Bacillus pumilus* M101 strain and a combination thereof on cucumber damping-off.

(1) Preparation of Pathogen s A puncher was used to punch holes in culture medium overgrown with *Rhizoctonia solani* under a sterile condition to obtain a microbial cake with a diameter of 5 mm. It was inoculated onto a PDA culture medium (200 g of potato boiled in water and filtered, 20 g of glucose, 15 g of agar, and water added to 1 L, sterilized at 121° C. for 20 min) plate, one microbial cake per plate, and cultured in an incubator at a constant temperature of 28° C. for 7 d for later use.

(2) Irrigation Treatment

After 7 days of cucumber seedling cultivation, a water-soluble fertilizer was irrigated into the seedling tray. After 12 days of sowing, the seedlings were pulled out and all the fibrous roots and part of the main root were cut off using scissors. Cucumber seedlings with consistent growth status were selected and planted in small pots with sterilized soil, 3 plants per pot. The M173 strain fermentation culture and M101 strain fermentation culture obtained in Example 3 and Example 4 were measured for the absorbance at $OD_{600}$ with a spectrophotometer, and adjusted to an $OD_{600}$ value of 0.12 with LB liquid culture medium, to afford an M173 microbial solution and an M101 microbial solution. The resulting M173 microbial solution and M101 microbial solution were mixed at volume ratios of 1:1, 2:1, and 1:2 to obtain mixed microbial solutions of M173 and M101 for later use.

The cucumber seedlings were irrigated with the above microbial solutions. 50 mL (a total of $6 \times 10^8$ cfu) per pot. 6 pots were used for each treatment, with 3 replicates. The seedlings in the control group were irrigated with an equal amount of clear water. Two hours after inoculation, two small holes were poked at opposite positions in each pot, and one pathogen cake with a diameter of 5 mm was inoculated into each hole. The pots were then placed in a greenhouse at 28-30° C. for 7 d for disease induction.

The soil at the roots of the cucumber seedlings that were subjected to disease induction at high temperature and high humidity were cleaned off. The disease situation was recorded according to the disease grading standard. Finally, after the cleaned cucumber seedlings were dried in an oven at 75° C., the dry weight was measured, and the dry weight increase rate was calculated.

Disease grading standard:

Grade 0: There is no disease spot at the base of stems of cucumber seedlings.

Grade 1: The disease spots at the base of stems of cucumber seedlings occupy less than ¼ of the stem circumference.

Grade 2: The disease spots at the base of stems of cucumber seedlings occupy between ¼ and ½ of the stem circumference.

Grade 3: The disease spots at the base of cucumber seedlings occupy more than ½ of the stem circumference, but do not destroy the entire stem circumference.

Grade 4: There are symptoms such as rot, browning, indentation or breakage at the junction of root with stem of cucumber seedlings.

Disease index =

$$\left( \sum (\text{Number of diseased plants at each grade} \times \text{Representative value of each disease grade}) / (\text{Total number of plants investigated} \times \text{Value of the highest disease grade}) \right) \times 100$$

-continued

Relative control effect (%) = (Disease index of the control group −

Disease index of the treatment group)/

Disease index of the control group) × 100%.

TABLE 5

Control effects on cucumber damping-off in the treatment groups

| Treatment | Dry weight increase rate (%) | Mean of disease index | Relative control effect (%) |
|---|---|---|---|
| Control | — | 44.59 | — |
| M173 | 0.33 | 35.63 | 20.09 |
| M101 | 0.12 | 41.21 | 7.58 |
| 1:1 | 0.21 | 37.22 | 16.53 |
| 1:2 | 0.15 | 31.13 | 30.19 |
| 2:1 | 0.43 | 26.85 | 39.78 |

As shown in Table 5, the cucumber seedlings irrigated with the 2:1 combination of the fermentation cultures mainly had a disease grade of between 0 and 1, while the cucumber seedlings in the control group mostly had a disease grade of 1-2, and a disease index (44.59%) higher than that of the treatment groups. The relative control effect of the combination 2:1 on cucumber damping-off reached 39.78%. That is, the *Bacillus velezensis* M173 and its combination with M101 provided by the present invention can effectively inhibit infestation of plants with *Rhizoctonia solani*.

Example 10

In this example, a field experiment was conducted to verify the biocontrol effects of *Bacillus velezensis* M173 strain, *Bacillus pumilus* M101 strain and a combination thereof on *fusarium* wilt of wax gourd.

Test Site:

Dongguan Agricultural Science Research Center (Banana and vegetable Base)

Experimental Crop:

Wax gourd, Wanyan No. 2 small wax gourd; grown in greenhouse.

TABLE 6

Experimental treatments

| No. | Treatment | Microbial agent | Note |
|---|---|---|---|
| 1 | Blank control | — | Conventional application mode in the planting base |
| 2 | M101 | M101 fermentation broth | Conventional application mode + M101 |
| 3 | M173 | M173 *Bacillus* fermentation broth | Conventional application mode + M173 |
| 4 | 1:1 | M173:M101 (1:1) | Conventional application mode + M173:M101 (1:1) |
| 5 | 2:1 | M173:M101 (2:1) | Conventional application mode + M173:M101 (2:1) |
| 6 | 1:2 | M173:M101 (1:2) | Conventional application mode + M173:M101 (1:2) |

Regional Division:

It was divided according to the number of crops, with 3 replicates of 34 seedlings (in total of 102 seedlings) per treatment (actually based on the number of wax gourd seedlings planted in this greenhouse). Each treatment and replicate was randomly arranged. The institute offers two application modes, which were selected based on the actual situation.

Experimental Steps:

Wax gourd seedlings at the same growth stage were selected.

TABLE 7

Timing of application

| Operation | Application mode | Date | Observations |
|---|---|---|---|
| Transplantation | — | Sep. 3, 2021 | — |
| First application | All microbial agents were 200x diluted | Sep. 15, 2021 | Crops had consistent growth status, and no disease. |
| Second application | prior to application, and each seedling was irrigated with 400 mL | Sep. 28, 2021 | The treatment group had a significant growth-promoting effect. |
| Follow-up | — | Oct. 20, 2021 | The morbidity rate of *fusarium* wilt in the treatment group was reduced by half compared to the control group. |

Experimental Records (1) Morbidity Rate

According to the follow-up statistics three weeks after two irrigations, the use of Moon's dual-microbial agent products, especially 2:1 can effectively reduce the infestation with the pathogen *Fusarium oxysporum* f. sp. *cucurmerimum*, reduce the morbidity rate of *fusarium* wilt of wax gourd, and result in more new leaves and vigorous growth than the control group.

TABLE 8

Statistics of morbidity in the efficacy experiment on *fusarium* wilt of wax gourd

| Treatment | Morbidity rate of *fusarium* wilt |
|---|---|
| Blank control | 15.45% ± 0.06% |
| Microbial agent control (Serenade) | 14.47% ± 0.06% |
| Chemical control (Liangdun) | 5.88% ± 0.01% |
| Xiaoxian | 8.23% ± 0.00% |

TABLE 8-continued

Statistics of morbidity in the efficacy experiment
on *fusarium* wilt of wax gourd

| Treatment | Morbidity rate of *fusarium* wilt |
|---|---|
| M101 | 9.80% ± 0.01% |
| M173 | 6.47% ± 0.01% |
| 1:1 | 5.88% ± 0.01% |
| 2:1 | 3.70% ± 0.01% |
| 1:2 | 5.13% ± 0.01% |

In summary, the composition provided by the present invention not only can inhibit *Ralstonia solanacearum, Fusarium graminearum* and *Rhizoctonia solani*, effectively prevent and control tomato bacterial wilt, wheat head scab, cucumber damping-off and wax gourd *fusarium* wilt, but also can promote seed germination, increase the germination rate, allow for quick colonization, facilitate industrial production, and therefore has broad application prospects.

Example 11. Experiment for Testing the Characteristics of M173 Strain (1) Testing of Siderophore-Producing Ability of *Bacillus velezensis* M173

Siderophore is a low-molecular complex synthesized and secreted by microorganisms, which can chelate iron and be used for uptake of iron element. Root microorganisms can produce siderophores to chelate iron for utilization by plants. In addition, biocontrol bacteria can compete with pathogens for iron element by producing siderophores, thereby inhibiting growth and reproduction of pathogenic microorganisms.

1.1 Experimental Materials:

CAS culture medium, MKB iron-free culture medium, dipotassium hydrogen phosphate solution, 50 ml centrifuge tubes, centrifuge, inoculating loop, sterile water.

1.2 Experimental Methods:

Iron starvation treatment: A *Bacillus pumilus* strain from the Moon's Biobank was used as a negative control (for the screening and identification methods of the strain, please see Example 2). The test strain was scraped with an inoculating loop, inoculated into a 50 mL centrifuge tube containing 10 mL of MKB iron-free culture medium, and cultured at 30° C. while shaking at 200 rpm for 24-72 h. After bacterial bodies were produced, they were centrifuged at 1000 rpm for 5 min and the supernatant was discarded. The bacterial bodies were washed twice with 5 mL of sterile ultrapure water by centrifugation at 10,000 rpm for 5 min, and then diluted 10 times with sterile ultrapure water to obtain a bacterial suspension.

CAS plate overlapping method: 10 μL of the bacterial suspension was inoculated onto an iron-free MKB plate, or inoculated by streaking with an inoculating loop. Each strain was cultured in an incubator at 30° C. for 2 d in triplicate. After 2 days, obvious single colonies appeared on each plate. When the CAS culture medium was cooled to below 60° C., a layer of CAS culture medium was poured onto the plate with grown colonies. After 1 h, the color change of each plate was observed. After 24 h. it was observed again and photographed.

1.3 Experimental Results:

The solubility index, i.e., the halo ratio D/d, was calculated. By using the solubility index as a reference, the ability of biocontrol bacteria to secrete siderophores was analyzed and compared.

TABLE 9

Solubility index

| Strain | Negative control | M173 |
|---|---|---|
| Solubility index | 1 | 1.26 |

Figure 5:
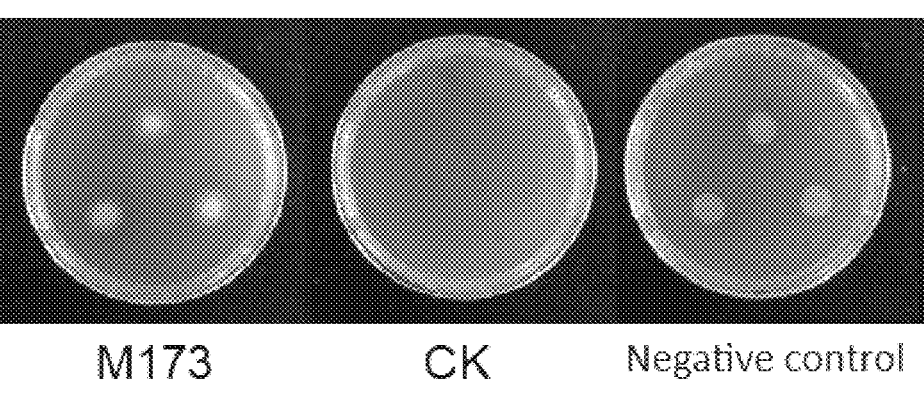
FIG. 5 shows the results of siderophore-producing ability of *Bacillus velezensis* M173 strain.

The experimental results in FIG. 5 and Table 9 showed that the *Bacillus velezensis* M173 of the present invention had a better siderophore-producing ability than the negative control strain. The negative control showed no production of siderophores.

(2) Biofilm Formation of *Bacillus velezensis* M173

Biofilm formation is the property of bacteria to form a film on the surface of an object after accumulation. The strains in microbial products with the film-forming property are positively correlated with the colonization ability and biocontrol effect on diseases in field application.

An M173 strain fermentation culture was prepared, measured for the absorbance at OD600 with a spectrophotometer, and adjusted to an OD600 value of 1 with LB liquid culture medium. 100 μL of the fermentation culture was pipetted into a 96-well plate and cultured for 24 h. After washing twice with 200 μL of a PBS solution, the 96-well plate was placed in an oven at 60° C. for 1 h to immobilize the biofilm, and then 50 μL of 0.4% crystal violet solution was added to the wells for staining for 15 min. The wells were then washed three times with 200 μL of PBS, and finally dried at 37° C. 200 μL of 70% ethanol was added, and the absorbance at 600 nm was measured with a microplate reader to evaluate the biofilm-forming ability of *Bacillus velezensis* M173. During the whole experiment, a negative control group, a competitor microbial agent control group and a microbial agent treatment group were set up. In the negative control group, LB liquid culture medium was added to a 96-well plate. In the microbial agent treatment group, the fermentation culture (OD600=1) was added. There were three replicates for each group.

According to the measured absorbance, the mean (D) of three replicates was calculated. 2 times the mean of the negative control group was used as the cutoff value (Dc). When the mean of the microbial agent treatment group, $D_{treatment} > 2 \times Dc$, the strain was judged to be a strong biofilm-forming strain; when $Dc < D_{treatment} \leq 2 \times Dc$, the strain was judged to be a weak biofilm-forming strain; and when $D_{treatment} \leq Dc$, the strain was judged to be a non-biofilm-forming strain.

Furthermore, the mean (D) of three replicates was calculated according to the measured absorbance. The larger the D value, the better the film-forming ability of the strain. The experimental results are shown in Table 10. As can be seen from Table 10, the mean absorbance (D) of M173 was stably above 3.7, which was significantly higher than that of the negative control and other control strains.

TABLE 10

Biofilm property of the strains

| Strain | OD600 | | | D |
|---|---|---|---|---|
| ck (negative control) | 0.148 | 0.218 | 0.085 | 0.150 |
| *Bacillus velezensis* M173 | 3.694 | 3.56 | 3.873 | 3.709 |
| *Paenibacillus polymyxa* KN-03 | 0.293 | 0.345 | 0.297 | 0.312 |
| *Bacillus amyloliquefaciens* KN-527 | 3.289 | 3.885 | 3.134 | 3.436 |

(3) Growth Curve of M173

1. Growth Curves of *Bacillus velezensis* and Other Bacteria

The control strains selected in this example are: *Bacillus pumilus* M101 identified in Example 2; competitor 1—*Bacillus subtilis* separated from a commercially available *Bacillus subtilis* product; competitor 2—*Bacillus amyloliquefaciens* separated from a commercially available *Bacillus amyloliquefaciens* product.

Figure 6:
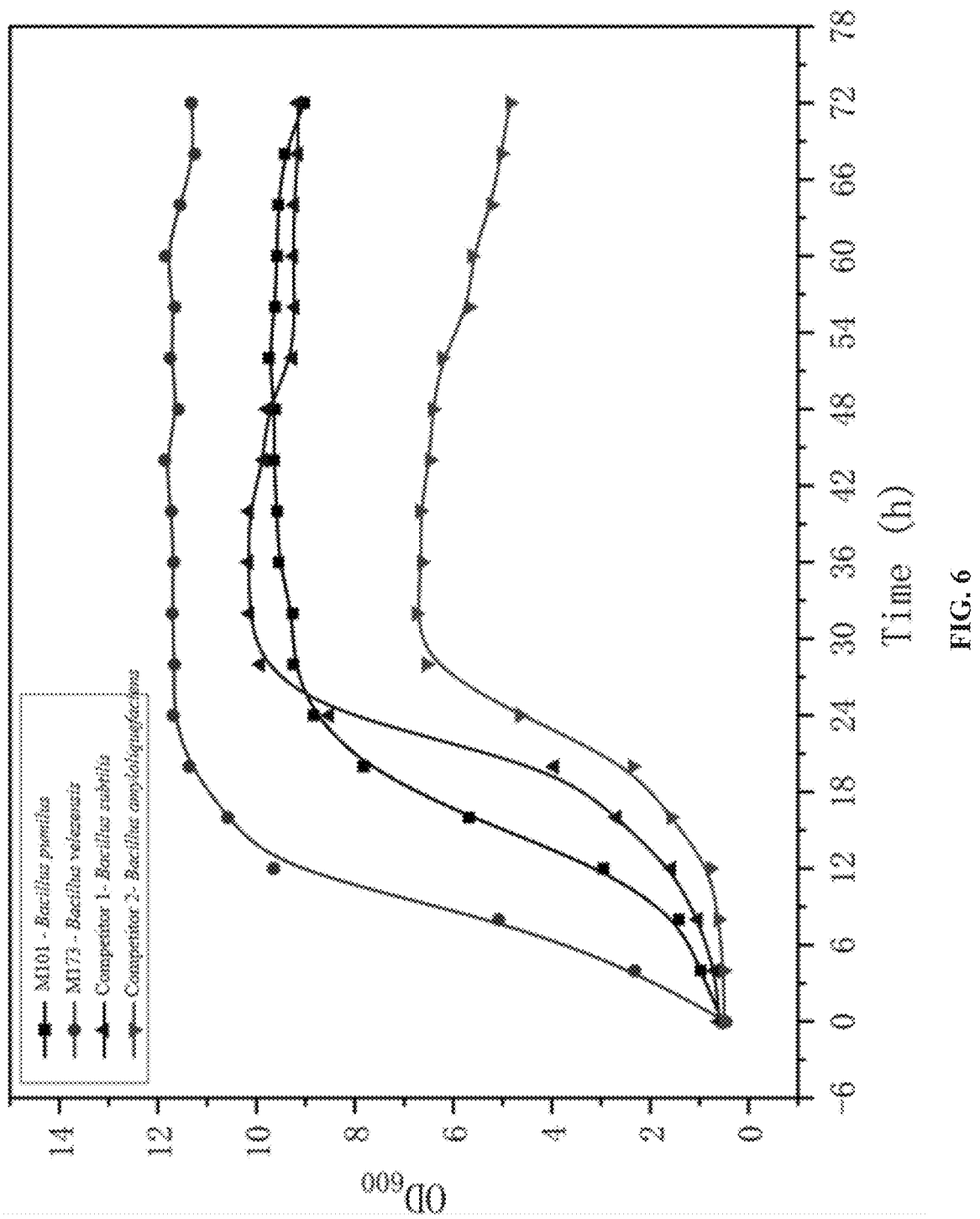
FIG. 6 shows the growth curves of *Bacillus velezensis* M173 strain and competitor strains.

A 250 ml Erlenmeyer flask with a baffle was loaded with 50 mL of a culture medium. The cultured seed solutions (M173 of the present invention and the above three control strains) were inoculated into a fermentation medium (glucose 5 g/L, yeast powder 5 g/L, peptone 5 g/L, and NaCl 5 g/L) at 2% (v/v), and cultured at 30° C. and 200 rpm. The fermentation broths were regularly sampled to detect their OD600. The experimental results are shown in FIG. 6, which shows that *Bacillus velezensis* M173 has the shortest logarithmic phase; therefore, it can quickly establish a functional bacterial flora. Moreover, *Bacillus velezensis* M173 has a long stationary phase; therefore, it can produce a large amount of secondary metabolites.

In summary, M173 can grow rapidly and has a long shelf life. It can directly kill pathogens by secreting a large amount of secondary metabolites that inhibit pathogens. It has a strong biofilm-forming ability and quickly forms a Culture and detection methods: A 250 ml Erlenmeyer flask with a baffle was loaded with 50 mL of the culture medium. 7 bottles of the culture medium were prepared for each strain. The cultured seed solutions were inoculated into the fermentation medium at 2% (v/v), and cultured at 30° C. and 200 rpm. Samples were collected at 0 h, 4 h, 8 h, 14 h, 18 h, 22 h, and 24 h, respectively.

OD600 was measured and sporulation was observed under microscope.

Figure 7:
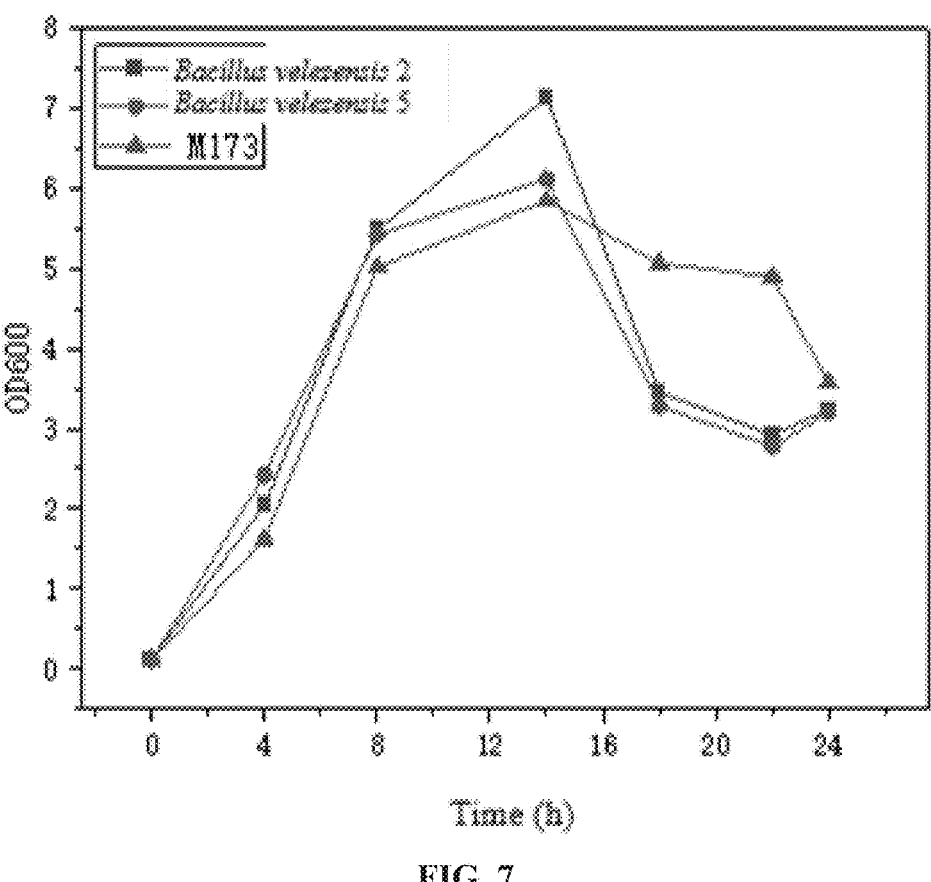
FIG. 7 shows the growth curves of *Bacillus velezensis* M173 and other *Bacillus velezensis* strains.

Experimental results (Table 11, FIG. 7): Under the condition of using LB as the fermentation medium, according to the bacterial concentration (based on OD600) before 14 h, the three strains were shown in descending order as follows: *Bacillus velezensis* 2, *Bacillus velezensis* 5, and *Bacillus velezensis* M173. That is, before 14 h, *Bacillus velezensis* 2 grew the fastest, followed by *Bacillus velezensis* 5, and *Bacillus velezensis* M173 grew the slowest.

In addition, the OD600 of the three strains all reached the maximum at 14 h of sampling. *Bacillus velezensis* 2 and *Bacillus velezensis* 5 were prone to autolysis in subsequent cultivation, with a significant decrease in OD, while M173 underwent relatively less autolysis, with a relatively slower decrease in OD, and sporulation began under microscope at 22 h. No sporulation was observed under microscope for *Bacillus velezensis* 2 and *Bacillus velezensis* 5 when LB was used as a culture medium.

TABLE 11

| | Fermentation results of different strains | | | | | | |
|---|---|---|---|---|---|---|---|
| | *Bacillus velezensis* 2 | | *Bacillus velezensis* 5 | | *Bacillus velezensis* M173 | | |
| Time (h) | OD600 | Sporulation rate under microscope (%) | OD600 | Sporulation rate under microscope (%) | OD600 | Sporulation rate under microscope (%) | |
| 0 | 0.11 | 0 | 0.11 | 0 | 0.10 | 0 | |
| 4 | 2.05 | 0 | 2.42 | 0 | 1.62 | 0 | |
| 8 | 5.49 | 0 | 5.42 | 0 | 5.02 | 0 | |
| 14 | 7.13 | 0 | 6.12 | 0 | 5.85 | 0 | |
| 18 | 3.46 | 0 | 3.28 | 0 | 5.06 | 0 | |
| 22 | 2.92 | 0 | 2.78 | 0 | 4.90 | 50~60 | |
| 24 | 3.24 | 0 | 3.20 | 0 | 3.57 | 50~60 | | protective layer on crop roots to resist the invasion of pathogens. Therefore, it has a dual disease prevention mechanism.

2. Growth Curves of *Bacillus velezensis* M173 and Other *Bacillus velezensis* Strains For *Bacillus* sp., in later stages of fermentation, when nutrients are lacking or conditions deteriorate, spores will gradually form. However, a considerable number of *Bacillus* sp. will undergo autolysis without producing spores, which poses a greater challenge for large-scale fermentation designed to form a product. The present invention further compares *Bacillus velezensis* M173 with *Bacillus velezensis* 2 and *Bacillus velezensis* 5 as described in Example 19 in terms of growth curve, spore production and autolysis. Based on comprehensive considerations, M173 is the optimal strain for product development.

Experimental strains: *Bacillus velezensis* 2, *Bacillus velezensis* 5 (obtained according to the screening and identification method as described in Example 1); *Bacillus velezensis* M173.

Seed culture medium: LB culture medium consisting of 10 g/L of peptone, 5 g/L of yeast powder, and 5 g/L of NaCl.

Fermentation medium: LB culture medium consisting of 10 g/L of peptone, 5 g/L of yeast powder, and 5 g/L of NaCl.

(4) Relative Shelf Life of M173

Experimental methods: According to the Arrhenius' law, the formula IgC=−(Kt/2.303)+1 g C0 was used, wherein C0 is the bacterial count at t=0, and C is the bacterial count at time t. A linear regression of 1 gC on t was performed to obtain a straight line, with a slope of −K/2.303, from which the K value was calculated. Different temperatures have different K values. According to the formula, the K value at room temperature of 25° C. can be calculated. The storage time t can be obtained by applying the K value at room temperature of 25° C., the initial viable bacterial count C0, and the final viable bacterial count C to be reached during the shelf life.

The samples were stored at 35° C., 45° C. and 55° C., respectively, and regularly sampled for dilution and plating to calculate the simulated shelf life at a high temperature. According to the Arrhenius' Law:

$$lg\ K = -\left(E/2.303RT\right) + lg\ A$$

K: reaction rate constant;
A: frequency factor;

E: activation energy;

R: gas constant (R=8.314 J/(mol*K));

T: absolute temperature

According to the bacterial counts at different temperatures in Table 12, it can be deduced from the formula that the independent variable is temperature T, and the K value can be further calculated. According to the Arrhenius' law, the decay curve of the sample at 25° C. is calculated as: 1 g C=−(0.000735t/2.303)+1 gC0. It can be calculated from the decay curve that the half-life of the *Bacillus velezensis* fermentation broth at 25° C. (normal temperature) is 943.2 days.

TABLE 12

| Bacterial counts at different temperatures | | |
|---|---|---|
| Temperature (° C.) | Time (d) | Bacterial count (cfu/mL) |
| 55° C. | 0 d | 8.23E+09 |
| | 7 d | 9.70E+09 |
| | 14 d | 4.03E+09 |
| | 21 d | 7.17E+09 |
| | 28 d | 3.70E+09 |
| 45° C. | 0 d | 8.23E+09 |
| | 7 d | 1.19E+10 |
| | 14 d | 7.53E+09 |
| | 21 d | 7.60E+09 |
| | 28 d | 7.00E+09 |
| 35° C. | 0 d | 8.23E+09 |
| | 14 d | 7.87E+09 |
| | 28 d | 7.67E+09 |

According to the data from the accelerated experiment, the K value at room temperature of 25° C. was calculated to be 0.000735. The initial bacterial count $C_0$ was actually detected to be 8.23×10⁹. By applying them into the formula 1 g C=−(Kt/2.303)+1 g $C_0$, the half-life t could be calculated to be 943.20. That is, it is predicted that the bacterial count will still be maintained at 4.11×10⁹ cfu/mL 2.5 years (946.20 d) after the product leaves the factory, which meets the requirement of a shelf life of 2 years.

(5) Detection of Absolute Shelf Life (pH, Viable Bacterial Count, Spore Count, and Sporulation Rate) of M173

1. The Method for Measuring Viable Bacterial Count 10.0 mL of the liquid microbial agent was added to 90 mL of sterile water, let stand for 20 min, and then sufficiently shaken on a rotary shaker at 200 r/min for 30 min to form a mother bacterial suspension.

5.0 mL of the above mother bacterial suspension was added using a sterile pipette to 45 mL of sterile water, and mixed well to obtain a 10-2 dilution. Serial dilution was then performed. 3 appropriate consecutive dilutions were selected for each sample. 0.1 mL of each of the bacterial suspensions at different dilutions was added using a sterile pipette to a pre-prepared solid culture medium plate, and the bacterial suspension was spread evenly using glass beads. There were 3 replicates for each dilution. The plates were cultured under an appropriate condition.

The plate with a dilution resulting in 20-300 colonies was used as the counting standard to calculate the effective viable bacterial count. When there was only one dilution resulting in an average colony count between 20 and 300, this average colony count would be used for the calculation. If there were two dilutions and their average colony counts were both between 20 and 300, it would be determined based on the ratio of their total colony counts. If the ratio was less than or equal to 2, their average should be calculated; and if the ratio was greater than 2, the average colony count with the smaller dilution should be used for the calculation.

$$\text{Viable bacterial count per gram of sample} = (C/V) \times M$$

wherein C is the average colony count at a certain dilution concentration, V represents the volume (mL) of the diluted solution used to spreading the plate, and M represents the dilution factor.

2. The Method for Measuring Spore Count

The mother bacterial suspension in 1 was placed in a water bath at 80° C. for 30 min, and then diluted and plated. The effective viable bacterial count was the spore count.

3. The Method for Determining Sporulation Rate $$\text{Sporulation rate} = \text{Spore count/Viable bacterial count} \times 100\%$$

4. The Measurement Results are Shown in Table 13.

TABLE 13

| Measurement results | | | | |
|---|---|---|---|---|
| No. | Strain | Viable bacterial count | Spore count | Sporulation rate |
| 1 | M173 | 1.08E+10 | 1.14E+10 | 105.56% |

5. Absolute Shelf Life

Experimental methods: The samples were stored at 25° C., and regularly diluted and plated to determine the absolute shelf life. Survival rate=Spore count after storage/Initial (0m) spore count×100%. The experimental results are shown in Table 14.

TABLE 14

| Measurement results at different dilution factors | | | |
|---|---|---|---|
| Dilution factor | Spore count (cfu/mL) | Sporulation rate (%) | Survival rate (%) |
| 0M | 8.97E+09 | 130.48% | |
| 1M | 9.60E+09 | 104.86% | 107.06% |
| 2M | 1.04E+10 | 111.90% | 115.61% |
| 3M | 1.07E+10 | 105.59% | 119.70% |
| 4M | 7.47E+09 | 81.70% | 83.27% |
| 5M | 9.07E+09 | 103.31% | 101.12% |
| 6M | 8.20E+09 | 119.92% | 91.45% |
| 7M | 1.04E+10 | 101.61% | 115.61% |
| 8M | 9.63E+09 | 99.65% | 107.43% |
| 9M | 8.47E+09 | 116.93% | 94.42% |
| 10M | 1.01E+10 | 112.58% | 112.27% |
| 11M | 8.93E+09 | 105.19% | 99.60% |
| 12M | 9.15E+09 | 102.49% | 101.99% |

The experimental results show that M173 is a spore-forming bacterium, in which round or oval dormant spores are formed. The spores have extremely low water content and strong stress resistance, and can withstand high temperatures, ultraviolet light, ionizing radiation and various chemical substances. The sporulation rate is positively correlated with the shelf life of a viable bacterial product. The test results show that the M173 of the present invention can stably reach a survival rate of more than 90%, and a spore count of 7.5×10⁹ cfu/mL. The above results collectively show that M173 has the characteristics of stable spore count, persistently high viable bacterial count, and long shelf life, indicating that M173 has the quality characteristics of being marketed as a product.

(6) Determination of Metabolites of M173

1. Hormone Assay

The method for measuring hormones for M173:1) Preparation of samples: The M173 sample was dissolved in 5 ml of 50% methanol/water. After mixing evenly. 100 μl of the sample solution was passed through a 0.22 μm filter membrane, and finally adjusted to a volume of 0.5 ml in a liquid phase vial. 2) Control: a mixed standard of IAA, IBA, methyl jasmonate, gibberellin, methyl salicylate, and isopentenyladenosine nucleoside growth hormone.

Testing instrument: LC-QQQ (triple quadrupole liquid-mass spectrometer) was used to determine the content of growth hormones in the sample.

2. Amino Acid Assay

The method for determining amino acid content for M173:

1) 1 mL of the sample to be hydrolyzed was added to 600 μL of 6M hydrochloric acid, and hydrolyzed at 110° C. for 16 h.

2) After the hydrolysis was completed, rotary evaporation was performed for concentration.

3) It was re-dissolved with 1 mL of methanol and filtered through a 0.22 μm millipore filter membrane.

4) The filtered sample was subjected to LC-QQQ quantitative analysis, and the amino acid content in the sample was calculated according to the amino acid standard curve.

The results from the hormone and amino acid assays are shown in Tables 15 and 16. Table 15 shows that the M173 strain can secrete the hormones IP, GA3. IPA, IAA, Me-SA, SA, and IBA. It shows that M173 can promote plant growth and rooting, and when some plants are infected with pathogens, the M73 strain of the present invention can promote plant resistance to the pathogens, thereby suggesting its use in disease prevention. Table 16 shows that M173 produces a variety of amino acids, which can improve crop quality enhance crop metabolism, and promote crop growth.

TABLE 15

| | Results from the hormone assay | | |
|---|---|---|---|
| Type of hormone | Name of standard | Functions | Unit (ng/ml) |
| IP | Isopentenyladenine | Also known as 5406 cytokinin. It is a natural cytokinin that promotes cell division and differentiation as well as growth and development of parts with active growth, and regulates protein synthesis, enzyme activity, cellular metabolic balance, etc. Isopentenyl Adenine (IP) is mainly used to regulate growth of crops such as rice, corn, soybean, etc. | 0.2675 |
| GA3 | Gibberellin GA3 | | 0.0462 |
| IPA | Isopentenyladenine nucleoside | An important cytokinin, which has a very low content in plants, but plays an important role in regulation of the growth and differentiation of plants. | 0.0118 |
| IAA | 3-Indoleacetic acid | A plant growth hormone and good rooting agent | 7.8759 |
| Me-SA | Methyl salicylate | A derivative of salicylic acid, found in many plant essential oils and juices | 0.4238 |
| SA | Salicylic acid | It can induce differentiation of plant cells and chloroplast production. Salicylic acid is also involved in plant defense against pathogens as an endogenous signal, and induces tissues to produce pathogenesis-related proteins that result in resistance in other parts of the plant when one part of the plant is infected with a pathogen. | 0.0578 |
| IBA | 3-Indolebutyric acid | A plant growth hormone and good rooting agent | 0.0050 |

TABLE 16

| | | | | | | | | |
|---|---|---|---|---|---|---|---|---|
| Results from the amino acid assay (amount per milliliter of sample (mg/mL)) | | | | | | | | |
| Tryptophan | Serine | Phenylalanine | Leucine | Isoleucine | Tyrosine | Valine | 3-Pyrrolidine carboxylic | Alanine |
| 0.0258 | 0.0016 | 0.0035 | 0.0045 | 0.0023 | 0.0047 | 0.0052 | 0.0039 | 0.0296 |

| Threonine | Glycine | Glutamic acid | Aspartic acid | Histidine | Arginine | Lysine | L-Cystine |
|---|---|---|---|---|---|---|---|
| 0.0099 | 0.0271 | 0.0480 | 0.0227 | 0.0094 | 0.0023 | 0.0101 | 0.0028 |

(7) Active Substances of M173

First, the sample extract was collected for secondary mass spectrum using Agilent LC-QTOF high-resolution mass spectrometry. Second, the raw data file was subjected to format transformation. Then, it was uploaded to the Massive mass spectrometric data storage platform. Finally, the corresponding GNPS (Global Natural Products Social Database) algorithm was used to establish a visual molecular network to identify known peptides and their structural analogues.

The experimental results confirm that the strain of the present invention can produce a series of cyclopeptide compounds as shown in 1.1 to 1.3 below, which help crops resist infection with fungal and bacterial pathogens. The cyclodipeptides and cyclotripeptides are compounds with stable structures and various biological activities. Bacillomycin has a strong broad-spectrum inhibitory effect on pathogenic fungi and an activity against pathogenic bacteria. Surfactin has a wide antimicrobial spectrum, including resistances to viruses, bacteria and fungi, and offers advantages such as less possibility of developing pesticide resistance, capability of being degraded by animal digestive enzymes, and no residue.

1.1 Cyclodipeptides and Cyclotripeptides

-continued 1.2 Bacillomycin 1.3 Surfactin (8) Acid and Alkali Resistance and High Salt Resistance Experiments for M173

1.1 Experimental Methods:

Acid and alkali resistance test: LB liquid culture medium was prepared, adjusted (with 1 mol/L of HCl and 1 mol/L of NaOH) to pH 3/5/7/9/11, respectively, and autoclaved at 121° C. for 20 min.

M173 was activated from a glycerol tube to a solid LB culture medium plate, cultured at an incubator at 30° C. for 1-2 d, inoculated into LB liquid culture medium, and cultured on a shaker for 24 h as a seed solution. M173 was inoculated into LB culture media with different pH values at an inoculum volume of 1 mL per bottle, with 3 replicates. It was cultured on a shaker at a constant temperature of 30° C., and at 24 h and 48 h, sampled to measure the OD600 value, and diluted and plated to determine the viable bacterial count.

Salt resistance test: LB liquid culture media containing 0.05 mol/L, 0.1 mol/L, 0.15 mol/L, 0.2 mol/L, and 0.25 mol/L of NaCl were prepared, respectively, and autoclaved at 121° C. for 20 min.

The M173 seed solution was inoculated into LB culture media with different salt contents at an inoculum volume of 1 mL per bottle, and the culture medium without NaCl was used as a control, with 3 replicates. It was cultured on a shaker at a constant temperature of 30° C., and at 24 h and 48 h, sampled to measure the OD600 value, and diluted and plated to determine the viable bacterial count.

Figure 8:
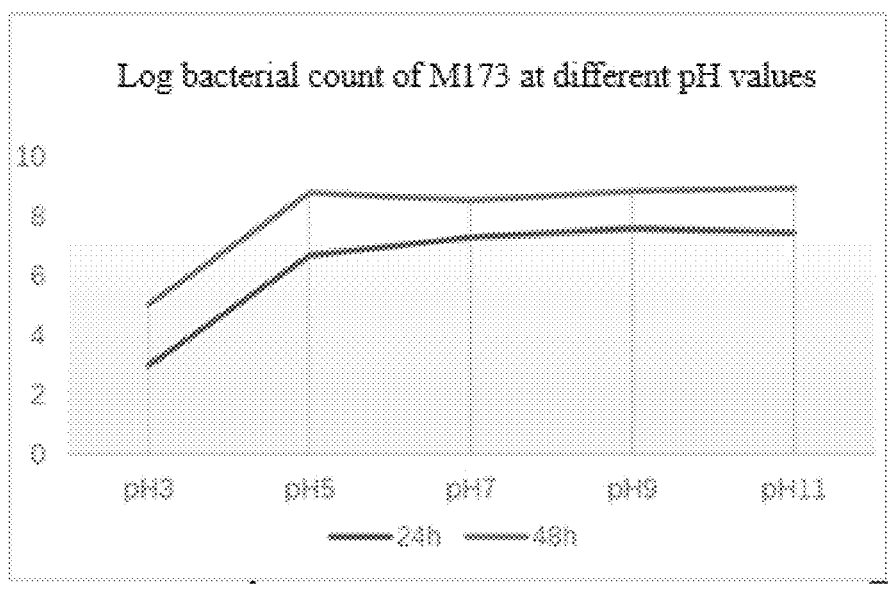
FIG. 8 shows the effect of different pH values on the bacterial count of *Bacillus velezensis* M173 strain.

1.2 Results:

The effects of different pH environments on the growth of *Bacillus velezensis* M173 are shown in FIG. 8 and Table 17. The experimental results showed that M173 could grow and reproduce in different pH environments. At 24 h, the bacterial count at pH 3 was relatively low, and the bacterial count at pH 9 was significantly greater than that at pH 7. However, after 48 h, there was no significant difference in bacterial count between the pH 7 group and each treatment group except pH 3, indicating that M173 tolerated a wide range of pH.

To sum up, M173 can grow in an environment of pH 3-11, can grow in extremely acidic and alkaline environments, and maintains a relatively high viable bacterial count.

TABLE 17

Effects of different pH values on the growth of *Bacillus velezensis* M173

| Treatment | Bacterial count (CFU/mL) | |
| --- | --- | --- |
| | 24 h | 48 h |
| pH 3 | 1E+03 ± 0d | 1.13E+05 ± 3.3E+04b |
| pH 5 | 5E+06 ± 0cd | 6.3E+08 ± 0a |
| pH 7 | 1.88E+07 ± 5.25E+06bc | 3.47E+08 ± 1.13E+07a |
| pH 9 | 3.75+07 ± 7.5E+06a | 7.05E+08 ± 3E+06a |
| pH 11 | 2.6E+07 ± 0ab | 8.1E+08 ± 5.1E+07a |

Note:
Different letters represent significant differences, P < 0.05.

Figure 9:
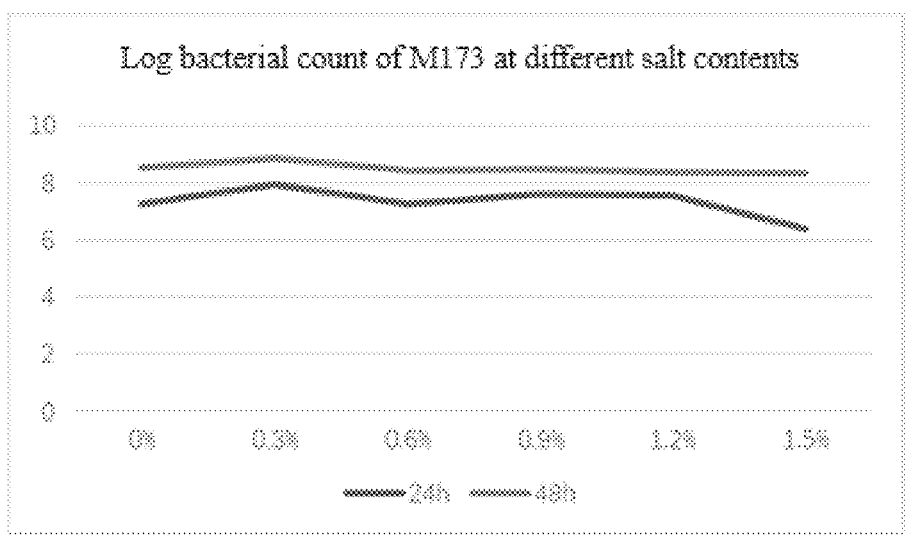
FIG. 9 shows the effect of different NaCl contents (%) on the bacterial growth of *Bacillus velezensis* M173 strain.

The effects of different salt concentrations on the growth of *Bacillus velezensis* M173 are shown in FIG. 9 and Table 18 below. The experimental results showed that the growth and reproduction of M173 were not affected by the salt concentration. At 24 h, the salt content of 0.3% promoted the growth and reproduction of M173. The high salt concentration of 1.5% still had no significant inhibitory effect on the growth of M173, indicating that M173 had good salt resistance.

According to Table 19, M173 can grow and reproduce in various soil environments, especially in strongly acidic soil (pH<5.0) and heavily saline-alkali soil (pH>9.5 and salt content>0.6%)

TABLE 18

Effects of different NaCl contents on the growth of *Bacillus velezensis* M173

| NaCl content (%) | Bacterial count (CFU/mL) | |
| --- | --- | --- |
| | 24 h | 48 h |
| 0 | 1.85E+07 ± 3.04E+06c | 3.47E+08 ± 1.13E+07a |
| 0.3 | 8.92E+07 ± 1.58E+07a | 7.55E+08 ± 2.8E+07a |
| 0.6 | 1.82E+07 ± 1.59E+06c | 2.8E+08 ± 4E+06a |
| 0.9 | 4.39E+07 ± 6.43E+06b | 2.94E+08 ± 1.21E+07a |
| 1.2 | 2.37E+07 ± 4.48E+06bc | 2.36E+08 ± 0a |
| 1.5 | 2.47E+06 ± 2.91E+05c | 2.25E+08 ± 1.9E+07a |

Note:
Different letters represent significant differences, P < 0.05.

TABLE 19

| Salt contents and pH ranges of different acidic and alkaline soils | | |
| --- | --- | --- |
| Soil classification | Salt content | pH |
| Light saline-alkali soil | <0.3% | 7.1-8.5 |
| Moderate saline-alkali soil | 0.3%-0.6% | 8.5-9.5 |
| Heavy saline-alkali soil | >0.6% | >9.5 |
| Weakly acidic soil | | 5.5-6.5 |
| Acidic soil | | 5.0-5.5 |
| Strongly acidic soil | | <5.0 |

Note:
Different letters represent significant differences, $P < 0.05$.

Example 12. M173 Safety Experiment

1. Experimental Methods:

Tomato Cultivation and Treatment

Seedling cultivation: Tomato was planted with 2 plants per pot. One tray of 6 pots (totaling 12 seedlings) was used for one treatment, with 3 replicates (totaling 36 seedlings) per treatment. Water and fertilizer management: In addition to on-time irrigation with the microbial agent, 0.01% NPK water-soluble fertilizer was irrigated in case of drought. Microbial agent treatment: 12-day-old seedlings were irrigated for the first time, and irrigated for the second time 7 days later, totaling 2 irrigations.

Preparation of Microbial Agent

Dilution of microbial agent: The required microbial agent was diluted with tap water by the desired dilution factor. For example, for treatment of 1 L/mu, it was calculated based on 2,000 plants per mu that 0.5 mL was required for each plant, and each pot of 2 seedlings required a total of 1 mL of the microbial agent. If 50 mL of the solution was used for irrigation, the dilution factor of this treatment was 50.

2. Data Collection

The culturing continued for 1 week after the second irrigation, and seedlings were harvested. The physiological data such as plant height, stem diameter and dry weight of tomato seedlings were selected and recorded for processing and analysis. A 10% increase in biomass was used as the growth promotion standard.

Plant height: The height of a plant (the distance from the root collar to the growing point). Stem diameter: The diameter of the stem of a plant measured below the first true leaf.

The results are shown in Table 20. The experimental results showed that the treatment with a dosage of 1-4 L/mu of M173 had a growth-promoting effect on tomato, with a dry weight increase rate ranging from 14.54% to 61.49%. The higher the dosage, the better the growth-promoting effect. Therefore, the M173 of the present invention is safe for tomato, and has a high safety factor.

TABLE 20

| | Effects of the treatments on growth parameters of tomato | | | |
| --- | --- | --- | --- | --- |
| Treatment | Plant height (cm) | Stem diameter (mm) | Dry weight per plant (g) | Increase rate of dry weight per plant relative to CK (%) |
| M173-1 L | 7.14 ± 0.43a | 2.07 ± 0.05b | 0.1166 ± 0.0065b | 14.54 |
| M173-2 L | 7 ± 0.32a | 2.14 ± 0.02b | 0.1248 ± 0.0088b | 22.59 |
| M173-4 L | 7.01 ± 0.13a | 2.52 ± 0.24a | 0.1644 ± 0.0241a | 61.49 |
| CK | 5.25 ± 0.32b | 2.06 ± 0.02b | 0.1018 ± 0.0014b | / |

Note:
Different letters represent significant differences, $P < 0.05$.

Example 13. Growth-Promoting Ability of M173 and a Combination of M173 with Humic Acid

1. Experimental Materials and Treatment:

Cucumber variety: Yuexiu No. 3, from Guangdong Kenong Biotech.

Test products: M173 strain; Structure (a humic acid-based product of FMC); Serenade (a competitor).

TABLE 21

| | Contents of the treatment groups | | | |
| --- | --- | --- | --- | --- |
| Treatment | Product | Recommended dosage in field | Dosage of microbial agent per plant in laboratory | Amount of irrigation water per pot |
| 1 | M173 | 1 L/mu | 0.5 mL | 50 mL |
| 2 | M173 + | 1 L/mu + | 0.5 mL + | |
| | Structure | 1 L/mu | 0.5 mL | |
| 3 | Structure | 1 L/mu | 0.5 mL | |
| 4 | Serenade | 1 L/mu | 0.5 mL | |
| Blank control | Water | / | | |

2. Experimental Methods:

2.1 Cucumber Cultivation and Treatment

Seedling cultivation: Cucumber seeds were sown with 3 seeds per pot. After 12 days of growth, the seedlings were thinned out to 2 plants per pot. One tray of 6 pots was used for each treatment, with 3 replicates (totaling 36 seedlings) per treatment.

Water and fertilizer management: An appropriate amount of 0.01% NPK water-soluble fertilizer was irrigated to ensure normal growth of cucumber seedlings.

2.2 Treatment with Microbial Agent

Each product was diluted by different folds with tap water according to Table 21. 50 mL was irrigated each pot.

2.3 Data Collection

After 11 days of culturing, seedlings were harvested. The physiological data such as expansion degree, stem diameter and dry weight of cucumber seedlings were selected and recorded for processing and analysis.

Expansion degree: The distance between the tips of two true leaves of cucumber.

Stem diameter: The diameter of the stem of a plant measured below the first true leaf.

Figure 10:
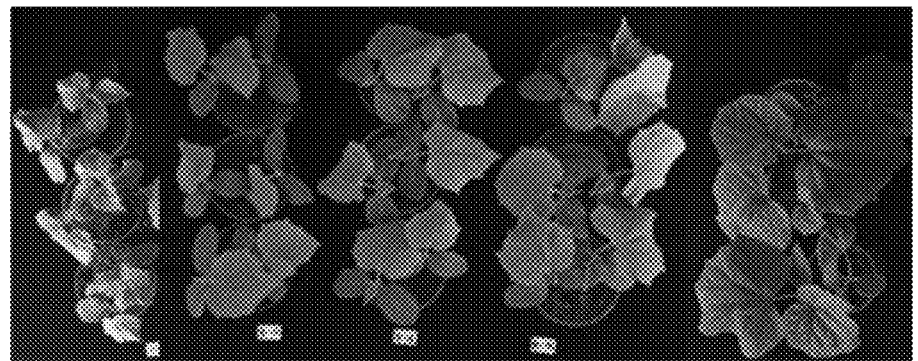
FIG. 10 shows the growth-promoting effects of different groups of treatments on cucumber.

Experimental results (Table 22 and FIG. 10): When applied alone, M173 had a better growth-promoting effect on cucumber than Structure and Serenade. On this basis, the growth-promoting effect of the combination of M173 and Structure was better than that of either of them. M173 had a better growth-promoting effect on cucumber at a dosage of 1 L/mu, with a dry weight increase rate of 121.93%. Structure and Serenade also had good growth-promoting effects, with dry weight increase rates of above 80%. The combination of M173 and Structure each at a dosage of 1 L/mu had the best growth-promoting effect, with a dry weight increase rate of 160.03%. The cucumbers in this treatment group also performed best in terms of expansion degree and stem diameter.

TABLE 22

| | Effects of the treatments on growth parameters of cucumber | | | |
|---|---|---|---|---|
| Treatment | Expansion degree of cucumber (cm) | Stem diameter of cucumber (mm) | Dray weight of cucumber | Dry weight increase rate of cucumber (%) |
| M173-1 L | 18.99 ± 0.36b | 3.48 ± 0.1ab | 0.3076 ± 0.0052b | 121.93 |
| M173-1 L + Structure 1 L | 21.67 ± 1.12a | 3.74 ± 0.15a | 0.3604 ± 0.0089a | 160.03 |
| Structure 1 L | 16.83 ± 1.18b | 3.23 ± 0.02b | 0.2588 ± 0.0184c | 86.72 |
| Serenade 1 L | 13.27 ± 0.7c | 3.22 ± 0.09b | 0.2598 ± 0.0114c | 87.45 |
| CK | 6.54 ± 0.37d | 2.6 ± 0.03c | 0.1386 ± 0.0052d | / |

Note:
Different letters represent significant differences, $P < 0.05$.

Example 14. Experiment on Compatibility of M173 with Chemical Pesticides

Commercially available chemical pesticides were purchased and diluted to corresponding concentrations according to their package inserts. The M173 bacterial solution was added to the diluted solutions of the chemical pesticides at a 200-fold dilution. The chemical pesticides and the bacterial solution were mixed evenly and let stand. At 0, 2 and 6 h. samples were collected to count the number of bacteria and calculate the survival rate (Note: the survival rate was determined by plating of a diluted bacterial solution, and there may be a certain systematic error in the dilution plating; therefore, some survival rates may be greater than 100%. If a survival rate is greater than 100%, it can be understood that M173 has a very good compatibility with the chemical pesticide).

Survival rate =

Bacterial count at $Nh$ after mixing/Initial (0 h) spore count × 100%;

wherein $Nh$ represents the hour, and $N$ takes the value 2 or 6.

The experimental results are shown in Tables 23 and 24. The results showed that the M173 strain of the present invention was compatible with common fungicides, insecticides and chemical fertilizers on the market.

TABLE 23

| Compatibility of M173 with chemical pesticides | | |
|---|---|---|
| | Survival rate at 2 h (%) | Survival rate at 6 h (%) |
| Bacillus velezensis M173 | 95.57% | 80.00% |
| Chlorothalonil | 86.71% | 89.24% |
| Quintozene | 124.05% | 85.44% |
| Thiram | 79.11% | 86.08% |
| Fosetyl-aluminum | 86.08% | 82.91% |
| Thiamethoxam | 103.16% | 111.39% |
| Dinotefuran | 87.97% | 83.54% |
| Gamma-cyhalothrin | 65.82% | 103.80% |
| Metalaxyl-M | 103.80% | 97.47% |
| Profenofos•phoxim | 68.35% | 114.56% |
| Propamocarb hydrochloride | 76.00% | 75.33% |
| Carbendazim | 79.33% | 70.00% |
| Fluazinam | 56.00% | 58.67% |
| Metalaxyl-M•fludioxonil | 75.33% | 78.00% |
| Urea | 75.33% | 72.67% |
| Huanzhitian | 81.33% | 105.33% |
| Ancoli | 90.00% | 81.33% |

TABLE 23-continued

| Compatibility of M173 with chemical pesticides | | |
|---|---|---|
| | Survival rate at 2 h (%) | Survival rate at 6 h (%) |
| Potassium dihydrogen phosphate | 89.33% | 78.00% |
| Ammonium sulfate | 75.33% | 80.67% |

TABLE 24

| Summary of the chemical pesticide & fertilizer compatibility experiment | | |
|---|---|---|
| Class of chemical pesticide | Compatibility | Active ingredients of chemical pesticides & fertilizers |
| Fungicide | Compatible | propamocarb hydrochloride, carbendazim, fluazinam, chlorothalonil, quintozene, thiram, fosetyl-aluminum, metalaxyl-M, metalaxyl-M•fludioxonil |
| Insecticide | Compatible | thiamethoxam, dinotefuran, gamma-cyhalothrin, profenofos•phoxim |
| Chemical fertilizer | Compatible | urea, ammonium sulfate, Huanzhitian, ancoli, potassium dihydrogen phosphate |

Example 15. Experimental Report on Improvement of Stress Resistance of Crops by M173

1. Salt (NaCl) Resistance Pot Experiment
1) Experimental Methods for Salt Resistance Test:
Principle: Plants are composed of cells. The stability of cells is mainly maintained by the difference in ion concentration inside and outside the cells. When the Na+ concentration in plant leaves is high, leaf tips will curl, or leaf edges will become scorched. A high Na+ concentration will also hinder the plant's absorption of $Ca^{2+}$, causing calcium deficiency in the plant, and resulting in seedling aging and no fruit. The blocked calcium ion accumulation will lead to obstruction of element absorption in a series of crops.

The cultivated cucumber seedlings were thinned out to 2 seedlings per pot. 6 pots were used for each treatment, with 3 replicates. The experimental groups included a clear water blank control (UTC) and irrigation with combined microbial agents. 12-day-old cucumber seedlings were irrigated (1 mL per plant, diluted 50 times before irrigation), and the UTC was irrigated with an equal amount of clear water. After 3 days, salt stress was established by pouring a salt solution of a corresponding concentration into the soil matrix. 3 sodium chloride solution gradients (0, 100, and 200 mM) were set up, and 50 mL was poured into each pot. Subsequently, the salt solution was poured every 3 days, and parameters, mainly including growth data such as dry weight, were measured after 14 days.

2) Results from Salt Resistance Test

Figure 11:
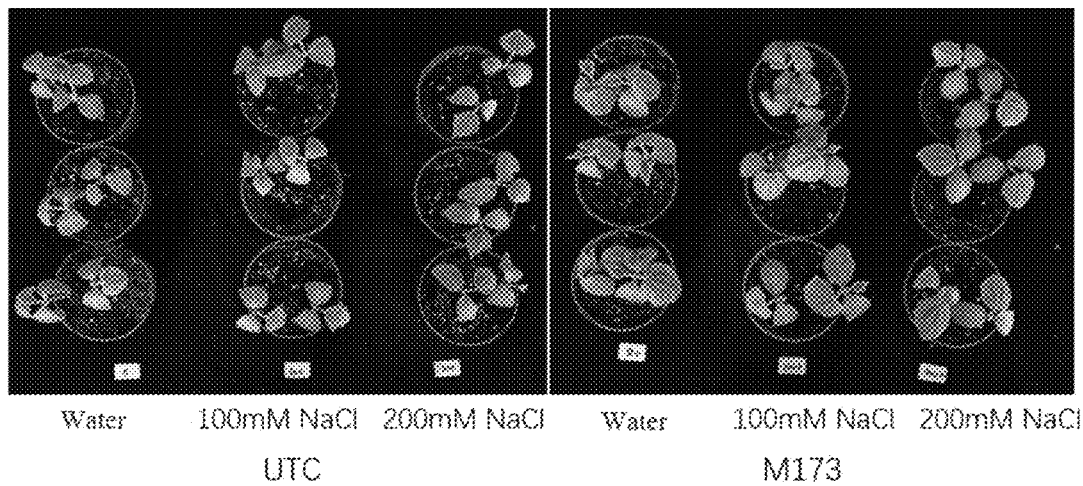
FIG. 11 shows the growth status of cucumber seedlings applied with *Bacillus velezensis* M173 strain at different salt concentrations.

The cucumber seedlings irrigated with M173 exhibited better overall growth status than the untreated group (UTC) (Table 25 and FIG. 11), and a higher biomass than the UTC group. As the concentration of sodium chloride increased, the dry weight of cucumber showed a declining trend. The cucumbers treated with M173 had a higher biomass than the UTC group at different salt concentrations, with a dry weight increase rate of above 10%. As the salt concentration increased, the biomass increase rate of the cucumber irrigated with M173 was increased. Under the condition of treatment with 200 mM NaCl, the biomass of the cucumber treated with M173 was increased by 19.19% as compared to the UTC.

TABLE 25

Dry weight and increase rate for the treatments in the salt resistance test

| Treatment | Dry weight per plant (g) | Dry weight increase rate after M173 treatment (%) |
| --- | --- | --- |
| UTC/water | 0.1664 ± 0.0045ab | / |
| M173/water | 0.1857 ± 0.0086a | 11.55 |
| UTC/100 mM NaCl | 0.1324 ± 0.0023cd | / |
| M173/100 mM NaCl | 0.1544 ± 0.0078bc | 16.66 |
| UTC/200 mM NaCl | 0.1019 ± 0.0093e | / |
| M173/200 mM NaCl | 0.1215 ± 0.0084de | 19.19 |

Note:
Different letters represent significant differences, $P < 0.05$.

Figure 12:
FIG. 12 shows the situation of cucumber in the group of applying *Bacillus velezensis* M173 after irrigation with 200 mM sodium chloride and the UTC group (untreated group).
Figure 13:
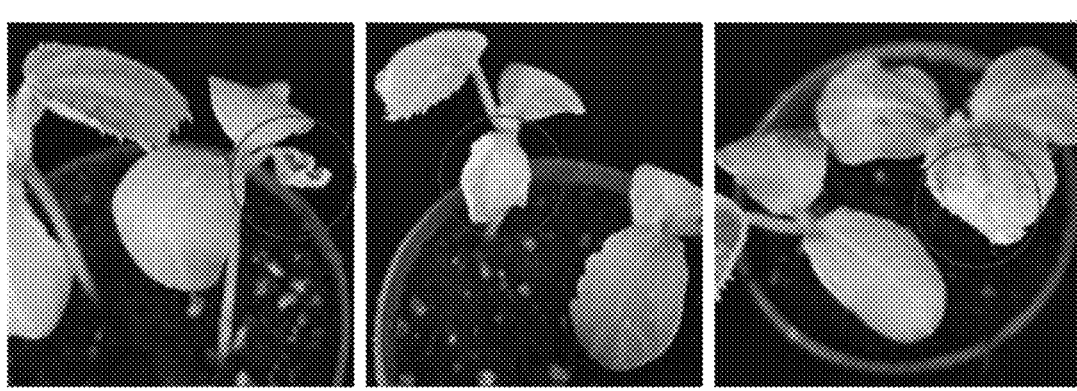
FIG. 13 shows the damage to cucumbers under salt damage.

Irrigation with 100 mM sodium chloride caused a mild salt damage to cucumber. The cucumber in the UTC group and the cucumber treated with M173 had no obvious salt damage response. The cucumber in the UTC group irrigated with 200 mM sodium chloride exhibited leaf dryness and plant death, while the cucumber plants irrigated with M173 still grew healthily without any salt damage (FIGS. 12 and 13).

3) Experimental conclusion: M173 can promote the growth of cucumber under both normal conditions and salt stress, and M173 can reduce the damage to cucumber by a high salt environment. The cucumber treated with M173 grew better under salt stress. M173 has the effect of reducing salt damage to crops, providing a theoretical basis for its promotion in adverse soil environments with a high salt content.

Example 16. Pot Experiment to Test Alleviation of Phytotoxicity

1) Experimental methods: Metalaxyl-M·Mancozeb is a low-toxic composite fungicide obtained by mixing metalaxyl-M with mancozeb in a scientific ratio, which is specially used to prevent and control lower fungal diseases. It has both protective and therapeutic effects. The two fungicidal mechanisms provide complementary advantages and can delay development of pesticide resistance in pathogens. It is safe to use.

In production, it is mainly used to prevent and control: late blight of tomato; downy mildew of cucurbits such as cucumber and melon; blight and downy mildew of pepper; downy mildew of cauliflower; blight of watermelon and melon; late blight of potato; black shank of tobacco; downy mildew of grape; downy blight of litchi; etc.

The cultivated cucumber seedlings were thinned out to 2 seedlings per pot. 6 pots were used for each treatment, with 3 replicates. The experimental groups included a clear water blank control (UTC) and irrigation with microbial agents. The cucumber seedlings that had grown true leaves were evenly sprayed with the chemical pesticide Metalaxyl-M Mancozeb at gradients of 500× (recommended dilution factor), 250× (2 times), and 125× (4 times) on the cucumber surface. After 4-7 d (depending on the situation of phytotoxicity), the microbial agent (1 mL per plant, diluted 50 times before irrigation) was applied, and the CK was irrigated with an equal amount of clear water. After 7 days, parameters, mainly including growth data such as plant height, stem diameter, and dry weight, were measured, and the grade of the phytotoxicity was also recorded.

Phytotoxicity Grading Standard:

Grade 0: Leaves of cucumber seedling are normal.

Grade 1: The yellowing and spotting area of leaves of cucumber seedlings is less than ¼.

Grade 2: The yellowing and spotting area of leaves of cucumber seedlings is between ¼ and ½.

Grade 3: The yellowing and spotting area of leaves of cucumber seedlings is greater than ½, but does not cover the entire leaf.

Grade 4: Leaves of cucumber seedling are completely yellowed and withered.

$$\text{Phytotoxicity index} = \left(\sum(\text{Number of leaves at each grade} \times \right.$$
$$\text{Representative value of the grade})/(\text{Total number of}$$
$$\left. \text{leaves investigated} \times \text{Value of the highest disease grade})\right) \times 100$$

$$\text{Relative control effect (\%)} =$$
$$(\text{Phytotoxicity index of the control group} - \text{Phytotoxicity index of the}$$
$$\text{treatment group})/\text{Phytotoxicity index of the control group} \times 100\%$$

TABLE 26

Contents of the treatments in the phytotoxicity test

| Treatment | Microbial agent | Dilution factor of chemical pesticide |
| --- | --- | --- |
| UTC/Metalaxyl-M•Mancozeb 125x | / | 125x |
| M173/Metalaxyl-M•Mancozeb 125x | M173 | 125x |
| UTC/Metalaxyl-M•Mancozeb 250x | / | 250x |
| M173/Metalaxyl-M•Mancozeb 250x | M173 | 250x |
| UTC/Metalaxyl-M•Mancozeb 500x | / | 500x |
| M173/Metalaxyl-M•Mancozeb 500x | M173 | 500x |

Figure 14:
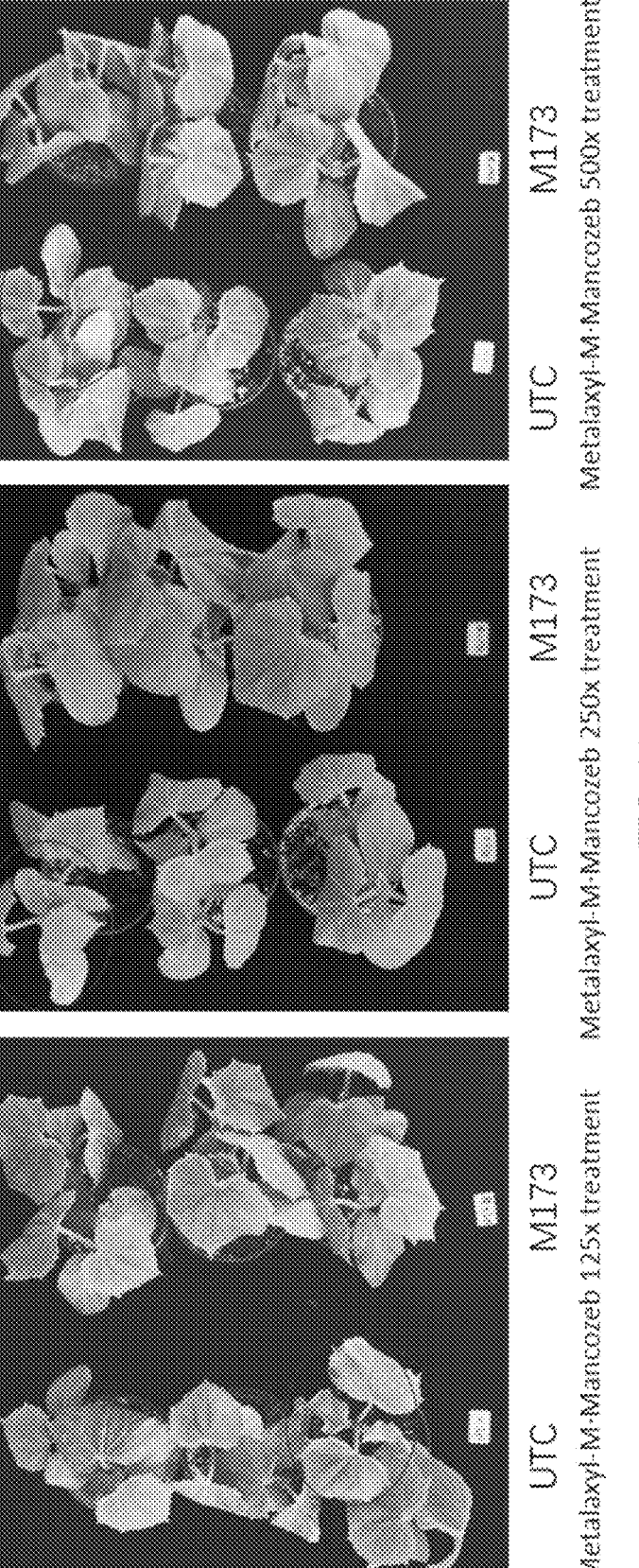
FIG. 14 shows the growth status of cucumber seedlings in various treatment groups for alleviating phytotoxicity.

2) Experimental results (FIG. 14): The cucumber sprayed with Metalaxyl-M-Mancozeb exhibited different degrees of phytotoxicity, mainly manifested by yellowing of leaves and withered spots, and in severe cases, withered and curled leaves. The overall trend was that the higher the concentration, the more serious the phytotoxicity. The cucumber treated at the recommended dilution factor (500×) had a small number of yellowed leaves, which might be associated with the small size of cucumber seedlings.

The phytotoxicity of the cucumber seedlings irrigated with M173 was less severe than that of the UTC group. Under treatment with a high concentration (125× dilution) of chemical pesticide, the phytotoxicity index of the M173 treatment group was significantly different from that of the UTC group, and the phytotoxicity control effect of the M173 treatment group reached 47.18% (Table 27). For application of 250× and 500× diluted chemical pesticide, M173 also had certain control effects, which were 21.32% and 15.01%, respectively (Table 27).

There was no significant difference in expansion degree and stem diameter between the UTC group and the M173 treatment group, but numerically, the M173 treatment had a certain advantage. For the cucumber sprayed with a moderate concentration (250× dilution) of Metalaxyl-M·Mancozeb, M173 treatment caused a 19.51% increase in biomass as compared to the UTC group, with a significant difference.

TABLE 27

Physiological parameters and phytotoxicity index in the phytotoxicity alleviation test

| Treatment | Expansion degree (cm) | Stem diameter (mm) | Dry weight per plant (g) | Phytotoxicity index (%) | Relative control effect (%) |
|---|---|---|---|---|---|
| UTC/Metalaxyl-M•Mancozeb 125x | 13.8 ± 0.46a | 4.31 ± 0.08a | 0.45 ± 0.01ab | 23.44 ± 4.07a | / |
| M173/Metalaxyl-M•Mancozeb 125x | 13.56 ± 0.13a | 4.47 ± 0.13a | 0.45 ± 0.01ab | 12.28 ± 0.17b | 47.18 |
| UTC/Metalaxyl-M•Mancozeb 250x | 13.08 ± 0.31a | 4.16 ± 0.05a | 0.41 ± 0.03b | 15.1 ± 2.1b | / |
| M173/Metalaxyl-M•Mancozeb 250x | 14 ± 0.15a | 4.55 ± 0.06a | 0.49 ± 0.02a | 11.88 ± 0.54b | 21.32 |
| UTC/Metalaxyl-M•Mancozeb 500x | 13.46 ± 0.56a | 4.18 ± 0.11a | 0.5 ± 0.01a | 4.33 ± 1.38c | / |
| M173/Metalaxyl-M•Mancozeb 500x | 14.14 ± 0.26a | 4.35 ± 0.22a | 0.52 ± 0.04a | 3.68 ± 0.52c | 15.01 |

Note:
Different letters represent significant differences, $P < 0.05$.

3) Experimental conclusion: M173 can alleviate the damage caused by Metalaxyl-M·Mancozeb. Under the condition of spraying with a high concentration (125× dilution) of chemical pesticide, the phytotoxicity control effect of the cucumber treated with M173 reached 47.18%.

Example 17. Pot Experiment for Cold Resistance Test

1) Experimental methods: The cultivated cucumber seedlings were thinned out to 2 seedlings per pot. 6 pots were used for one treatment, with 3 replicates. The experimental groups included a total of 6 treatment groups as shown in Table 28, in which the competitor was the microbial agent Daibolu. The test conditions were normal temperature of 25° C./20° C. (day/night) and low temperature of 15° C./10° C. (day/night), a root humidity maintained at 70-90%; and the same light intensity of 700-1200 μmol/s. 12-day-old cucumber seedlings were irrigated with the microbial agent, and the seedlings in the control group were irrigated with the same amount of clear water. After 7 days, the seedlings were transferred to a low-temperature incubator and cultured for 14 d before measurement of parameters, mainly including growth data such as plant height, stem diameter, chlorophyll content, and dry weight. If there was an obvious difference, membrane lipid peroxidation indicators such as malondialdehyde were measured as appropriate (June May, 2016).

TABLE 28

Contents of the treatment groups in the cold resistance test

| Treatment | Microbial agent | Temperature |
|---|---|---|
| M173-low temperature | M173 | 15° C./10° C. |
| Competitor - low temperature | Competitor (Daibolu) | 15° C./10° C. |
| CK- low temperature | / | 15° C./10° C. |
| M173-UTC | M173 | 25° C./20° C. |
| Competitor-UTC | Competitor (Daibolu) | 25° C./20° C. |
| CK-UTC | / | 25° C./20° C. |

Figure 15:
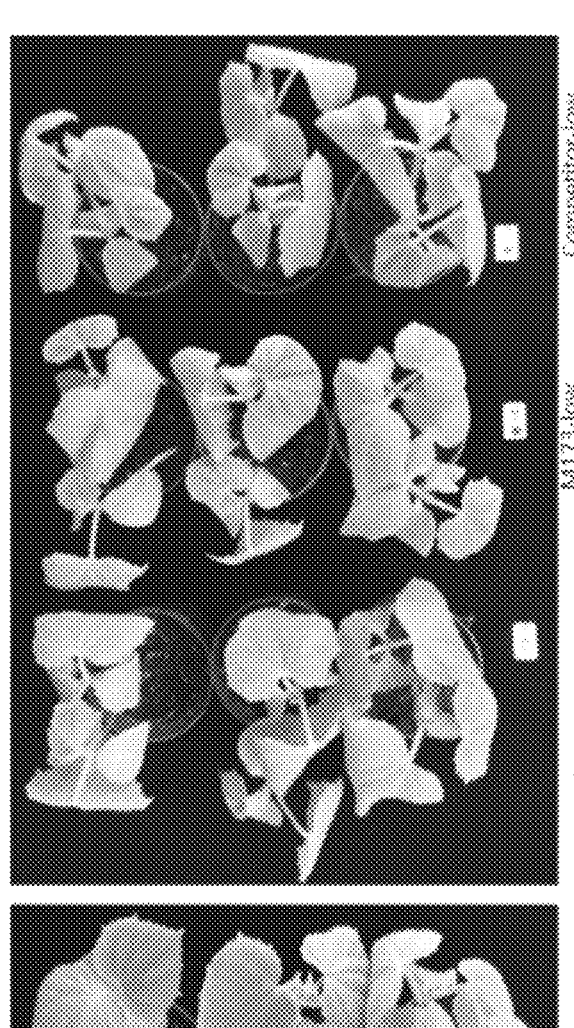
FIG. 15 shows the growth status of cucumber seedlings in various treatment groups in the cold resistance test.
Figure 15:
Figure 15:
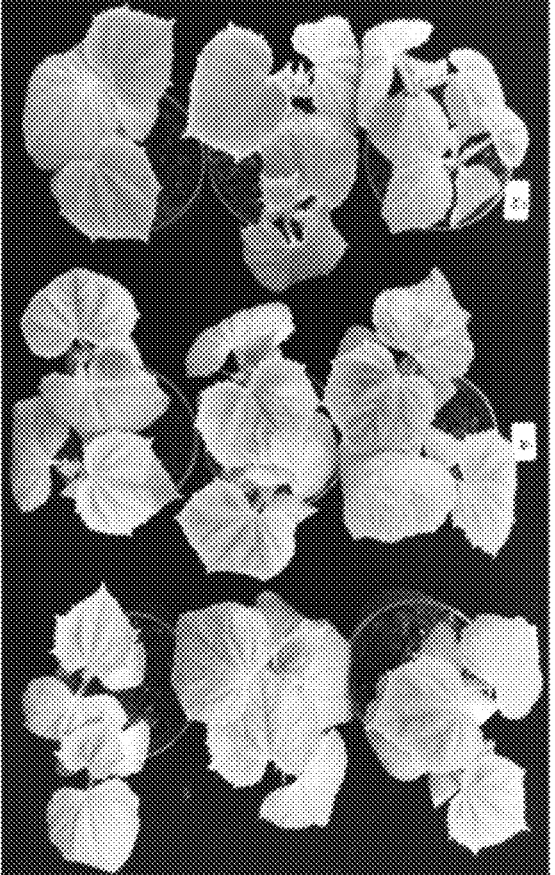

2) Experimental Analysis and Experimental Results:

The experimental results are shown in FIG. 15 and Table 29. Low temperature stress will lead to adverse effects at all stages of plant growth and development. In this experiment, the cucumber seedlings treated at low temperature exhibited worse growth status than treatment at normal temperature (UTC), with yellowed leaves and decreased chlorophyll content. The expansion degree and chlorophyll content of the cucumber treated with M173 were higher than those of CK and the competitor (Daibolu) under both low temperature and normal conditions. The dry weight per plant treated with M173 was increased by 16.22% under normal temperature and by 10.96% under low temperature as compared to CK, both indicating a good growth-promoting effect. The competitor (Daibolu) had no growth-promoting effect under both low temperature and normal conditions.

Under low temperature stress conditions, M173 can reduce the adverse effects of stress environment by promoting crop growth and increasing chlorophyll content.

TABLE 29

| | Expansion degree (cm) | Stem diameter (mm) | Chlorophyll content (SPAD) | Dry weight per plant (g) | Increase rate of dry weight per plant (%) |
|---|---|---|---|---|---|
| Physiological parameters in the cold resistance test | | | | | |
| M173- low temperature | 14.8 ± 0.29a | 3.85 ± 0.05b | 26.96 ± 0.54b | 0.4252 ± 0.007c | 10.96 |
| Competitor - low temperature | 13.78 ± 0.59ab | 3.89 ± 0.06b | 26.59 ± 0.65b | 0.37 ± 0.0218c | −3.44 |
| CK - low temperature | 13.56 ± 0.19ab | 3.89 ± 0.03b | 26.26 ± 0.84b | 0.3832 ± 0.0126c | / |
| M173-UTC | 13.91 ± 0.38a | 4.13 ± 0.1a | 34.05 ± 1.26a | 0.5868 ± 0.0278a | 16.22 |
| Competitor - UTC | 12.33 ± 0.77b | 4.21 ± 0.05a | 31.97 ± 1.58a | 0.5026 ± 0.0187b | −0.46 |
| CK-UTC | 13.61 ± 0.24ab | 4.04 ± 0.05ab | 32.41 ± 1.88a | 0.5049 ± 0.0004b | / |

Note:
Different letters represent significant differences, $P < 0.05$.

3) Experimental conclusion: M173 can promote the growth of cucumber in low temperature environment and reduce the damage to cucumber caused by low temperature stress.

Example 18. Pot Experiment for Drought Resistance Test

1) Experimental Methods:

Principle: PEG-6000 (polyethylene glycol) is an ideal polymeric penetrant, which can provide a stable osmotic pressure, limit the water absorption rate of plants, and can be used to simulate drought and water shortage environments.

Plump cucumber seeds of uniform size were selected and sown in seedling trays, and irrigated with a constant amount of watered regularly. Cucumber seedlings of about 12 days old were transplanted into non-porous planting pots, 1 seedling per pot. 6 pots of seedlings were used for each treatment, with 3 replicates. The experimental groups included a clear water blank control group (CK-UTC), a 20% PEG-6000 treatment group (CK-PEG), and a group involving irrigation with a composite microbial agent on the basis of PEG treatment. After transplantation, the seedlings were first irrigated with the composite microbial agent (1 mL per plant, diluted 50 times before irrigation; thorough irrigation was recommended), and the CK-UTC and CK-PEG treatment groups were irrigated with the same amount of clear water. After seedling recovery, the seedlings except those in the CK-UTC group were irrigated with 20% PEG-6000 once to ensure that the soil was thoroughly soaked with the solution. The treated potted plants were placed in a greenhouse for cultivation and observed regularly. After 12 days, the survival rate of the seedlings was calculated, and the stem diameter, dry weight and expansion degree were recorded as appropriate.

TABLE 30

| Treatment | Microbial agent | PEG content |
|---|---|---|
| Contents of the treatments in the drought resistance test | | |
| CK-UTC | / | / |
| CK-PEG | / | 20% |
| M173-PEG | M173 | 20% |
| Competitor-PEG | Daibolu | 20% |

2) Experimental Analysis and Results

Figure 16:
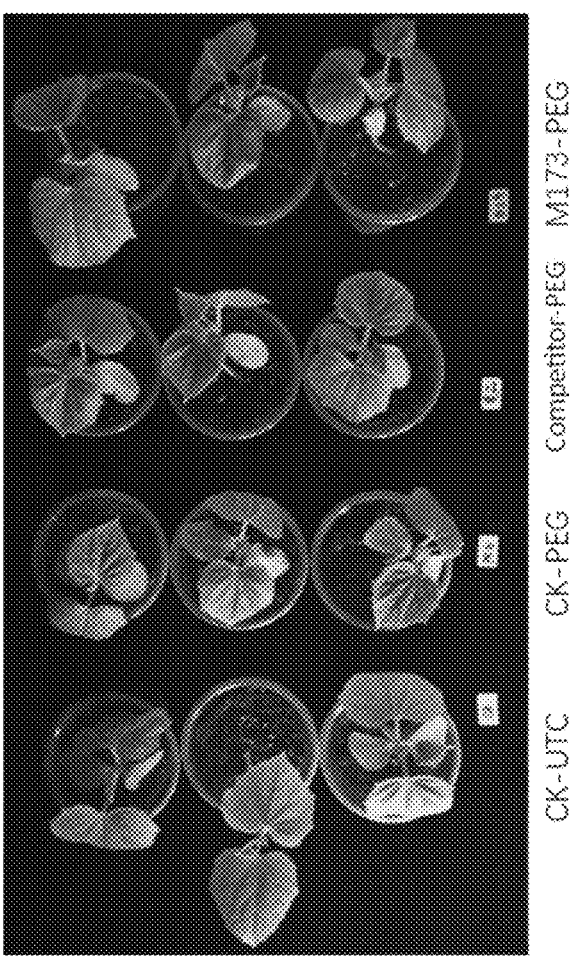
FIG. 16 shows the growth status of cucumber seedlings in various treatment groups in the drought resistance test.

The experimental results are shown in FIG. 16 and Table 31. Under drought stress, water absorption by plant roots is blocked, thereby affecting the normal growth and development of the plant. In this experiment, the growth status of the cucumber seedlings treated with CK-PEG was worse than that under normal temperature condition (CK-UTC), the expansion degree, stem diameter and dry weight per plant were all lower than those under CK-UTC, and there were significant differences in expansion degree and stem diameter between the two treatments.

Under the drought condition simulated by PEG, the cucumber seedlings irrigated with M173 grew the best. Their expansion degree was significantly higher than that of the CK treatment, and their stem diameter and dry weight per plant also performed best. Their growth status was even close to that of cucumber without drought treatment.

TABLE 31

| Treatment | Expansion degree (cm) | Stem diameter (mm) | Dry weight per plant (g) |
|---|---|---|---|
| Physiological parameters in the drought resistance test | | | |
| CK-UTC | 15.23 ± 0.21a | 3.92 ± 0.1a | 0.5668 ± 0.0264a |
| CK-PEG | 13.5 ± 0.44c | 3.49 ± 0.12b | 0.5183 ± 0.0423a |
| Competitor-PEG | 14 ± 0.34bc | 3.53 ± 0.07b | 0.4991 ± 0.0113a |
| M173-PEG | 14.79 ± 0.15ab | 3.76 ± 0.15ab | 0.5293 ± 0.0198a |

Note:
Different letters represent significant differences, $P < 0.05$.

3) Experimental results: M173 can improve the growth status of cucumber in drought environments and reduce the inhibition of crop growth by drought stress, indicating that under drought stress conditions. M173 can reduce the adverse effects of stress environments by promoting crop growth.

Example 19. Pathogen Inhibition Experiment on Plates 1.1 Test pathogens: *Botrytis cinerea, Colletoirichum capsici, Fusarium oxysporum, Rhizoctonia solani, Athelia roifvii, Streptomyces scabies*, and *Ralstonia solanacearum*.

1.2 Grouping: A blank control group, a control *Bacillus velezensis* group (these strains were obtained by the screening and identification methods as described in Example 1) and a *Bacillus velezensis* M173 group, with 5 replicates per group.

1.3 Experimental Methods:

The blank control group: (Treatment of fungi) A fungal cake (5 mm in diameter) was taken from the edge of colony of the fungal pathogen activated for 3 days, placed 2.5 cm away from the center of a PDA plate, and cultured at a constant temperature of 28° C. (Treatment of bacteria) 100 μL of a pathogen solution of *Streptomyces scabies* or *Ralstonia solanacearum* was pipetted onto an LA plate, spread evenly, and air dried.

The control *Bacillus velezensis* group (*Bacillus velezensis* 1, *Bacillus velezensis* 2, *Bacillus velezensis* 3, *Bacillus velezensis* 4. *Bacillus velezensis* 5, and *Bacillus velezensis* 6; all the strains were obtained according to the screening and identification methods as described in Example 1).

The *Bacillus velezensis* M173 group: (Fungal inhibition test) A fungal cake (5 mm in diameter) was taken from the edge of colony of the fungal pathogen activated for 3 days, and placed in the center of a PDA plate. A bacterial lawn of *Bacillus velezensis* M173 activated for 1 day was scraped, inoculated by streaking in parallel 2 cm away from both sides of the pathogen cake, and cultured at a constant temperature of 28° C. (Bacterial inhibition test) 100 μL of a pathogen solution of *Streptomyces scabies* or *Ralstonia solanacearum* was pipetted onto an LA plate, spread evenly, and air dried. A puncher was used to punch filter paper into pieces of paper with a diameter of 0.6 cm, which were sterilized for later use. The sterile filter paper pieces were placed by tweezers on an LA plate, 3 pieces per plate, in a regular triangle distribution. 5 μl of the M173 fermentation broth was pipetted and dropped onto the filter paper pieces on the above plate.

1.4 Calculation of Pathogen Inhibition Rate:

After inoculation, the plate was subjected to inverted incubation. After 1-7 days, the diameter of pathogen/width of the inhibition zone was measured, and the pathogen inhibition rate was calculated according to the following formulae. The formulae for calculating the pathogen inhibition rate are as follows:

Fungal inhibition rate =

(Pathogen colony diameter of the blank control group −

Pathogen colony diameter of the *Bacillus velezensis* M173 treatment group)/Pathogen colony diameter of the blank control group × 100%;

Width of bacterial inhibition zone =

(Diameter of bacterial inhibition zone − Diameter of

*Bacillus velezensis*)/2,

Bacterial antagonism index =

Width of bacterial inhibition zone/Radius of *Bacillus velezensis*.

1.5 Results:

TABLE 32

| Experimental results of pathogen inhibition by *Bacillus velezensis* M173 | | | | |
| --- | --- | --- | --- | --- |
| Pathogen | Latin Name | Main disease caused | Pathogen inhibition rate of M173 | Antagonism index of M173 |
| Botrytis cinerea | *Botrytis cinerea* | Gray mold diseases on leaf surface and fruit | 42.86% | |
| Colletotrichum capsici | *Colletotrichum capsici* | Anthracnose on leaf surface, stem and fruit | 27.27% | |
| Fusarium oxysporum | *Fusarium oxysporum* | Fusarium wilt of roots | 53.85% | |
| Rhizoctonia solani | *Rhizoctonia solani* | Damping-off at seedling stage | 58.14% | |
| Athelia rolfsii | *Athelia rolfsii* | Southern blight of peanut | 61.83% | |
| Streptomyces scabies | *Streptomyces scabies* | Scab of potato | | 2.80 |

Figure 17:
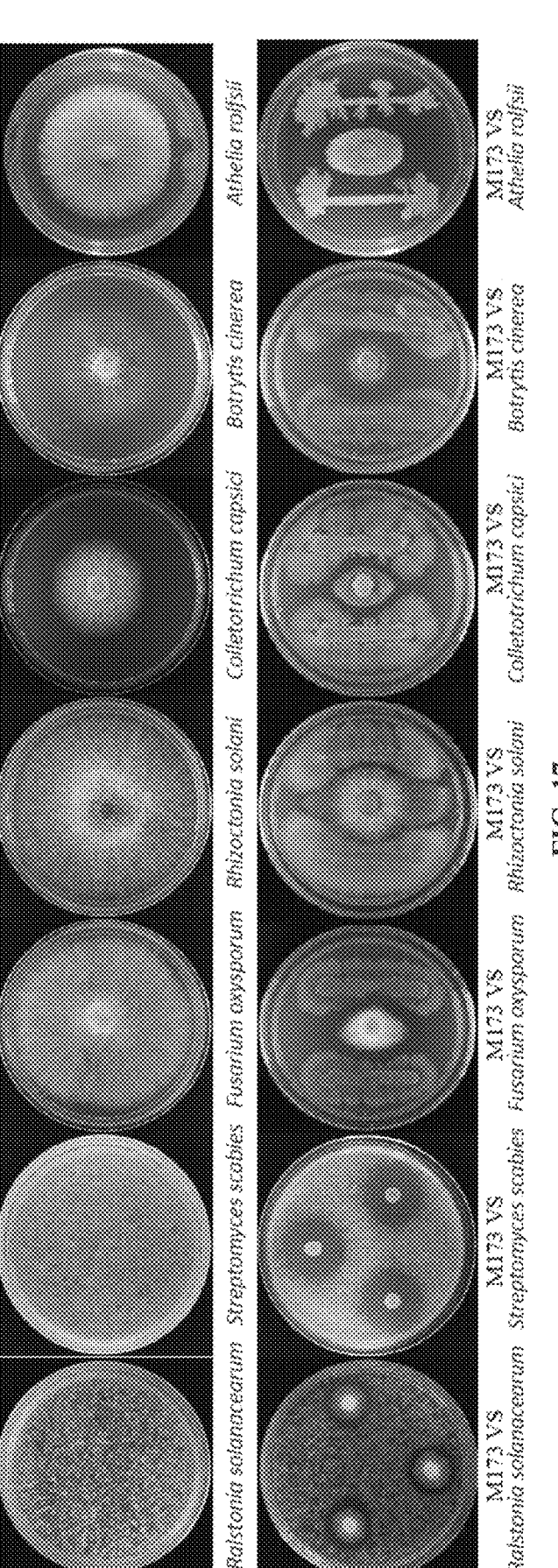
FIG. 17 shows the plate antimicrobial effect of *Bacillus velezensis* M173.

It can be seen from Table 32 and FIG. 17 that *Bacillus velezensis* M173 has good inhibitory effects on fungal pathogens and bacterial pathogens.

For fungal diseases, the *Bacillus velezensis* M173 strain of the present invention has good application prospects in crops' resistance to pathogens, especially to gray mold, *fusarium* wilt, damping-off, Southern blight, etc.

For bacterial diseases, it can be seen from the plate antagonistic experiment that the M173 strain of the present invention has good inhibitory effects on bacterial diseases (such as potato scab and bacterial wilt).

TABLE 33

| | | | | Control effect on |
| | | Antagonism | Control effect | effect on |
| | Latin | index on scab | | on bacterial | damping |
| Strain No. | Name | pathogen | Biofilm | wilt (%) | -off (%) |
| --- | --- | --- | --- | --- | --- |
| M173 | Bacillus velezensis | 2.80 | +++ | 64.79 | 58.14 |
| Bacillus velezensis 1 | Bacillus velezensis | 1.79 | — | 48.94 | 30.22 |
| Bacillus velezensis 2 | Bacillus velezensis | 1.23 | No | −21.95 | 31.73 |
| Bacillus velezensis 3 | Bacillus velezensis | 1.64 | No | 49.33 | 34.9 |
| Bacillus velezensis 4 | Bacillus velezensis | 1.57 | +++ | −6.76 | 62.48 |
| Bacillus velezensis 5 | Bacillus velezensis | 1.52 | +++ | 55.17 | 30.75 |
| Bacillus velezensis 6 | Bacillus velezensis | 2.10 | +++ | −13.79 | 51.15 |

Screening of *Bacillus velezensis*:

The experimental results in Table 33 show that even though they belong to the same *Bacillus velezensis*, different strains have very different characteristics and biocontrol effects. In the strains, the M173 strain of the present invention has outstanding advantages.

Example 20. *Bacillus velezensis* Peanut Seed-Coating Agent 1.1 Peanut Coating Preparation of a conventional seed-coating agent: The formula of the conventional seed-coating agent: sucrose 5%. PVPK30 10%, PEG 3%, dispersant MF 2%, and polyethylene glycol 5%. Each component was provided according to mass fraction. A seed-coating agent of 1 billion CFU/mL was prepared, and peanut seeds of similar size and texture were added to the microbial seed-coating agent at a ratio of 1:100 (weight ratio of the microbial seed-coating agent to the seeds). The seeds were shaken to allow the strain to be evenly adsorbed on the seeds. The effects on their germination and growth at seedling stage were tested using M173 coated peanut.

1.2 Bacterial Count on the Surface after Seed Coating Treatment

TABLE 34

Bacterial count on the surface of coated seeds in the treatment groups

| Treatment | Bacterial count on seed surface (per seed) |
| --- | --- |
| M173 | 1.9 × 10^6 |
| Blank | / |
| Ck | / |

1.3 Seed Germination Rate after Coating

TABLE 35

Effects of the treatments on peanut germination rate

| Treatment | Germination rate (%) |
| --- | --- |
| M173 | 76.67 ± 4.41a |
| Blank | 51.67 ± 11.67b |
| Ck | 63.33 ± 4.41ab |

The results in Table 35 confirm that M173 coating has a certain promoting effect on the germination of peanut. The germination rate was 76.67%, which was significantly higher than that of the blank seed-coating agent group (51.67%), and higher than that of the CK group (63.33%).

1.4 Effects of Coating on Peanut Growth Promotion Parameters

As shown in FIG. 18, FIG. 19 and Table 36, the M173-coated peanut grew the best, and the plant height, dry weight of aboveground parts, and dry weight of underground parts all performed best, but there was no significant difference from CK.

TABLE 36

| | | Dry weight of overground parts | Dry weight of underground parts | Dry weight per plant | Dry weight increase rate % |
|---|---|---|---|---|---|
| Treatment | Plant height | | | | |
| M173 | 14.18 ± 0.35a | 0.5102 ± 0.008a | 0.1037 ± 0.002a | 0.6139 ± 0.0099a | 4.28 |
| Blank | 11.93 ± 0.96ab | 0.4565 ± 0.0373a | 0.0951 ± 0.014a | 0.5515 ± 0.0487a | −6.32 |
| Ck | 11.95 ± 0.89ab | 0.4976 ± 0.0118a | 0.0911 ± 0.0051a | 0.5887 ± 0.0079a | / |

Effects of the treatments on peanut growth parameters

Note:
Different letters represent significant differences, P < 0.05.

Example 21. Experiment on Control of Corn Stem Rot by Seed Coating with M173

1.1 Experimental Materials and Treatments in Experimental Groups:

Corn variety: Jinyu 509

Microbial agent sample: M173

Preparation of pathogen: *Fusarium graminearum* (P067) was cultured in CMC culture medium to $10^6$ cfu/ml (cultured in a shake flask for 7 days).

Chemical pesticide control: Fludioxonil-metalaxyl-M seed-coating suspension.

TABLE 37

Dosages of agents

| Treatment | Agent | Dosage |
|---|---|---|
| 1 | M173 | 5x dilution, 1:100 coating |
| 2 | Chemical pesticide (Fludioxonil•metalaxyl-M) | 10x dilution, 1:80 coating |
| 3 | Adjuvant control | The same as treatments 1-4 |
| 4 | Blank control | Clear water, 1:80 coating |

1.2 Experimental Methods

Preparation of a conventional seed-coating agent: The formula of the conventional seed-coating agent: sucrose 5%, PVPK30 10%, PEG 3%, dispersant MF 2%, and polyethylene glycol 5%. Each component was provided according to mass fraction. A seed-coating agent of 1 billion CFU/mL was prepared, and corn seeds of similar size and texture were added to the microbial seed-coating agent at a ratio of 1:100 (weight ratio of the microbial seed-coating agent to the seeds). The seeds were shaken to allow the strain to be evenly adsorbed on the seeds. The effects on their germination and growth at seedling stage were tested using M173 coated corn.

The adjuvant control was a blank seed-coating agent in which the microbial component of the seed-coating agent was filled with maltodextrin. The chemical pesticide was fludioxonil-metalaxyl-M, which was diluted 10 times and used for coating at 1:80.

The dressed seeds were air dried and then planted in sterilized soil, with 3 plants/pot, 6 pots/replicate, and 3 replicates/treatment. The planted corn was irrigated with $10^6$ cfu/ml of the pathogen (50 ml/pot). Water was added every day to maintain the soil humidity at above 90%.

Water and fertilizer management: 1% NPK water-soluble fertilizer was applied on day 7.

1.3 Experimental Data

Seedlings were harvested 2 weeks after planting. The disease index of corn in each treatment was recorded.

Disease index grading of corn stem rot at seedling stage:

Grade 0: The whole plant grows normally and is disease-free.

Grade 1: The aboveground and underground parts are basically normal, with a small number of disease spots visible on the roots. The area of the disease spots accounts for less than ¼ of the root surface area. The root mass is white with brown in color.

Grade 2: The aboveground and underground growth is obviously hindered. Leaves turn yellow. The plant height is only ¾ of that of the control. Lateral roots are few and short. There is no fibrous root. The disease spots are contiguous. The area of the disease spots accounts for ¼-½ of the total root surface area. The root mass is white and brown in color.

Grade 3: The growth of the aboveground and underground parts is extremely abnormal Yellowing and withering are visible on the aboveground parts. The plant height is only ½ of that of the control. Lateral roots are extremely small. The area of disease spots accounts for ½-¾ of the total root area. The root mass is brown with white in color.

Grade 4: The plant germinates, but fails to develop seedling, and almost dies from suffocation. The area of disease spots accounts for more than ¾ of the total root surface area. The roots are brown in color.

Disease index (%) =

$$\left(\sum(\text{Number of plants at each disease grade} \times \text{Value of the grade})/\right.$$

$$\left.(\text{Total number of plants} \times \text{Value of the highest grade})\right) \times 100\%.$$

Relative control effect (%) =

$$((\text{Disease index of the negative control group} -$$

$$\text{Disease index of the experimental group})/$$

$$\text{Disease index of the negative control group}) \times 100\%.$$

TABLE 38

Corn germination rate, disease index and relative control effect of the treatments

| No. | Treatment | Germination rate (%) | Disease index (%) | Relative control effect (%) |
|-----|-----------|----------------------|-------------------|------------------------------|
| 1 | M173 | 29.63 ± 8.07ab | 10.12 ± 5.29bc | 82.24 |
| 2 | Chemical pesticide (Fludioxonil•metalaxyl-M seed-coating suspension) | 38.89 ± 6.42a | 0 ± 0c | 100.00 |
| 3 | Adjuvant control | 18.52 ± 1.85bc | 42.36 ± 4.86ab | 25.66 |
| 4 | Blank control | 20.37 ± 1.85bc | 56.98 ± 7.66a | / |

Note:
Different letters represent significant differences, P < 0.05.

Example 22. Experiment of Drip Irrigation with M173 on Tomato Bacterial Wilt 1.1 Experimental Materials Tomato variety: Xinxing 101, from Guangdong Kenong Biotech;

Moon's product: M173 microbial agent (with a bacteria count of 10 billion cfu/mL); Competitor: Serenade.

*Ralstonia solanacearum* (R.s): a highly pathogenic strain isolated from diseased tomato plants in experimental fields of the South China Agricultural University, with a number of MN R.S2.

1.2 Preparation of R.s Suspension

*Ralstonia solanacearum* R.s was activated from a glycerol tube to a TTC plate (5 g of glucose, 10 g of peptone, 1 g of casein hydrolysate, 15 g of agar, water added to 1 L, sterilized at 121° C. for 20 min, cooled to 60° C., and then TTC was added to a final concentration of 0.005% (W/V)). After culturing for 2 d, an *Ralstonia solanacearum* colony with a high activity was selected and transferred to SPA liquid culture medium (20 g of sucrose, 5 g of bacteriological peptone, 0.5 g of $K_2HPO_4$, 0.25 g of $MgSO_4$, water added to 1 L, adjusted to pH 7.0-7.2, and sterilized at 121° C. for 20 min), and cultured on a shaker for 8-16 h. Then, the R.s was diluted to $3*10^6$ CFU/mL according to the absorbance at $OD_{600}$ to prepare an R.s suspension for later use.

1.3 Fermentation and Activation of M173

The fermentation process of the M173 strain was optimized by selecting the optimal ratio of carbon source to nitrogen source and controlling the pH environment such that M173 could be fermented to a bacterial count of 10 billion cfu/mL.

Specifically, the optimized culture medium was composed of: carbon source 30-50 g/L (selected from one of starch hydrolysate, corn flour, glucose or sucrose), nitrogen source 40-60 g/L (selected from one of soybean meal or peptone), inorganic salts (including disodium hydrogen phosphate 2-5 g/L, magnesium sulfate 0.5-2 g/L and sodium carbonate 1-2 g/L), and trace elements 0.01-0.02 g/L ($ZnSO_4$ and/or $MnSO_4$).

The fermentation process was as follows; taking a 50 L fermentation tank as an example, the pH was adjusted to 7±0.2 with 2 M dilute sulfuric acid at the beginning of fermentation, and controlled at pH 6-8 during the fermentation. In the early stage of fermentation, dissolved oxygen was increased, with an air volume of 0.5-1.2 vvm and a rotation speed of 500-600 rpm. In the later stage of fermentation, dissolved oxygen was controlled, with an air volume of 0.2-0.5 vvm and a rotation speed of 200-300 rpm.

1.4 Dilution of the Product

The treatment solution was diluted with clear water according to Table 39.

TABLE 39

Experimental treatments

| Treatment | Product | Recommended dosage in field | Dosage of microbial agent per plant | Amount of irrigation water per plant |
|-----------|---------|------------------------------|--------------------------------------|---------------------------------------|
| M173-1 L | M173 | 1 L/mu | 0.5 mL | |
| M173-2 L | | 2 L/mu | 1 mL | |
| Serenade -1 L | Serenade | 1 L/mu | 0.5 mL | 50 mL |
| Kocide | Kocide | 1000x dilution | 0.05 g | |
| CK | Water | / | / | |

1.5 Treatment of Tomato Seedlings

The soil on the root surface of 16-day-old tomato seedlings were gently shaken off, and then planted in sterilized soil, one plant per pot. 10 pots were used for each treatment, with 3 replicates. According to the different treatment solutions, a negative control group, a positive control group and microbial agent treatment groups were set up. The treatment solution used in the negative control group was clear water, the treatment solution used in the positive control group was a (1000x dilution of Kocide, and the treatment solution used in the microbial agent treatment groups was the biocontrol microbial agent prepared in 4.2. Each pot was irrigated with 50 mL of the corresponding treatment solution. The potted plants were placed in an environment of 25-28° C. to allow for seedling recovery for 7 d. After 7 days, each seedling in each treatment group was irrigated with 50 mL of the R.s suspension prepared in 4.2 (in the positive control group, an appropriate number of Kocide particles were added to the bacterial suspension, such that the final concentration for irrigation was 1000x). The tomato seedlings were transferred to a disease-inducing greenhouse (not airtight) at 32° C. to promote onset of diseases.

1.6 Observations:

Starting from occurrence of the first sign of a symptom (a bacterial wilt symptom for tomato seedlings) (generally occurred 3-4 days after drip irrigation), the status of tomato seedlings was observed and recorded every 1 or 2 days (the disease situation was recorded according to the grading standard). On days 7-13 (according to the actual disease situation), the number of plants at each disease grade for each treatment was recorded, and the morbidity rate and disease index were calculated according to the following formulae.

Plant disease grades were divided into the following five grades:

Grade 0: No symptom
Grade 1: Wilting of one leaf
Grade 2: Wilting of 2-3 leaves
Grade 3: Whole plant wilting
Grade 4: Plant death Disease index (%) =

$$\left(\sum \text{(Number of plants at each disease grade} \times \text{Value of the grade)}/\right.$$

64

-continued $$\text{(Total number of plants} \times \text{Value of the highest grade)}\bigg) \times 100\%.$$

Control effect (%) =

$$\big((\text{Disease index of the negative control group} - \text{Disease}$$

$$\text{index of the experimental group})/$$

$$\text{Disease index of the negative control group}\big) \times 100\%.$$

1.7 Experimental Results

TABLE 40

Disease situation of tomato under different treatments

| Treatment | Morbidity (%) | Disease index (%) | Relative control effect (%) | Average dry weight per plant (g) | Increase rate of dry weight per plant relative to R · s (%) |
|---|---|---|---|---|---|
| ck | 96.67 | 91.67 ± 2.2a | | 0.1987 | |
| Kocide | 58.52 | 53.43 ± 10.83b | 41.72 | 0.3128 | 57.43 |
| M173 1 L/mu | 53.33 | 42.5 ± 12.83b | 53.64 | 0.2457 | 23.66 |
| M173 2 L/mu | 30.00 | 20.83 ± 8.82c | 77.27 | 0.3133 | 57.72 |
| Serenade-1 L | 90.00 | 802.89a | 12.73 | 0.2470 | 24.33 |

Note:
Different letters represent significant differences, P < 0.05.

In this experiment, the morbidity rate and disease index of CK were both above 90%, indicating a serious disease, which was helpful in evaluating the effects of biocontrol bacteria.

The control effect of M173 on tomato bacterial wilt was increased with the increase of dosage. The control effect of the dosage of 1 L/mu on tomato bacterial wilt was 53.64%, and the control effect of the dosage of 2 L/mu was 77.27%. M173 had a better growth-promoting effect, with a dry weight increase rate of 57.72% at 2 L/mu. The control effect of the competitor Serenade was 12.73%, which was relatively ordinary, and the control effect of the chemical pesticide Kocide was 41.72%.

Example 23. Field Experiment of *Bacillus velezensis* M173

The effect of M173 in prevention of plant death was tested in this example. The specific methods are shown in Table 41.

TABLE 41

Experimental setup

| Treatment | Product | Dosage per plant, ml/plant | Dilution factor | Usage and dosage |
|---|---|---|---|---|
| 1 | Blank control | — | — | — |
| 2 | M173 | 0.5 mL | 400x | Drip irrigation, 200 ml/plant |
| 3 | M173 | 1 mL | 200x | Drip irrigation, 200 ml/plant |
| 4 | Serenade | 0.5 mL | 400x | Drip irrigation, 200 ml/plant |
| 5 | 3% metalaxyl•hymexazol | 0.33 mL | 600x | Drip irrigation, 200 ml/plant |

1. Prevention of Plant Death and Promotion of Growth of Bitter Cucumber by M173

This example provides a case where *Bacillus velezensis* M173 was used in a bitter cucumber test field.

Address of the test field: Liuqingdong, Nansha District, Guangdong Province.

Basic information of the test field: The test site was selected in a large area of bitter cucumber close to edge of the field. In previous years, there were many dead plants when tomato was planted. 3 rows were selected as the test field, with 1 replicate per row. The soil and fertilizer conditions, light, irrigation, and terrain were consistent within one replicate.

The method of using M173 in the test field was as follows:

M173 treatment gradients were set up: 0.5 mL (400×) and 1 mL (200×) per plant. The competitor Serenade (recommended dosage: 0.5 mL per plant) was used as a control. 3% metalaxyl hymexazol was used for chemical pesticide treatment, at a dosage of 0.33 mL (600×) per plant. Non-treatment was used as a blank control. A random block design was used, with an area of 14 square meters per plot and 3 replicates. During the growth period, 3 applications were conducted with an interval of 10-14 days, by means of drip irrigation treatment after dilution. The amount of irrigation water per plant was 200 mL.

Figure 20:
FIG. 20 shows the plant height of bitter cucumber after treatment in different groups.

The plant height was measured 14 days after the first application (FIG. 20). The plant heights in the M173, Serenade, and metalaxyl-hymexazol groups were all increased as compared to CK. The effects of M173 200× and Serenade 400× were better than those of other treatments. The growth-promoting effect of metalaxyl-hymexazol was lower than that of M173 400×.

Figure 21:
FIG. 21 shows the growth status and the number of born fruits of bitter cucumber after treatment in different groups.

The plant growth was investigated after the third application (FIG. 21). According to growth comparison: M173 200×>metalaxyl·hymexazol>M173 400×>Serenade 400× >CK. According to the number of born fruits: M173 200× >M173 400×>Serenade 400×=metalaxyl-hymexazol>CK.

To sum up, M173 had an obvious growth-promoting effect on bitter cucumber, and the growth-promoting effect of M173 200× was better than that of M173 400×. At the same dose, the growth-promoting effect of M173 on bitter cucumber was better than that of Serenade. Especially in terms of the number of born fruits, M173 was significantly better than Serenade.

The growth-promoting effect of a low dose of M173 on bitter cucumber was equivalent to that of metalaxyl-hymexazol. However, in terms of the number of born fruits of bitter cucumber. M173 was significantly better than metalaxyl-hymexazol.

2. Prevention of Plant Death of *Momordica grosvenori* by M173

*Momordica grosvenori* is very prone to plant death during seedling recovery stage. This example provides a case where *Bacillus velezensis* M173 was used in a *Momordica grosvenori* test field.

Address of the test field: Wangbu Town, Qingyuan City, Guangdong Province.

Basic information of the test field: The planting area of *Momordica grosvenori* in the test field was 200 mu. Before transplantation, wax gourd was planted in the test field. Plant death occurred frequently during seedling recovery stage after transplantation of *Momordica grosvenori*. How to help *Momordica grosvenori* survive the seedling recovery period was a concern of farmers.

The method of using M173 in the test field was as follows:

M173 treatment gradients were set up: 1 mL (200×) and 2 mL (100×) per plant. The competitor Serenade (1 mL per plant) was used as a control. 3% metalaxyl hymexazol was used for chemical pesticide treatment, at a dosage of 1 mL per plant. Non-treatment was used as a blank control. A random block design was used, with an area of 60 square meters per plot and 3 replicates. During the growth period, 3 applications were conducted with an interval of 14-20 days, by means of drip irrigation treatment after dilution. The amount of irrigation water per plant was 200 mL.

The number of plants that had grown normally since transplantation in each plot and the number of plants grown through replacing the dead seedlings after transplantation in each plot were counted.

Percentage of normal plants: Number of normal plants/ Total number of plants*100

Survival rate: Total number of surviving plants/Total number of plants*100

In this experiment, a large number of seedling replacements were conducted by farmers from the first application after transplantation to the end of the last investigation. The percentage of normal plants and the survival rate investigated 60 days after transplantation could reflect the effects of test agents in improving the survival rate and reducing the plant death of transplanted *Momordica grosvenori*.

Figure 22:
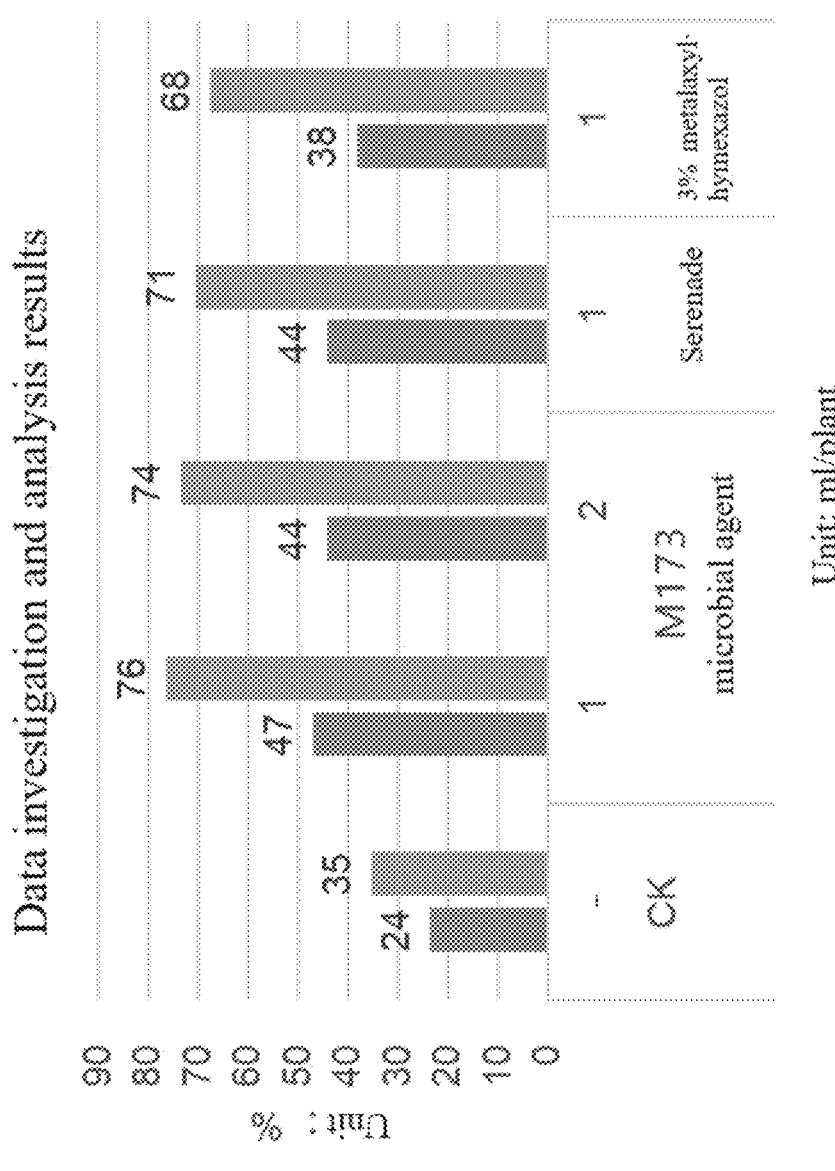
FIG. 22 shows the results of death prevention for *Momordica grosvenori* after treatment in different groups.

The results are shown in FIG. 22. As compared to CK, M173—1 ml/plant could increase the percentage of normal plants of *Momordica grosvenori* by 23% and increase the survival rate by 41%; M173—2 ml/plant could increase the percentage of normal plants of *Momordica grosvenori* by 20% and increase the survival rate by 39%; Serenade–1 ml/plant could increase the percentage of normal plants of *Momordica grosvenori* by 20% and increase the survival rate by 36%; and 3% metalaxyl hymexazol-1 ml/plant could increase the percentage of normal plants of *Momordica grosvenori* by 14% and increase the survival rate by 33%.

Comparison of effects: $M173 - 1$ ml/plant $(200\times) >$ $M173 - 2$ ml/plant $(100\times) >$ Serenade $- 1$ ml/plant $>$ 3% metalaxyl·hymexazol $- 1$ ml/plant.

Example 24. Bacterial Wilt Field Experiment (Pepper Bacterial Wilt & Tomato Bacterial Wilt)

1.1 Control of Pepper Bacterial Wilt by M173

This example provides a case where *Bacillus velezensis* M173 was used in a pepper test field.

Address of the test field: Zengcheng test field, Guangzhou City. Guangdong Province.

Basic information of the test field: The preceding crop was eggplant. Open planting, 2,000 plants per mu.

The method of using M173 in the test field was as follows:

M173 treatment gradients were set up: 0.5 mL (400×) and 1 mL (200×) per plant. The competitor Serenade (0.5 mL per plant) was used as a control. 3% metalaxyl-hymexazol was used for chemical pesticide treatment, at a dosage of 0.33 mL (600×) per plant. Non-treatment was used as a blank control. A random block design was used, with an area of 14 square meters per plot and 3 replicates. During the growth period, 4 applications were conducted with an interval of 7 days, by means of drip irrigation treatment after dilution. The amount of irrigation water per plant was 200 mL.

Plant height investigation: 10 plants were randomly selected to investigate the plant height. Fruit setting number investigation: the total number of born fruits in the plot was counted. There were 40 pepper plants in each plot.

Control effect: (Morbidity rate of $CK$ −

Morbidity rate of the treatment group)/Morbidity rate of $CK \times 100\%$.

The plant height increase rate was: 17.5% for 173-2 liters/mu, 7.4% for 173-1 liter/mu; and 11.4% for Serenade.

The fruit setting number was increased by 15.2% for 173-2 liters/mu, by 20% for 173-1 liter/mu, and by 21.5% for Serenade (173-2 liters/mu was equivalent to 0.5 mL per plant, and 173-1 liter/mu was equivalent to 1 mL/mu; the same below).

The experimental results are shown in Table 42. The control effect of 173—1 mL/plant reached 53%, which was significantly better than the control effect of 0.5 mL/plant (37%), and was better than the control effect of Serenade.

TABLE 42

| | Control of pepper bacterial wilt by M173 | | | | |
|---|---|---|---|---|---|
| | Control effect on bacterial wilt (%) | | | | |
| Treatment | 7 d after the fourth application | 14 d after the fourth application | 21 d after the fourth application | Plant height (cm) | Fruit setting number |
| M173 - 0.5 mL/plant (1 L/mu) | 37 | 0 | 9 | 24.6 | 95 |
| M173 - 1 mL/plant (2 L/mu) | 53 | 11 | 17 | 26.9 | 91 |
| Serenade - 0.5 mL/plant (1 L/mu) | 49 | 12 | 13 | 25.5 | 96 |
| 3% metalaxyl•hymexazol - 0.33 mL/plant | 14 | 0 | 0 | 27.1 | 82 |
| CK | / | / | / | 22.9 | 79 |

1.2 Control of Tomato Bacterial Wilt by M173

This example provides a case where *Bacillus velezensis* M173 was used in a tomato bacterial wilt test field.

Address of the test field: Hengli Town, Nansha District, Guangzhou City, Guangdong Province.

TABLE 43

| Treatment | Agent | Dosage, L/mu | Dosage per plant, mL/plant | Dilution factor | Number of applications |
|---|---|---|---|---|---|
| 1 | CK | — | — | — | |
| 2 | M173 | 1 | 0.5 | 400 | 3 times |
| 3 | | 2 | 1 | 200 | 3 times |
| 4 | 20% thiediazole copper | 0.8 | 0.4 | 500 | 3 times |
| 5 | Zhendi | 2 | 1 | 200 | 3 times |
| 6 | 20% Zinc thiazole (Bisheng) | 1 | 0.5 | 400 | 3 times |

TABLE 44

| Test site | Hengli Town, Nansha District Test site 1 | Hengli Town, Nansha District Test site 2 | Hengli Town, Nansha District Test site 3 | Hengli Town, Nansha District Test site 4 |
|---|---|---|---|---|
| Inoculated or not? | No | No | No | No |
| Preceding crop | Banana | Rice | Rice | Rice |
| Planting pattern | Open planting | Open planting | Open planting | Open planting |
| Plot area | 44 plants/plot | 44 plants/plot | 50 plants/plot | 50 plants/plot |
| Replicate | 3 | 2 | 2 | 2 |
| Design method | Randomized block design | Randomized block design | Randomized block design | Randomized block design |
| Application | The first | The first | The first | The first |

TABLE 44-continued

| Test site | Hengli Town, Nansha District Test site 1 | Hengli Town, Nansha District Test site 2 | Hengli Town, Nansha District Test site 3 | Hengli Town, Nansha District Test site 4 |
|---|---|---|---|---|
| time | application performed 8 days after transplantation, and 3 consecutive applications with an interval of 7 days | application performed 8 days after transplantation, and 3 consecutive applications with an interval of 7 days | application performed 7 days after transplantation, and 3 consecutive applications with an interval of 7 days | application performed 8 days after transplantation, and 3 consecutive applications with an interval of 7 days |
| Amount of water applied | 200 ml/plant | 200 ml/plant | 200 ml/plant | 200 ml/plant |
| Disease situation | Severe disease | Mild disease | Moderate disease | No disease |

The method of using M173 in the test field was as follows:

M173 treatment gradients were set up: 0.5 mL (400×) and 1 mL (200×) per plant. The competitor Zhendi (1 mL per plant) was used as a control. 20% thiediazole copper and 20% Zinc thiazole were used for chemical pesticide treatments, at dosages of 0.4 mL (500×) and 0.5 mL per plant, respectively. Non-treatment was used as a blank control. A random block design was used. During the growth period, 3 applications were conducted with an interval of 7 days, by means of drip irrigation treatment after dilution. The amount of irrigation water per plant was 200 mL.

Control effect: (Morbidity rate of $CK$ −

Morbidity rate of the treatment group)/Morbidity rate of $CK \times 100\%$.

Figure 23:
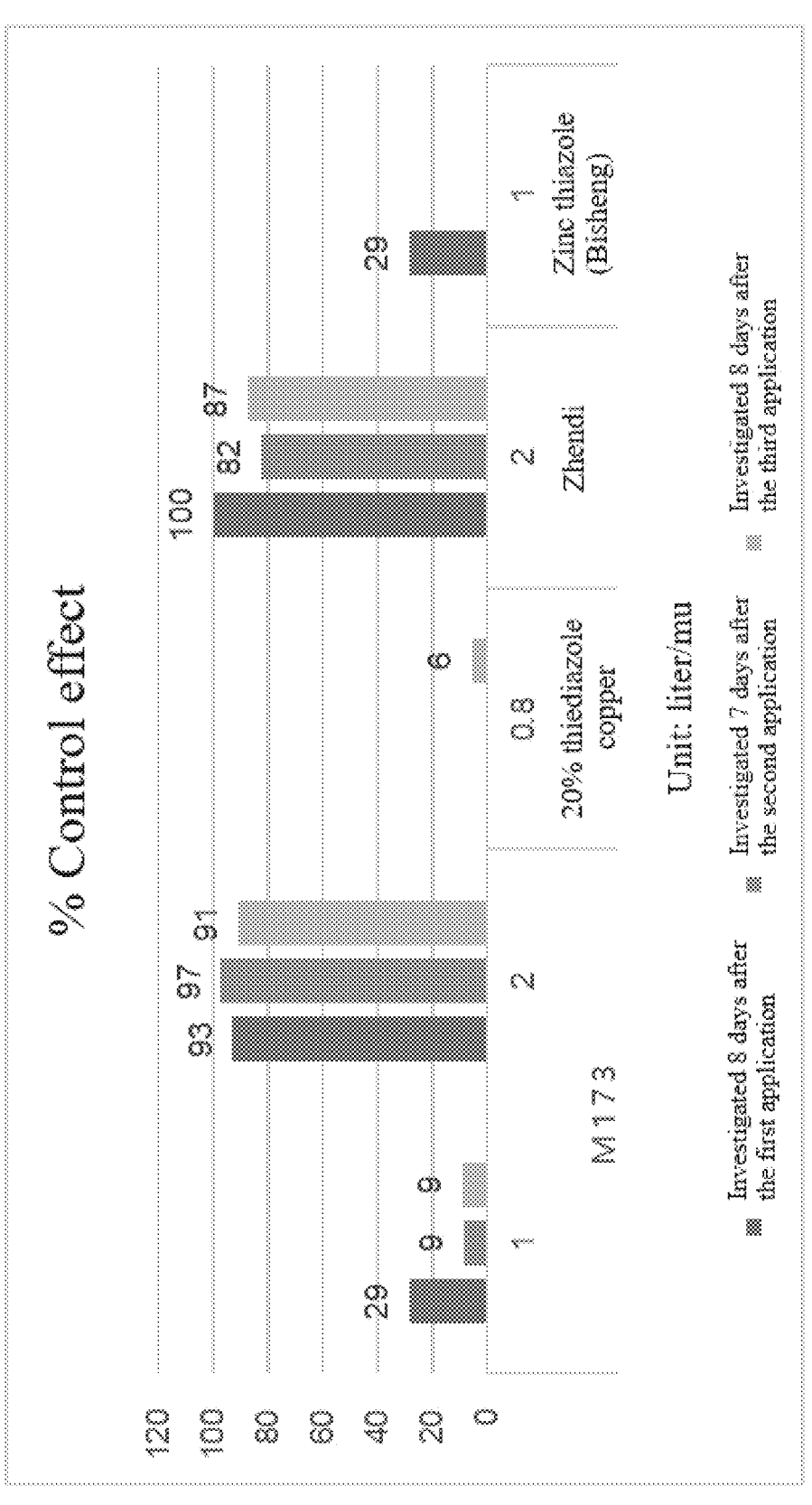
FIG. 23 shows the control effect on tomato bacterial wilt after treatment of test site 1 in different groups.

Test Site 1:

The experimental results are shown in FIG. 23. The control effect of M173—2 liters/mu was significantly higher than that of 1 liter/mu. When the morbidity rate of CK was 39%, the control effect of M173—2 liters/mu on tomato bacterial wilt exceeded 90%, and the control effect of M173—2 liters/mu was higher than that of Zhendi—2 liters/mu and 20% thiediazole copper—0.8 liter/mu. M173—2 liters/mu had the highest control effect.

Test Site 2.

Figure 24:
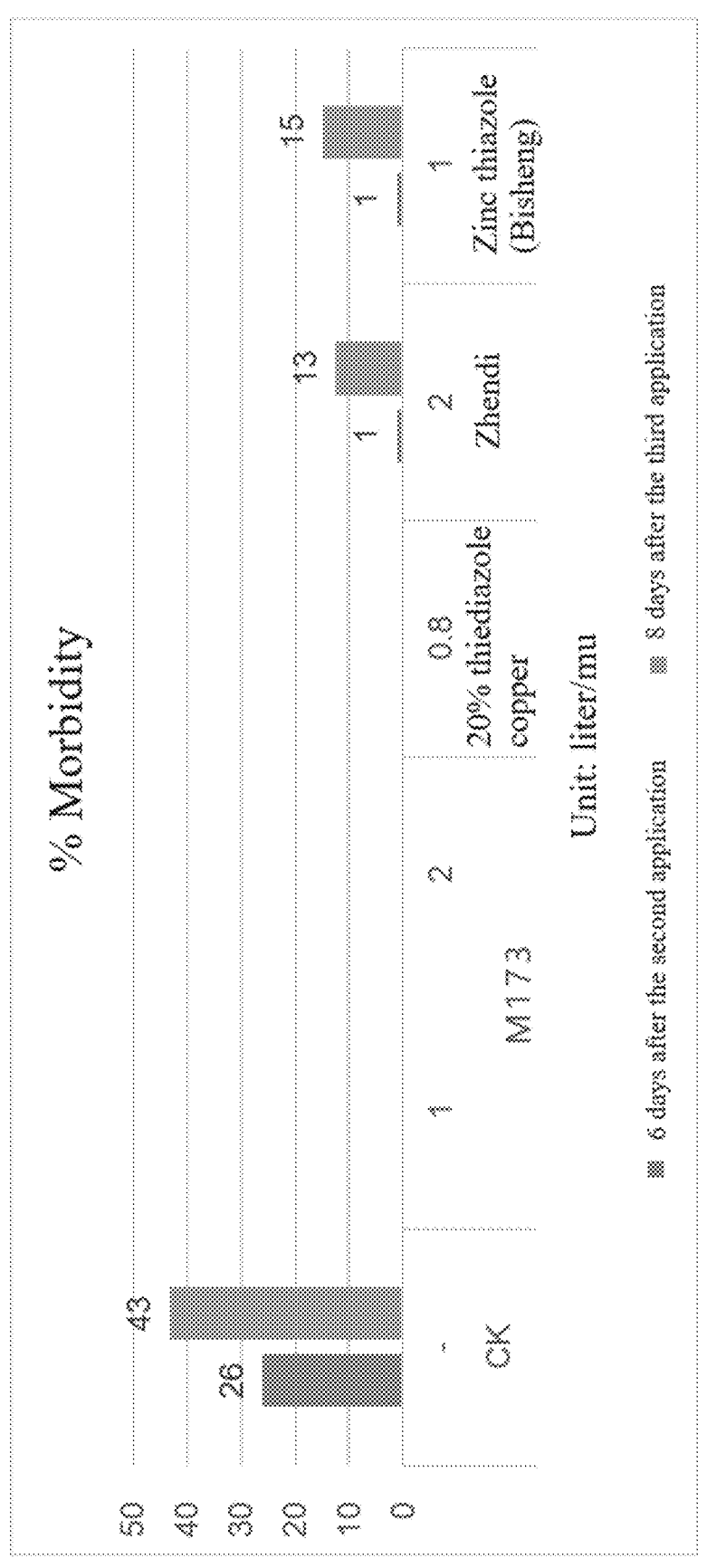
FIG. 24 shows the morbidity results of tomato bacterial wilt after treatment of test site 3 in different groups.

The experimental results are shown in FIG. 24. The disease situation in this test site was relatively mild, with only 3 plots affected. i.e., CK, Zhendi—2 liters/mu, and 20% Zinc thiazole—1 liter/mu.

No disease occurred for the two treatments of M173 and the two replicates of 20% thiediazole copper.

Figure 25:
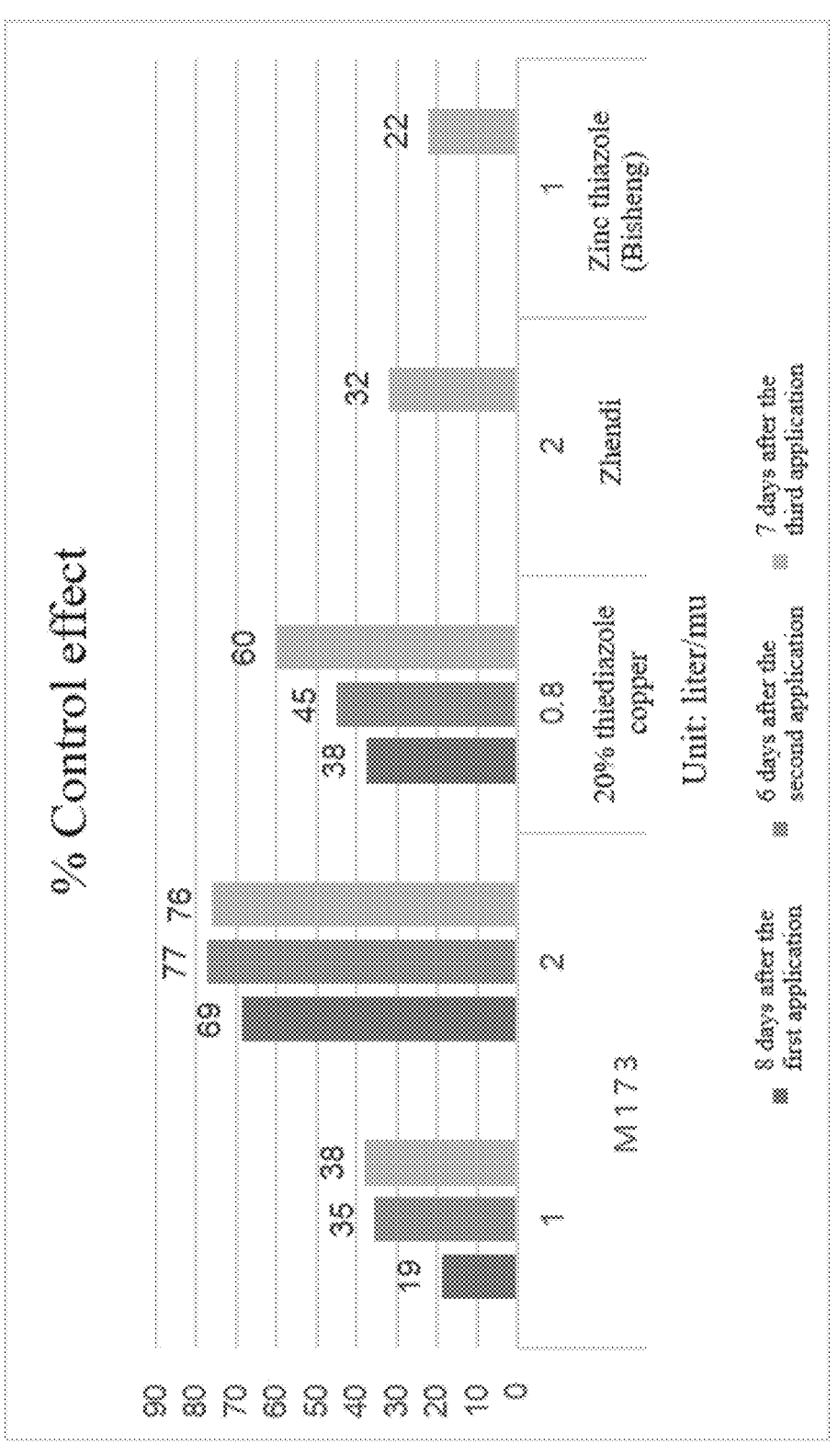
FIG. 25 shows the control effect on tomato bacterial wilt after treatment of test site 4 in different groups.

Test Site 3:

The experimental results are shown in FIG. 25. The control effect of M173—2 liters/mu was significantly higher than that of 1 liter/mu. The control effect of M173—2 liters/mu on tomato bacterial wilt was as high as above 70%. The control effect of M173—1 liter/mu was higher than that of Zhendi—2 liters/mu and 20% Zinc thiazole—1 liter/mu, but lower than that of 20% thiediazole copper—0.8 liter/mu. M173—2 liters/mu had the highest and most stable control effect.

Example 25. Control of Orchid Stem Rot by M173

This example provides a case where *Bacillus velezensis* M173 was used for orchid.

Address of the test field: Shigou Town, Sihui City, Zhaoqing City. Orchid variety: Mo orchid (*Cymbidium sinense*). Basic information of the test field: the pathogen of stem rot of Mo orchid in the test field was *Fusarium oxysporum*. The seedling trays carried the pathogen. The disease had already developed before this experiment. Before this experiment was carried out, the diseased plants in each plot were picked out and replaced with non-diseased plants. There were 42 pots of Mo orchid in each plot, all of which were in a non-diseased state.

The method of using M173 in the test field was as follows:

M173 treatment gradients were set up: 0.5 mL (400× dilution) and 1 mL (200× dilution) per plant. The competitor Serenade (recommended dosage: 0.5 mL per plant) was used as a control. 3% metalaxyl-hymexazol was used for chemical pesticide treatment, at a dosage of 0.33 mL (600× dilution) per plant. Non-treatment was used as a blank control. A random block design was used, with 42 pots of orchid per plot and 3 replicates. During the growth period, 4 applications were conducted with an interval of 14 days, by means of drip irrigation treatment after dilution. The amount of irrigation water per plant was 200 mL. The first investigation on occurrence of stem rot was conducted on August 30, and the second investigation was conducted on September 9. The morbidity rate and relative control effect in each plot were calculated.

Calculation formulae: Morbidity rate =

Number of diseased plants/Number of plants investigated $\times$ 100%;

Control effect = (Morbidity rate of the blank group − Morbidity rate of the treatment group)/Morbidity rate of the blank group $\times$ 100%.

Figure 26:
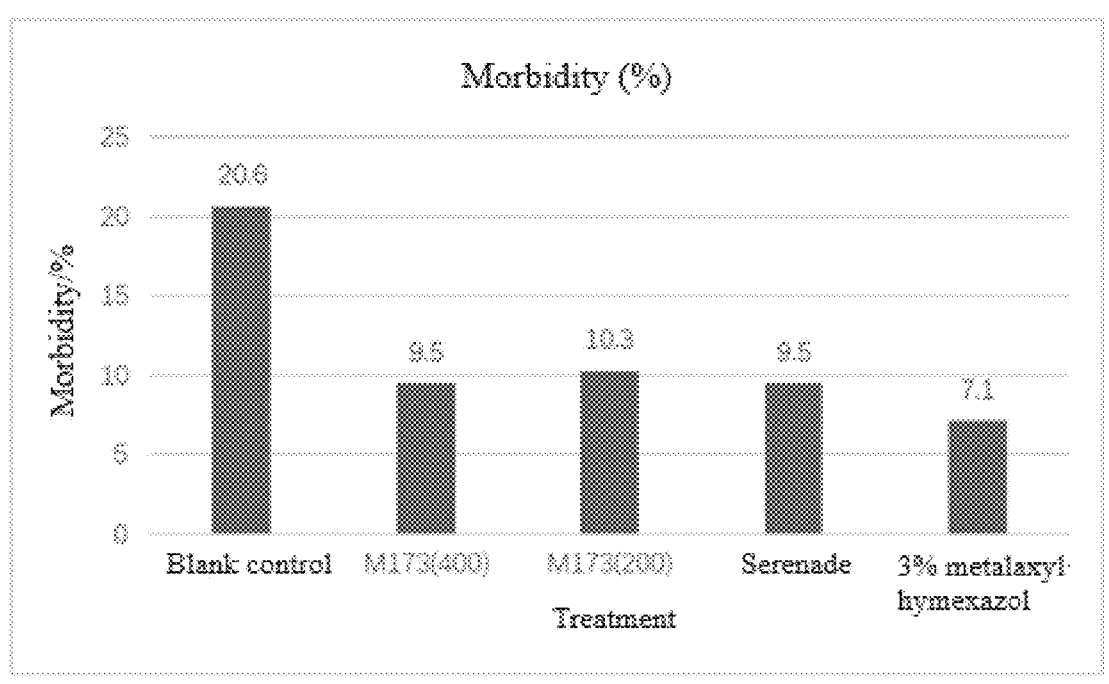
FIG. 26 shows the morbidity of orchid stem rot after treatment in different groups in the first investigation on disease occurrence.
Figure 27:
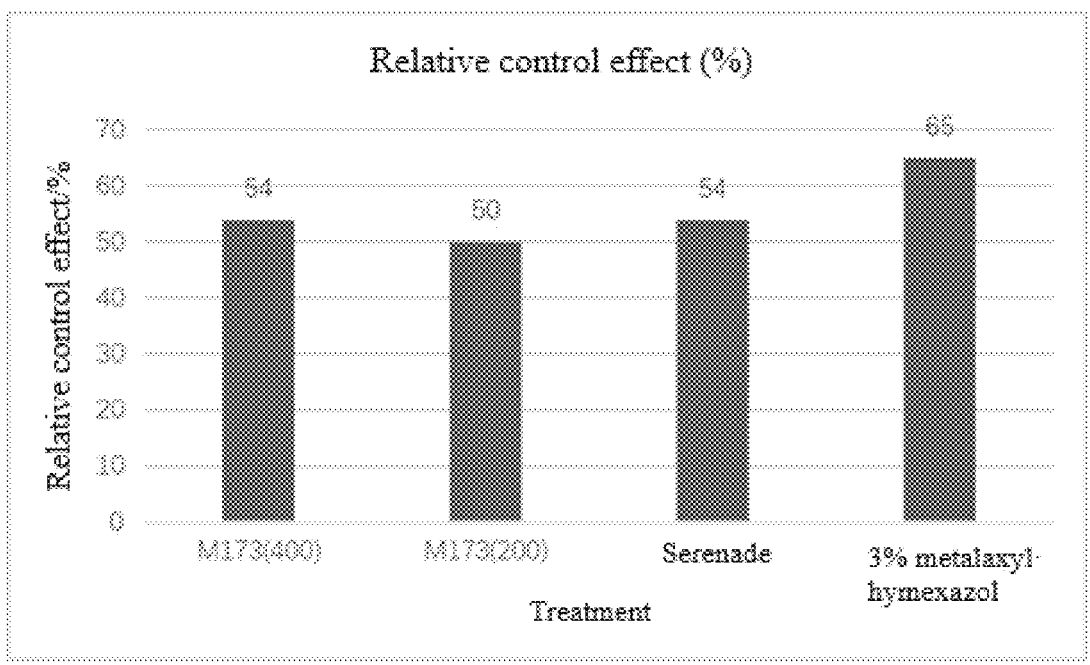
FIG. 27 shows the relative control effect on orchid stem rot after treatment in different groups in the first investigation on disease occurrence.

The first investigation on disease occurrence (FIGS. 26 and 27) showed that the control effects of 200× and 400× diluted M173 on orchid stem rot were basically equivalent; there was no dose difference; and the control effects were more than 50%. The control effect of M173 on orchid stem rot was equivalent to that of Serenade (54%), and lower than that of 3% metalaxyl-hymexazol (65%).

Figure 28:
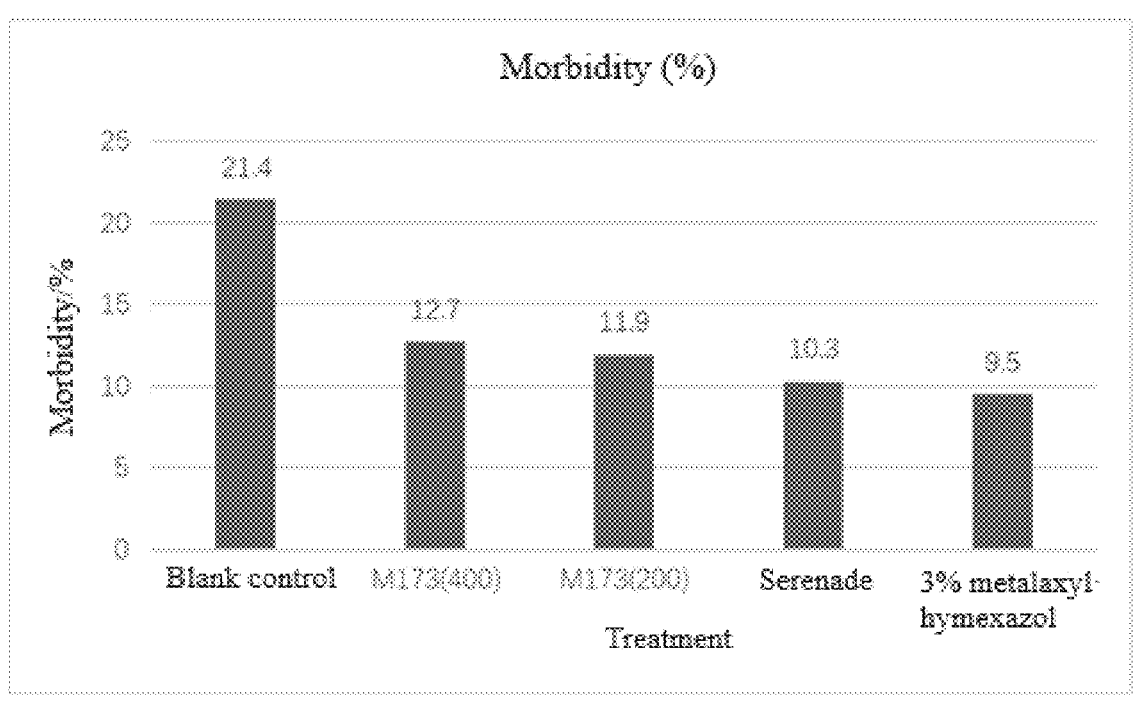
FIG. 28 shows the morbidity of orchid stem rot after treatment in different groups in the second investigation on disease occurrence.
Figure 29:
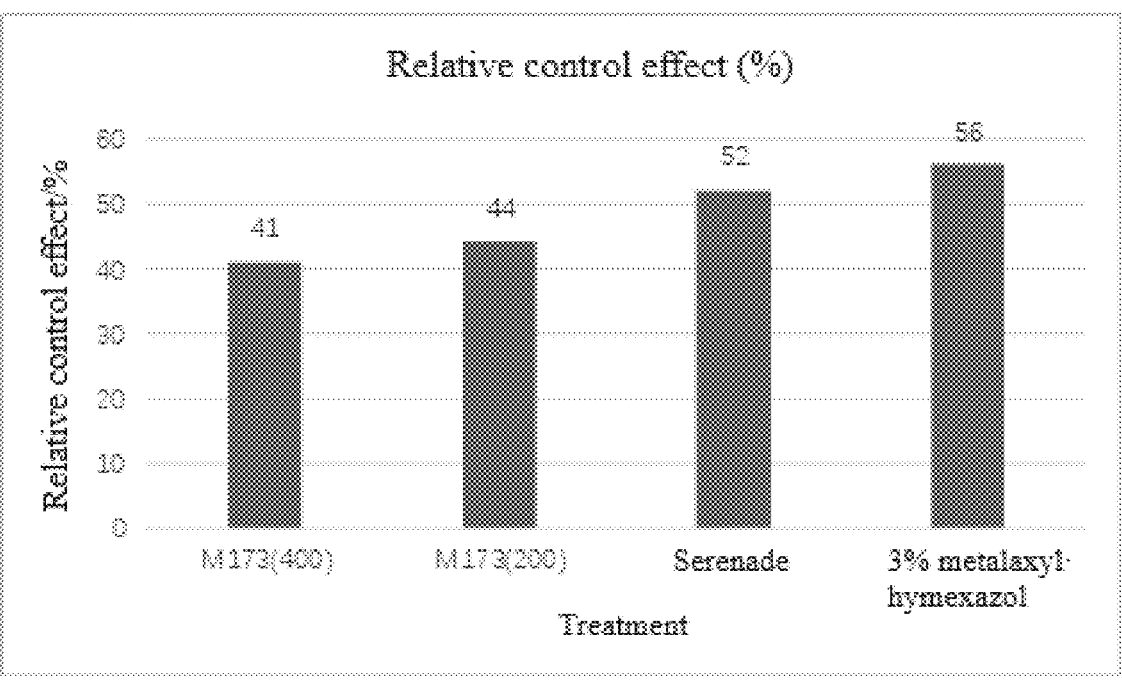
FIG. 29 shows the relative control effect on orchid stem rot after treatment in different groups in the second investigation on disease occurrence.
Figure 30:
FIG. 30 shows the growth situation of orchid in the M173 (400× dilution) group.
Figure 31:
FIG. 31 shows the growth situation of orchid in the M173 (200× dilution) group.
Figure 32:
FIG. 32 shows the growth situation of orchid in the Serenade group.
Figure 33:
FIG. 33 shows the growth situation of orchid in the 3% metalaxyl-hymexazol group.

The second investigation on disease occurrence (FIGS. 28 and 29) showed that the control effects of 200× and 400× diluted M173 on orchid stem rot were basically equivalent; there was no dose difference; and the control effects were more than 40%. The control effect of M173 on orchid stem rot was lower than that of Serenade (52%) and 3% metalaxyl hymexazol (56%). FIGS. 30, 31, 32 AND 33 respectively show the growth situation of orchids in each treatment group (M173 (400× dilution), M173 (200× dilution), Serenade, and 3% metalaxyl-hymexazol).

The control effect of M173 reached more than 50% after the third application, but decreased to above 40% after the fourth application.

Therefore, the *Bacillus velezensis* M173 of the present invention has a good biological control effect on orchid stem rot.

Although the specific embodiments of the present invention have been described in detail, those skilled in the art will understand that various modifications and changes can be made to the details based on all the teachings disclosed herein, and these changes are all within the scope of protection of the present invention. The whole scope of the present invention is determined by the appended claims and any equivalents thereof.

---

What is claimed is:

1. A composition comprising *Bacillus velezensis* M173, wherein the *Bacillus velezensis* M173 was deposited with the Guangdong Microbial Culture Collection Center with a deposit number of GDMCC No. 61434, wherein the composition further comprises an agriculturally or horticulturally acceptable diluent, filler, solvent, spontaneous promoter, carrier, emulsifier, dispersant, preservative, antifreezing agent, thickener, adjuvant, or any combination thereof, and wherein the *Bacillus velezensis* M173 is freeze-dried.

2. The composition of claim 1, wherein the composition further comprises one or more additional biological control agents, one or more chemical agents, or any combination thereof.

3. The composition according to claim 2, wherein the one or more additional biological control agents is a bacterium selected from the group consisting of *Bacillus, Lactobacillus, Bifidobacterium, Propionibacterium, Streptococcus, Lactococcus, Pediococcus, Enterococcus, Staphylococcus*, or any combination thereof; and the bacterium of the *Bacillus* is selected from the group consisting of *Bacillus velezensis, Bacillus subtilis, Bacillus pumilus, Bacillus coagulans*, or any combination thereof.

4. The composition according to claim 1, wherein application of the composition improves the survival rate of a plant at seedling stage compared to a plant at seedling stage where the composition is not applied, through one or more features selected from: (1) improving survival rate of the plant when transplanted at seedling stage; (2) promoting plant growth; (3) increasing the yield of plant fruits; (4) promoting the growth of a plant organ; (5) improving the resistance of the plant to a stress environment; (6) improving the resistance of the plant to a pathogen; and (7) any combination of (1)-(6).

5. The composition of claim 3, wherein the one or more additional biological control agents is *Bacillus pumilus* M101, wherein the *Bacillus pumilus* M101 was deposited with the Guangdong Microbial Culture Collection Center with a deposit number of GDMCC No. 61962.

6. The composition of claim 5, wherein the *Bacillus velezensis* M173 and *Bacillus pumilus* M101 are mixed to a concentration of 1:5 to 5:1 v/v.

7. The composition of claim 5, wherein the composition has an ability to form a biofilm.

8. A method for preventing and/or treating a plant disease caused by a pathogen, or preventing and/or alleviating plant damage or necrosis caused by a non-pathogen condition, comprising: applying to a plant, plant tissue or plant organ the composition according to claim 1, wherein the plant organ comprises root, stem, leaf, flower, fruit, and seed.

9. A method for preventing and/or treating a plant disease caused by a pathogen, or preventing and/or alleviating plant damage or necrosis caused by a non-pathogen condition, comprising: applying to a plant, plant tissue or plant organ the composition according to claim 2, wherein the plant organ comprises root, stem, leaf, flower, fruit, and seed.

10. A method for preventing and/or treating a plant disease caused by a pathogen, or preventing and/or alleviating plant damage or necrosis caused by a non-pathogen condition, comprising: applying to a plant, plant tissue or plant organ the composition according to claim 3, wherein the plant organ comprises root, stem, leaf, flower, fruit, and seed.

11. The method according to claim 8, wherein the applying comprises root soaking, foliar spraying, mist spraying, composting, seed soaking, coating, field flooding, drop irrigation of the plant or plant organ, smearing the plant or plant organ, or dripping the plant or plant organ.

12. The method according to claim 8, wherein the plant tissue comprises meristem, protective tissue, ground tissue, and conducting tissue.

13. The method according to claim 8, wherein the pathogen is selected from *Colletotrichum capsici, Botrytis cinerea, Ralstonia solanacearum, Rhizoctonia solani, Fusarium graminearum, Fusarium oxysporum, Athelia rolfsii, Streptomyces scabies, Sclerotium rolfsii, Sclerotinia sclerotiorum, Fusarium oxysporum* sp. cucumebrium Owen, *Gaeumannomyces critici, Fusarium graminearum, Valsa mali, Glomerella cingulata, Rhizoctonia solani, Pyricularia grisea, Alternaria solani, Exserohilum turcicum, Bipolaria maydis, Phytophthora capsici, Phytophthora nicotianae, Pseudomonas syringae, Xanthomonas campestris, Erwinia carotorora, Xanthomonas campestris, Erwinia carotovora, Botrytis*-cirerea *cinerea, Phytophthora infestans, Exserohilum turcicum, Bipolaria maydis, Fusarium oxysporum* f. sp. *niveum, Verticillium dahliae, Fusarium oxysporum* f. sp. *vasinfectum, Phytophthora capsici, Phytophthora nicotianae*, or any combination thereof.

14. A method for improving the resistance of a plant to a pathogen or stress condition, or promoting plant growth, comprising: applying to the plant, plant tissue or plant organ the composition according to claim 1, wherein the plant organ comprises root, stem, leaf, flower, fruit, and seed.

15. A method for improving the resistance of a plant to a pathogen or stress condition, or promoting plant growth, comprising: applying to the plant, plant tissue or plant organ the composition according to claim 2, wherein the plant organ comprises root, stem, leaf, flower, fruit, and seed.

16. A method for improving the resistance of a plant to a pathogen or stress condition, or promoting plant growth, comprising: applying to the plant, plant tissue or plant organ the composition according to claim 3, wherein the plant organ comprises root, stem, leaf, flower, fruit, and seed.

17. The method according to claim 14, wherein the pathogen is selected from a pathogenic bacterium, pathogenic fungus or virus.

18. The method according to claim 14, wherein the pathogen is selected from the group consisting of *Colletotrichum capsici, Botrytis cinerea, Ralstonia solanacearum, Rhizoctonia solani, Fusarium graminearum, Fusarium oxysporum, Athelia rolfsii, Streptomyces scabies, Sclerotium rolfsii, Sclerotinia sclerotiorum, Fusarium oxysporum* sp.

cucumebrium *owen, Gaeumannomyces critici, Fusarium graminearum, Valsa mali, Glomerella cingulata, Rhizoctonia solani, Pyricularia grisea, Alternaria solani, Exserohilum turcicum, Bipolaria maydis, Phytophthora capsici, Phytophthora nicotianae, Pseudomonas syringae, Xanthomonas campestris, Erwinia carotorora, Xanthomonas campestris, Erwinia carotovora, Botrytis-*cirerea *cinerea, Phytophthora infestans, Exserohilum turcicum, Bipolaria maydis, Fusarium oxysporum* f. sp. *niveum, Verticillium dahliae, Fusarium oxysporum* f. sp. *vasinfectum, Phytophthora capsici, Phytophthora nicotianae,* and any combination thereof.

19. The method according to claim 14, wherein the stress condition is selected from the group consisting of temperature, drought, soil salt content, drug-induced damage, soil hardening, acidic soil, alkaline soil, insufficient soil fertility, and any combination thereof.

20. The method according to claim 14, wherein the plant disease caused by the pathogen is selected from the group consisting of bacterial wilt of plants, soft rot of plants, stem rot of plants, or gray mold of plants.

* * * * *

SEQUENCE LISTING

```
Sequence total quantity: 4
SEQ ID NO: 1            moltype = DNA  length = 1388
FEATURE                Location/Qualifiers
misc_feature           1..1388
                       note = Reference sequence 1
source                 1..1388
                       mol_type = other DNA
                       organism = synthetic construct
SEQUENCE: 1
tcgtagacga gcataatccg tagcttgctc cctgatgtta gcggcggacg ggtgagtaac   60
acgtgggtaa cctgcctgta agactgggat aactccggga aaccggggct aataccggat  120
ggttgtttga accgcatggt tcagacataa aaggtggctt cggctaccac ttacagatgg  180
acccgcggcg cattagctag ttggtgaggt aacggctcac caaggcaacg atgcgtagcc  240
gacctgagag ggtgatcggc cacactggga ctgagacacg gcccagactc ctacgggagg  300
cagcagtagg gaatcttccg caatggacga aagtctgacg gagcaacgcc gcgtgagtga  360
tgaaggtttt cggatcgtaa agctctgttg ttagggaaga acaagtgccg ttcaaatagg  420
gcggcacctt gacggtacct aaccagaaag ccacggctaa ctacgtgcca gcagccgcgg  480
taatacgtag gtggcaagcg ttgtccggaa ttattgggcg taaagggctc gcaggcggtt  540
tcttaagtct gatgtgaaag cccccggctc aaccggggag ggtcattgga aactggggaa  600
cttgagtgca gaagaggaga gtggaattcc acgtgtagcg gtgaaatgcg tagagatgtg  660
gaggaacacc agtggcgaag gcgactctct ggtctgtaac tgacgctgag gagcgaaagc  720
gtggggagcg aacaggatta gataccctgg tagtccacgc cgtaaacgat gagtgctaag  780
tgttaggggg tttccgcccc ttagtgctgc agctaacgca ttaagcactc cgcctgggga  840
gtacggtcgc aagactgaaa ctcaaaggaa ttgacgggg cccgcacaag cggtggagca  900
tgtggtttaa ttcgaagcaa cgcgaagaac cttaccaggt cttgacatcc tctgacaatc  960
ctagagatag gacgtcccct tcggggggcag agtgacaggt ggtgcatggt tgtcgtcagc 1020
tcgtgtcgtg agatgttggg ttaagtcccg caacgagcgc aacccttgat cttagttgcc 1080
agcattcagt tgggcactct aaggtgactg ccggtgacaa accggaggaa ggtggggatg 1140
acgtcaaatc atcatgcccc ttatgacctg ggctacacac gtgctacaat ggacagaaca 1200
aagggcagcg aaaccgcgag gttaagccaa tcccacaaat ctgttctcag ttcggatcgc 1260
agtctgcaac tcgactgcgt gaagctggaa tcgctagtaa tcgcggatca gcatgccgcg 1320
gtgaatacgt tcccgggcct tgtacacacc gcccgtctac accacgagag tttgtaacac 1380
ccgaagtc                                                         1388

SEQ ID NO: 2            moltype = DNA  length = 1407
FEATURE                Location/Qualifiers
misc_feature           1..1407
                       note = Reference sequence 2
source                 1..1407
                       mol_type = other DNA
                       organism = synthetic construct
SEQUENCE: 2
agtcgagcgg acagaaggga gcttgctccc ggatgttagc ggcggacggg tgagtaacac   60
gtgggtaacc tgcctgtaag actgggataa ctccgggaaa ccggagctaa taccggatag  120
ttccttgaac cgcatggttc aaggatgaaa gacggtttcg gctgtcactt acagatggac  180
ccgcggcgca ttagctagtt ggtggggtaa tggctcacca aggcgacgat gcgtagccga  240
cctgagaggg tgatcggcca cactgggact gagacacggc ccagactcct acgggaggca  300
gcagtaggga atcttccgca atggacgaaa gtctgacgga gcaacgccgc gtgagtgatg  360
aaggttttcg gatcgtaaag ctctgttgtt agggaagaac aagtgcgaga gtaactgctc  420
gcaccttgac ggtacctaac cagaaagcca cggctaacta cgtgccagca gccgcggtaa  480
tacgtaggtg gcaagcgttg tccggaatta ttgggcgtaa agggctcgca ggcggtttct  540
taagtctgat gtgaaagccc ccggctcaac cggggagggt cattggaaac tgggaaactt  600
gagtgcagaa gaggagagtg gaattccacg tgtagcggtg aaatgcgtag agatgtggag  660
gaacaccagt ggcgaaggcg actctctggt ctgtaactga cgctgaggag cgaaagcgtg  720
gggagcgaac aggattagat accctggtag tccacgccgt aaacgatgag tgctaagtgt  780
taggggggttt ccgcccctta gtgctgcagc taacgcatta agcactccgc ctggggagta  840
cggtcgcaag actgaaactc aaaggaattg acgggggccc gcacaagcgg tggagcatgt  900
ggtttaattc gaagcaacgc gaagaacctt accaggtctt gacatcctct gacaacccta  960
gagatagggc tttcccttcg gggacagagt gacaggtggt gcatggttgt cgtcagctcg 1020
tgtcgtgaga tgttgggtta gtcccgcaa cgagcgcaac ccttgatctt agttgccagc 1080
atttagttgg gcactctaag tgactgccgg tgacaaacc ggaggaaggt ggggatgacg 1140
tcaaatcatc atgcccctta tgacctgggc tacacacgtg ctacaatgga cagaacaaag 1200
ggctgcgaga ccgcaaggtt agccaatccc ataaatctgt tctcagttcg gatcgcagt 1260
ctgcaactcg actgcgtgaa gctggaatcg ctagtaatcg cggatcagca tgccgcggtg 1320
aatacgttcc cgggccttgt acacaccgcc cgtcacacca cgagagtttg caacacccga 1380
agtcggtgag gtaaccttta tggagcc                                     1407
```

```
SEQ ID NO: 3          moltype = DNA  length = 20
FEATURE               Location/Qualifiers
misc_feature          1..20
                      note = Primer 27F
source                1..20
                      mol_type = other DNA
                      organism = synthetic construct
SEQUENCE: 3
agagtttgat cctggctcag                                        20

SEQ ID NO: 4          moltype = DNA  length = 19
FEATURE               Location/Qualifiers
source                1..19
                      mol_type = other DNA
                      organism = synthetic construct
misc_feature          1..19
                      note = Primer 1492R
SEQUENCE: 4
ggttaccttg ttacgactt                                         19
```